United States Patent
Sasaki et al.

(10) Patent No.: US 8,514,516 B2
(45) Date of Patent: Aug. 20, 2013

(54) THIN-FILM MAGNETIC HEAD, METHOD OF MANUFACTURING THE SAME, HEAD GIMBAL ASSEMBLY, AND HARD DISK DRIVE

(75) Inventors: Yoshitaka Sasaki, Milpitas, CA (US); Hiroyuki Ito, Milpitas, CA (US); Hironori Araki, Milpitas, CA (US); Shigeki Tanemura, Milpitas, CA (US); Kazuki Sato, Milpitas, CA (US); Atsushi Iijima, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/344,081

(22) Filed: Jan. 5, 2012

(65) Prior Publication Data

US 2013/0176644 A1 Jul. 11, 2013

(51) Int. Cl.
*G11B 5/147* (2006.01)
(52) U.S. Cl.
USPC .................................... 360/123.01
(58) Field of Classification Search
USPC ............... 360/123.01, 123.12, 123.39, 122
See application file for complete search history.

(56) References Cited

U.S. PATENT DOCUMENTS

| | | | | |
|---|---|---|---|---|
| 4,945,438 | A * | 7/1990 | Matsumoto et al. | 360/121 |
| 5,757,617 | A * | 5/1998 | Sherry | 361/730 |
| 6,873,524 | B2 * | 3/2005 | Kaczeus et al. | 361/679.33 |
| 7,391,590 | B2 * | 6/2008 | Matono et al. | 360/125.32 |
| 7,483,238 | B2 * | 1/2009 | Xu et al. | 360/97.19 |
| 7,561,375 | B2 * | 7/2009 | Kim et al. | 360/97.19 |
| 7,612,963 | B2 * | 11/2009 | Allen et al. | 360/123.06 |
| 2004/0032711 | A1 * | 2/2004 | Kaczeus et al. | 361/685 |
| 2004/0255313 | A1 * | 12/2004 | Kaczeus et al. | 720/651 |
| 2007/0076327 | A1 * | 4/2007 | Yang et al. | 360/294.4 |
| 2008/0030905 | A1 * | 2/2008 | Yamanaka et al. | 360/313 |
| 2011/0073987 | A1 * | 3/2011 | Mackh et al. | 257/531 |
| 2011/0116192 | A1 * | 5/2011 | Fujita et al. | 360/235.1 |

FOREIGN PATENT DOCUMENTS

| | | |
|---|---|---|
| JP | A-2007-272958 | 10/2007 |
| JP | A-2009-295262 | 12/2009 |
| JP | A-2010-157303 | 7/2010 |
| JP | A-2010-176732 | 8/2010 |

* cited by examiner

*Primary Examiner* — Allen T Cao
(74) *Attorney, Agent, or Firm* — Oliff & Berridge, PLC

(57) ABSTRACT

A thin-film magnetic head is constructed such that a main magnetic pole layer, a write shield layer, a gap layer, a thin-film coil and a shield magnetic layer are laminated on a substrate. The thin-film magnetic head has a shield magnetic layer. This thin-film magnetic head has a hard guard frame layer surrounding an equidistant coil part, disposed at a position equidistant from the substrate, from outside and being in direct contact with almost a whole outside surface defining an outer shape of the equidistant coil part.

20 Claims, 42 Drawing Sheets

Fig.41
(a)
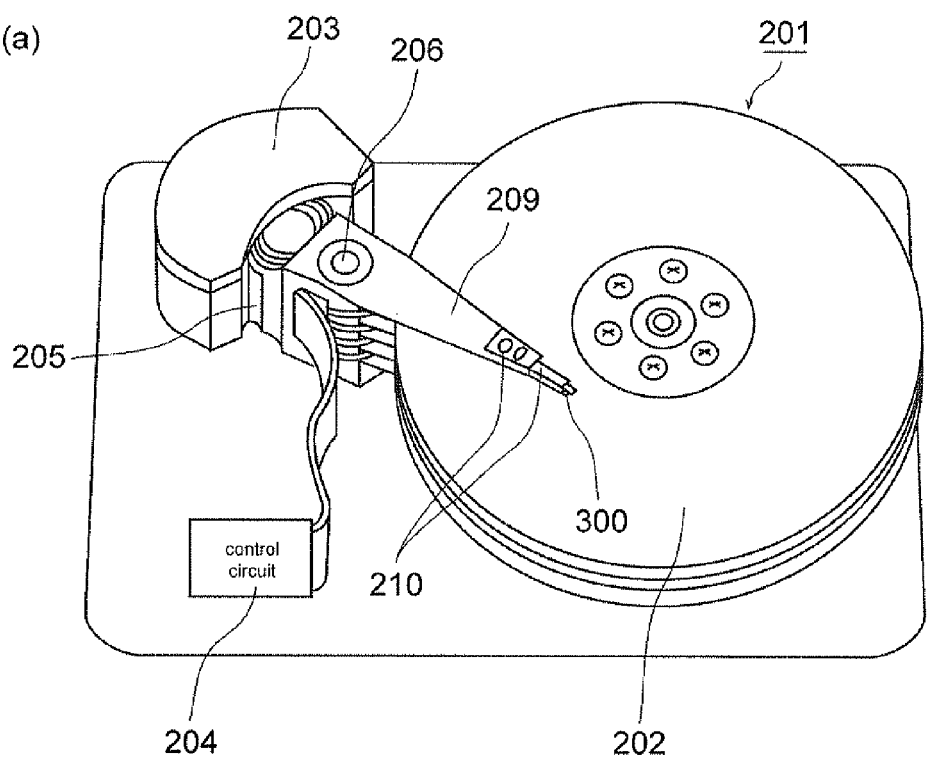
(b)
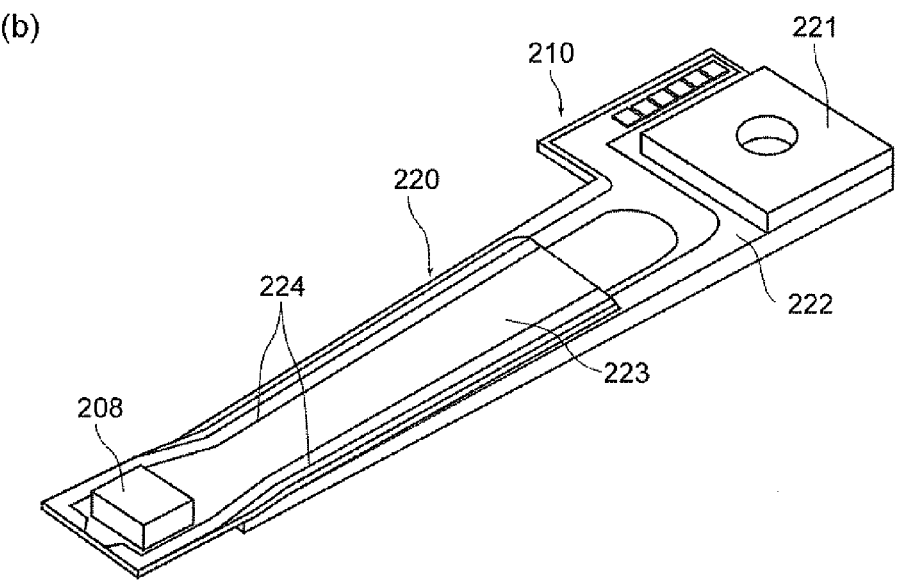

THIN-FILM MAGNETIC HEAD, METHOD OF MANUFACTURING THE SAME, HEAD GIMBAL ASSEMBLY, AND HARD DISK DRIVE

BACKGROUND

1. Field of the Invention

The present invention relates to a thin-film magnetic head which performs a magnetic recording action by a perpendicular magnetic recording scheme, a method of manufacturing the same, a head gimbal assembly, and a hard disk drive.

2. Related Background Art

A hard disk drive has a large recording capacity and is used as the heart of a storage device. The hard disk drive records and reproduces data to/from a hard disk (recording medium) by a thin-film magnetic head.

The thin-film magnetic heads can roughly be classified according to their recording schemes into those of longitudinal magnetic recording type and those of perpendicular magnetic recording type. The longitudinal magnetic recording scheme records data in a (longitudinal) direction within a recording surface of a hard disk (recording medium), while the perpendicular magnetic recording scheme records data such that the direction of recording magnetization formed in the hard disk is made perpendicular to the recording surface. The thin-film magnetic heads of perpendicular magnetic recording type have been considered more promising than those of longitudinal magnetic recording type, since they can realize a much higher recording density than that in the longitudinal magnetic recording scheme, while their recorded hard disks are less susceptible to heat fluctuation.

Meanwhile, a conventional magnetic head of perpendicular magnetic recording type (perpendicular magnetic recording head which will also be referred to as "PMR" in the following) has a magnetic pole layer and a thin-film coil. The PMR has a structure of electromagnet which the thin-film coil are wound around the magnetic pole layer.

As the conventional PMR, PMRs each including a shield layer on a trailing side of a main magnetic pole layer are disclosed, for example, in JP 2007-272958 (referred to also as Patent Document 1), JP 2010-176732 (referred to also as Patent Document 2), JP 2010-157303 (referred to also as Patent Document 3), JP 2009-295262 (referred to also as Patent Document 4) and so on. A PMR 600 illustrated in FIG. 42 is one example of such PMRs.

The PMR 600 has a main magnetic pole layer 601 through which a recording magnetic field along the direction perpendicular to the recording medium passes, a thin-film coil 602 wound around the main magnetic pole layer 601, a recording gap layer 603, and a shield layer 604 opposite to the main magnetic pole layer 601 with the recording gap layer 603 intervening therebetween.

SUMMARY OF THE INVENTION

The conventional PMR causes a current to flow through the thin-film coil, so as to generate a magnetic field, thereby recording data onto the recording medium. In the case of the PMR 600, for example, a current is caused to flow through the thin-film coil 602 so as to record data onto the recording medium.

However, the thin-film coil 602 generates heat when electric current is passed therethrough, and the heat conducts to the coil-insulating layer 605 around the thin-film coil 602. The coil-insulating layer 605 is formed of an organic material such as photoresist or the like and is thus larger in expansion coefficient than the thin-film coil 602. For this reason, when heat is applied, the coil-insulating layer 605 is likely to expand. When the coil-insulating layer 605 expands, the end part on the medium-opposing surface 606 side of the shield layer 604 is pushed to the side outer than the medium-opposing surface 606 and protrudes.

On the other hand, a lower coil 612 being a part of the thin-film coil 602 is formed closer to a reproducing head 619 (closer to a substrate 620) than is the main magnetic pole layer 601 in the PMR 600. A coil insulating layer 615 made of photoresist or the like is formed between the lower coil 612 and the lower coil 612. Accordingly, the coil insulating layer 615 expands due to heat generation of the lower coil 612, thus possibly protruding an end part on the medium-opposing surface 606 side of the insulating layer 613 made of alumina.

Such partial protrusion of the medium-opposing surface is mainly caused by heat generation of the thin-film coil. Therefore, to suppress the partial protrusion of the medium-opposing surface, it is sufficient to suppress the heat generation of the thin-film coil. Generally, the heat generated from the conductor through which the electric current flows is called Joule heat and is known to be proportional to the square of the magnitude of electric current and the electric resistance of the conductor (Joule's law). Accordingly, to suppress the heat generation of the thin-film coil, it is sufficient to reduce the electric resistance of the thin-film coil.

To reduce the electric resistance of the thin-film coil, it is sufficient to increase the sectional area of the thin-film coil. To this end, there are conceivable countermeasures to widen a width w602 or increase a thickness h602 of the thin-film coil 602, for example, in the case of the PMR 600.

However, widening the width w602 makes it difficult to shorten the magnetic path length. The magnetic path length is the length of the magnetic pole layer which the thin-film coil is wound around, and the size of the magnetic path length is affected mainly by a width LX illustrated in FIG. 42.

Incidentally, alternating current is passed through the thin-film coil, and the impedance during this time is proportional to the frequency and the inductance. Therefore, when alternating current having a high frequency is passed through the thin-film coil in order to increase the recording density on the magnetic recording medium, the impedance increases and thereby causes the electric current to hardly flow. To avoid this situation, it is effective to reduce the inductance and shorten the magnetic path length. However, when the width of the thin-film coil is widened, the magnetic path length needs to be increased, resulting in increased inductance of the PMR. This makes it impossible to increase the frequency of the recording signals, failing to increase the recording density on the magnetic recording medium. Besides, the magnetic path length needs to be increased even by widening the thickness of the thin-film coil.

The countermeasures to suppress the partial protrusion of the medium-opposing surface by increasing the sectional area of the thin-film coil have a problem that the reduction in magnetic path length is difficult. Therefore, the conventional PMR needs new solutions capable of suppressing the partial protrusion of the medium-opposing surface without increasing the sectional area of the thin-film coil.

The present invention is made to solve the above problem, and it is an object to provide a thin-film magnetic head equipped with a structure that the partial protrusion of the medium-opposing surface is suppressed without increasing the sectional area of the thin-film coil, a method of manufacturing the same and a head gimbal assembly and a hard disk drive.

To solve the above problem, the present invention is a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the thin-film magnetic head including: a hard guard frame layer surrounding an equidistant coil part from outside and being in direct contact with almost a whole outside surface defining an outer shape of the equidistant coil part, where a part of the thin-film coil disposed at a position equidistant from the substrate is the equidistant coil part.

In case of this thin-film magnetic head, the hard guard frame layer restrain the equidistant coil part which tends to spread outward. The hard guard frame layer is disposed on the outside of equidistant coil part.

Further, in case of the above-described thin-film magnetic head, it is preferable that the thin-film coil has, as the equidistant coil part, a lower coil layer disposed closer to the substrate than is the main magnetic pole layer and an upper coil layer disposed at a position distanced more from the substrate than is the main magnetic pole layer, the shield magnetic layer has a lower front shield part disposed closer to the medium-opposing surface than is the lower coil layer, and the hard guard frame layer has a wraparound end part which is wrapped around to the medium-opposing surface side of the lower coil layer, inserted in a gap between the lower front shield part and the lower coil layer, and in direct contact with an outside surface on the medium-opposing surface side of the lower coil layer.

In case of this thin-film magnetic head, the pressure in a direction toward the medium-opposing surface exerted from the lower coil layer is received by the wraparound end part, so that the pressure to push a part of the medium-opposing surface is more effectively suppressed.

Furthermore, in case of the above-described thin-film magnetic head, it is preferable that the hard guard frame layer has a thickness equal to a thickness of the equidistant coil part, and is in direct contact with the whole outside surface at a part of the equidistant coil part which is distanced more from the medium-opposing surface than is the main magnetic pole layer.

In this configuration, the hard guard frame layer in its entirety in the thickness direction receives the outward pressure of the equidistant coil part which tends to spread outward, so that the outward pressure is more effectively suppressed.

And further, in case of the above-described thin-film magnetic head, it is preferable that the thin-film magnetic head further includes a middle adiabatic layer disposed between the lower coil layer and the main magnetic pole layer and formed to cover almost a whole upper face of the lower coil layer on a side distanced from the substrate.

In this thin-film magnetic head, since the heat generated by the low coil layer is interrupted by the middle adiabatic layer, the heat is less likely to be conducted to the main magnetic pole layer.

Further, in case of the above-described thin-film magnetic head, it is preferable that the thin-film magnetic head further includes an upper hard guard frame layer surrounding the upper coil layer from outside and being in direct contact with almost a whole outside surface defining an outer shape of the upper coil layer.

Further, the present invention provides a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the shield magnetic layer having a front shield part disposed closer to the medium-opposing surface than is an equidistant coil part, where a part of the thin-film coil disposed at a position equidistant from the substrate is the equidistant coil part, the thin-film magnetic head including: a hard guard frame layer surrounding the whole of the equidistant coil part and the front shield part from outside and being in contact with almost whole outside surfaces defining outer shapes of the equidistant coil part and the front shield part.

In case of the above-described thin-film magnetic head, it is preferable that the thin-film coil has, as the equidistant coil part, a lower coil layer disposed closer to the substrate than is the main magnetic pole layer and an upper coil layer disposed at a position distanced more from the substrate than is the main magnetic pole layer, the front shield part includes a lower front shield part disposed closer to the substrate than is the main magnetic pole layer, and an upper front shield part disposed at a position distanced more from the substrate than is the main magnetic pole layer, and the hard guard frame layer has a wraparound end part which is wrapped around to the medium-opposing surface side of the lower coil layer, inserted in a gap between the lower front shield part and the lower coil layer, and in direct contact with an outside surface on the medium-opposing surface side of the lower coil layer.

Further, in case of the above-described thin-film magnetic head, it is preferable that the hard guard frame layer has a front end part which is disposed closer to the medium-opposing surface than is the lower front shield part and in contact with an outside surface on the medium-opposing surface side of the lower front shield part, and the front end part is disposed in the medium-opposing surface.

Furthermore, it is preferable that the thin-film magnetic head further including a middle adiabatic layer disposed between the lower coil layer and the main magnetic pole layer and formed to cover almost whole upper faces of the lower coil layer and the lower front shield part on a side distanced from the substrate.

In case of the above-described thin-film magnetic head, it is preferable that the shield magnetic layer further includes a connecting shield part connected to the lower front shield part and disposed in the medium-opposing surface, and a front end angle representing an angle formed between a front end face disposed in the medium-opposing surface of the connecting shield part and a lower end face connected to the front end face and disposed at a position closest to the substrate in the connecting shield part is set at an obtuse angle.

Further, the present invention provides a method of manufacturing a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the method including the following the steps (1) to (3):

(1) a conductor layer forming step of forming a lower conductor layer for forming a lower coil layer disposed between the main magnetic pole layer and the substrate, among coil layers constituting the thin-film coil (2) a hard nonmagnetic layer forming step of forming a hard nonmagnetic layer using a hard nonmagnetic material to cover almost the whole lower conductor layer (3) a hard guard frame layer forming step of forming a hard guard frame layer surrounding the lower coil layer from outside and being in direct contact with almost a whole outside surface defining an outer shape of the lower coil layer, together with the lower coil layer, by performing flattening of a surface of a multilayer body.

In case of the above-described method of manufacturing, it is preferable that a shield magnetic layer forming step of forming the shield magnetic layer including a lower front shield part forming step of forming a lower front shield part disposed closer to the medium-opposing surface than is the lower coil layer, the hard nonmagnetic layer forming step forms the hard nonmagnetic layer such as to form a wrap-around end part which is wrapped around to the medium-opposing surface side of the lower conductor layer, inserted in a gap between the lower front shield part and the lower conductor layer, and in direct contact with an outside surface on the medium-opposing surface side of the lower conductor layer.

Further, in the above-described method of manufacturing the thin-film magnetic head, it is preferable that the method of manufacturing further including the following the step (4).

(4) a middle adiabatic layer forming step of forming a middle adiabatic layer disposed between the lower coil layer and the main magnetic pole layer and formed to cover almost a whole upper face of the lower coil layer on a side distanced from the substrate.

Further, the present invention provides a method of manufacturing a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the method including the following the steps (5) to (8):

(5) a shield magnetic layer forming step of forming the shield magnetic layer including a lower front shield part forming step of forming a lower front shield part disposed closer to the medium-opposing surface than is a lower coil layer disposed between the main magnetic pole layer and the substrate, among coil layers constituting the thin-film coil (6) a conductor layer forming step of forming a lower conductor layer for forming the lower coil layer (7) a hard nonmagnetic layer forming step of forming a hard nonmagnetic layer using a hard nonmagnetic material to cover almost the whole lower conductor layer and lower front shield part (8) a hard guard frame layer forming step of forming a hard guard frame layer surrounding the whole of the lower conductor layer and the lower front shield part from outside and being in contact with almost whole outside surfaces defining outer shapes of the lower conductor layer and the lower front shield part, together with the lower coil layer, by performing flattening of a surface of a multilayer body.

In case of the above-described method of manufacturing, it is preferable that the hard nonmagnetic layer forming step forms the hard nonmagnetic layer such as to form a wrap-around end part which is wrapped around to the medium-opposing surface side of the lower conductor layer, inserted in a gap between the lower front shield part and the lower conductor layer, and in direct contact with an outside surface on the medium-opposing surface side of the lower conductor layer.

Further, it is preferable that the hard nonmagnetic layer forming step forms the hard nonmagnetic layer such that a front end part which is disposed closer to the medium-opposing surface than is the lower front shield part and in contact with an outside surface on the medium-opposing surface side of the lower front shield part is disposed in the medium-opposing surface.

Furthermore, it is preferable that the method of manufacturing further including a middle adiabatic layer forming step of forming a middle adiabatic layer disposed between the lower coil layer and the main magnetic pole layer and formed to cover almost whole upper faces of the lower coil layer and the lower front shield part on a side distanced from the substrate.

Further, the present invention provides a head gimbal assembly including a thin-film magnetic head formed on a support and a gimbal for securing the support; the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the thin-film magnetic head including: a hard guard frame layer surrounding an equidistant coil part from outside and being in direct contact with almost a whole outside surface defining an outer shape of the equidistant coil part, where a part of the thin-film coil disposed at a position equidistant from the substrate is the equidistant coil part.

Further, the present invention provides a hard disk drive including a head gimbal assembly having a thin-film magnetic head and a recording medium opposing the thin-film magnetic head; the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the thin-film magnetic head including: a hard guard frame layer surrounding an equidistant coil part from outside and being in direct contact with almost a whole outside surface defining an outer shape of the equidistant coil part, where a part of the thin-film coil disposed at a position equidistant from the substrate is the equidistant coil part.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 41 (a) is a perspective view illustrating a hard disk drive equipped with a thin-film magnetic head according to an embodiment of the present invention, FIG. 41 (b) is a perspective view illustrating a rear side of HGA.

DETAILED DESCRIPTION OF THE EMBODIMENTS

In the following, embodiments of the present invention will be described with reference to the drawings. Note that the same components will be referred to with the same numerals or letters, while omitting their overlapping descriptions.

First Embodiment (Structures of Thin-Film Magnetic Head)

To begin with, the structure of a thin-film magnetic head of perpendicular magnetic recording type according to the first embodiment of the present invention will be explained with reference to FIG. 1 to FIG. 12.

Figure 1:
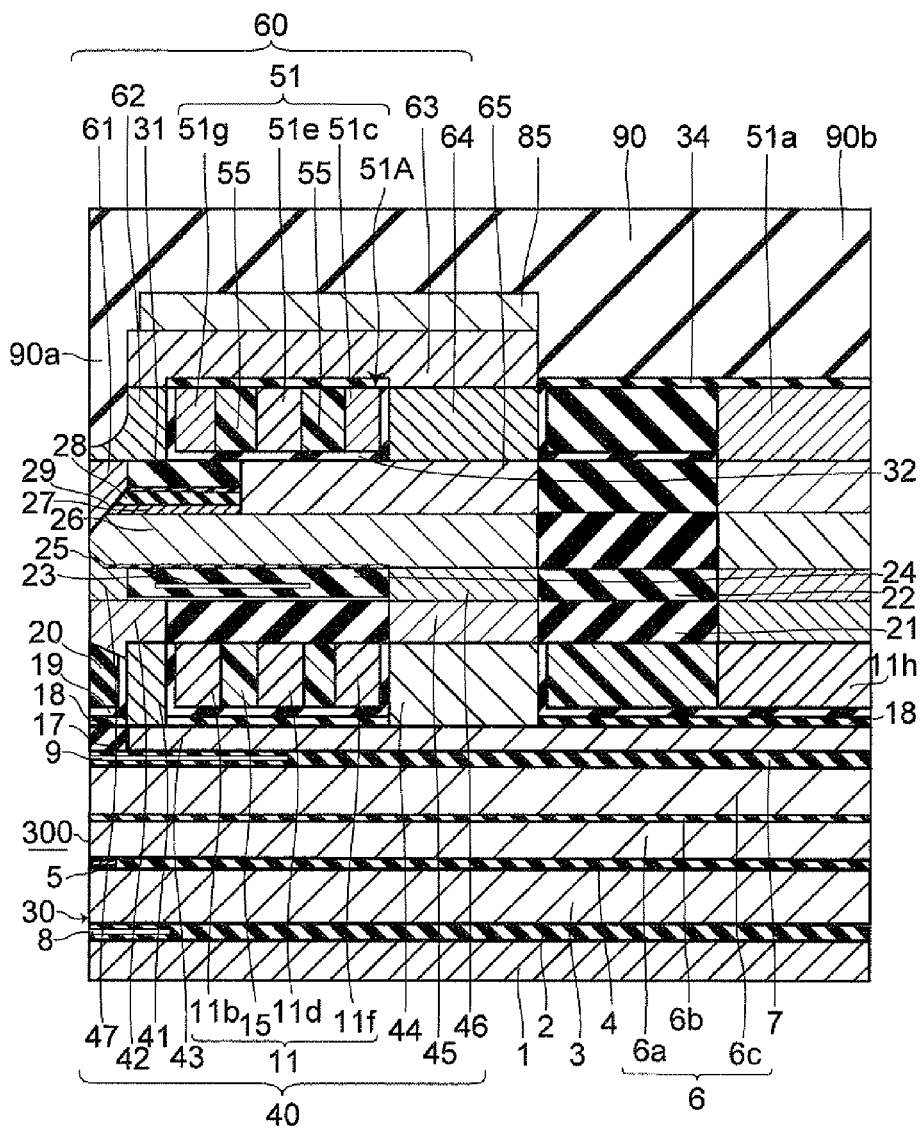
FIG. 1 is a sectional view of the thin-film magnetic head according to a first embodiment of the present invention taken along the line 1-1 of FIG. 2, along by a direction intersecting its air bearing surface.
Figure 2:
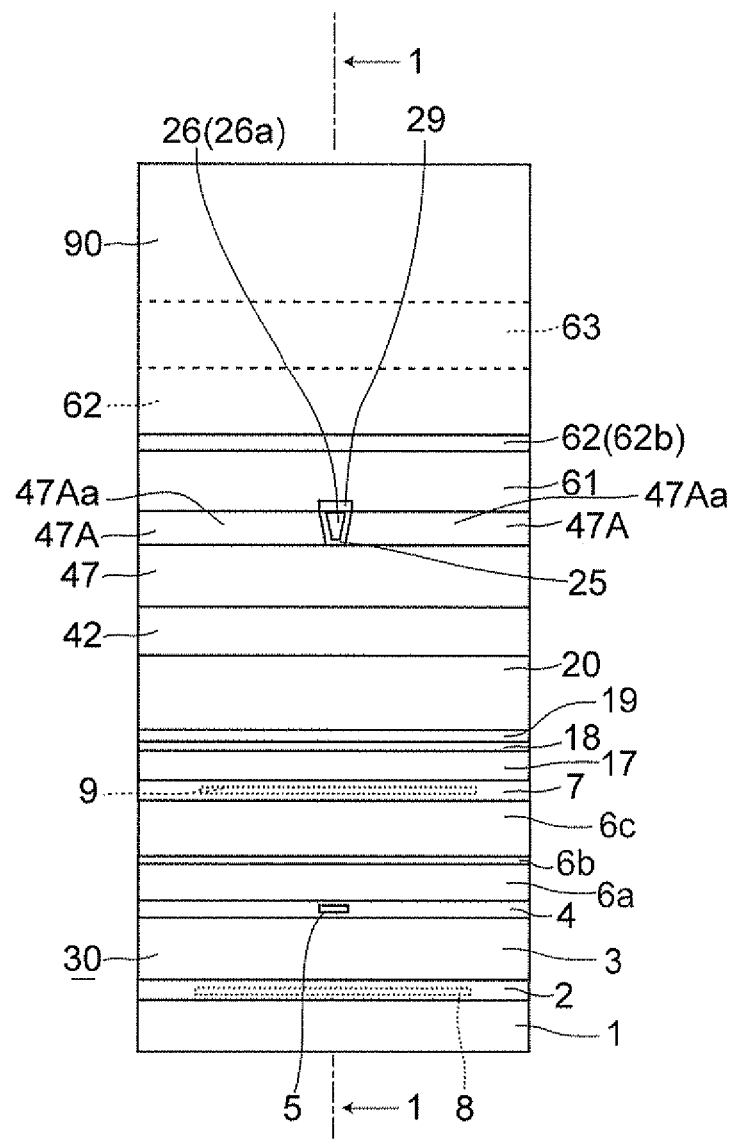
FIG. 2 is a front view illustrating an ABS of the thin-film magnetic head.

Here, FIG. 1 is a sectional view of the thin-film magnetic head 300 according to a first embodiment of the present invention taken along the line 1-1 of FIG. 2, along by a direction intersecting its air bearing surface (which will hereinafter be referred to as "ABS"), FIG. 2 is a front view illustrating the ABS 30 of the thin-film magnetic head 300.

Figure 3:
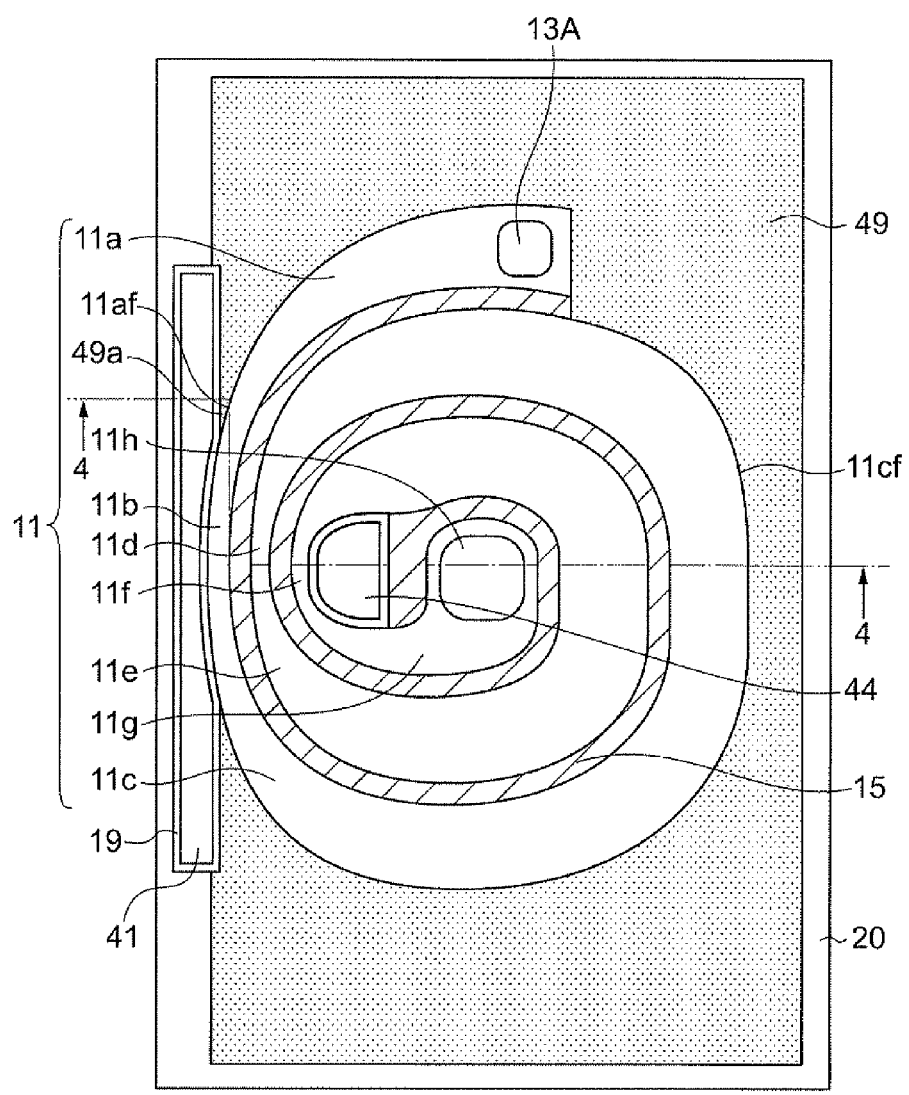
FIG. 3 is a plan view illustrating a lower thin-film coil, a hard guard frame layer and lower front shield part of the thin-film magnetic head illustrated in FIG. 1.
Figure 4:
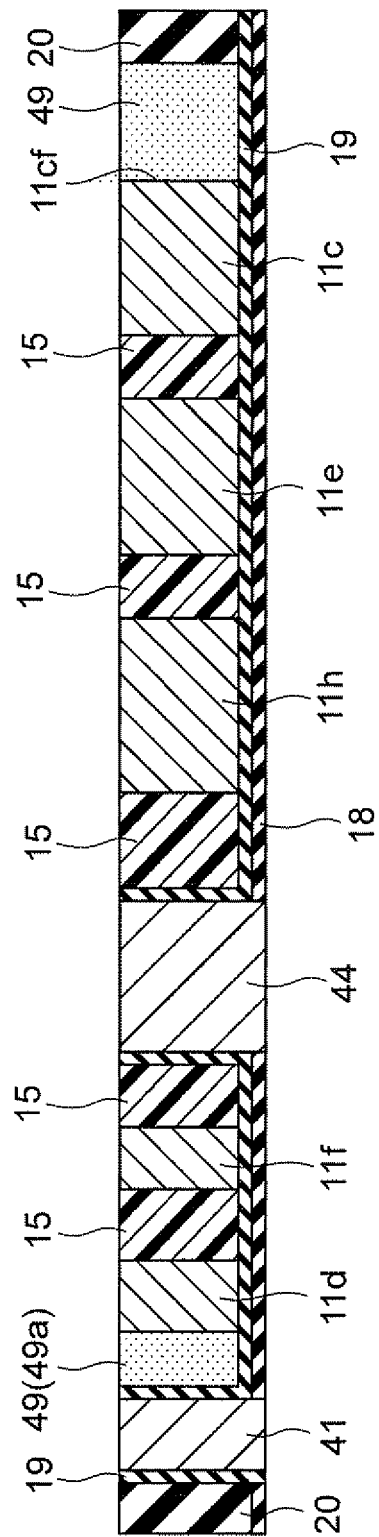
FIG. 4 is a sectional view taken along the line 4-4 of FIG. 3.
Figure 5:
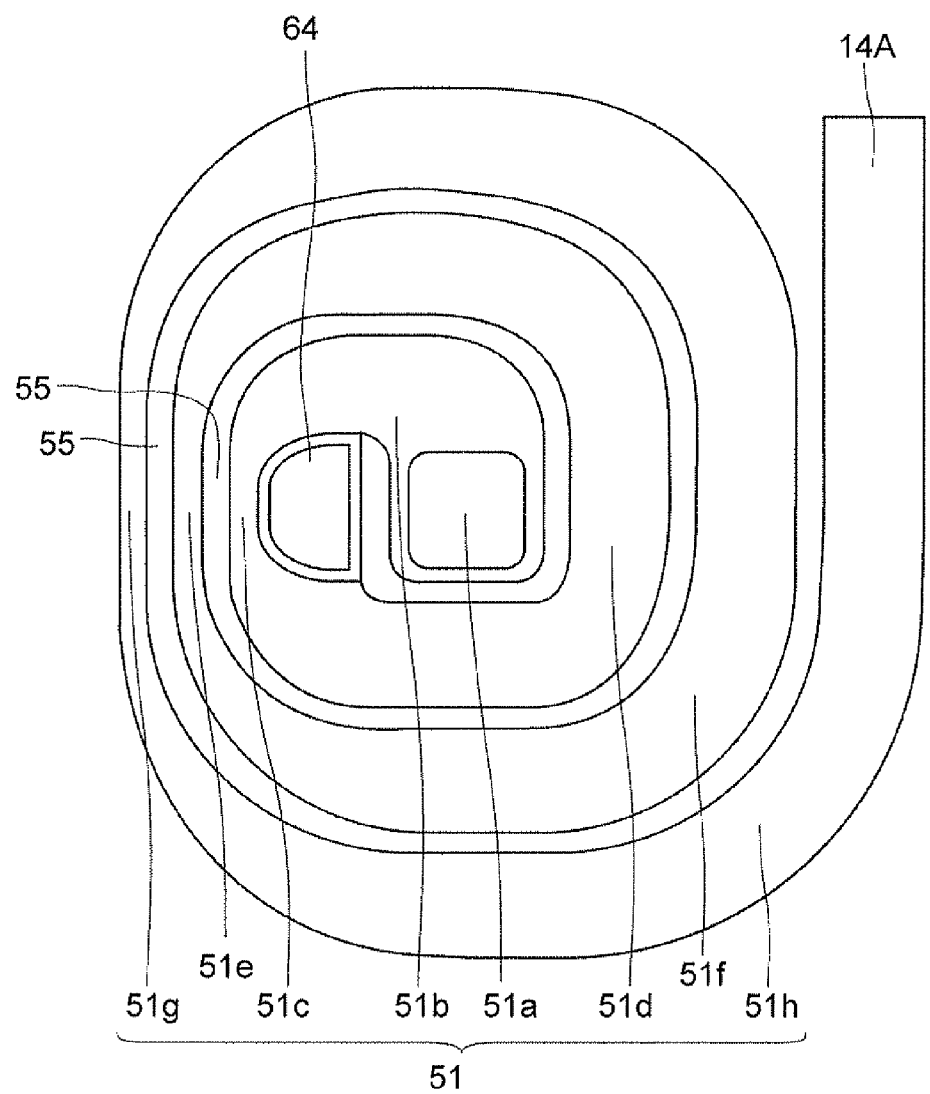
FIG. 5 is a plan view illustrating an upper thin-film coil.
Figure 6:
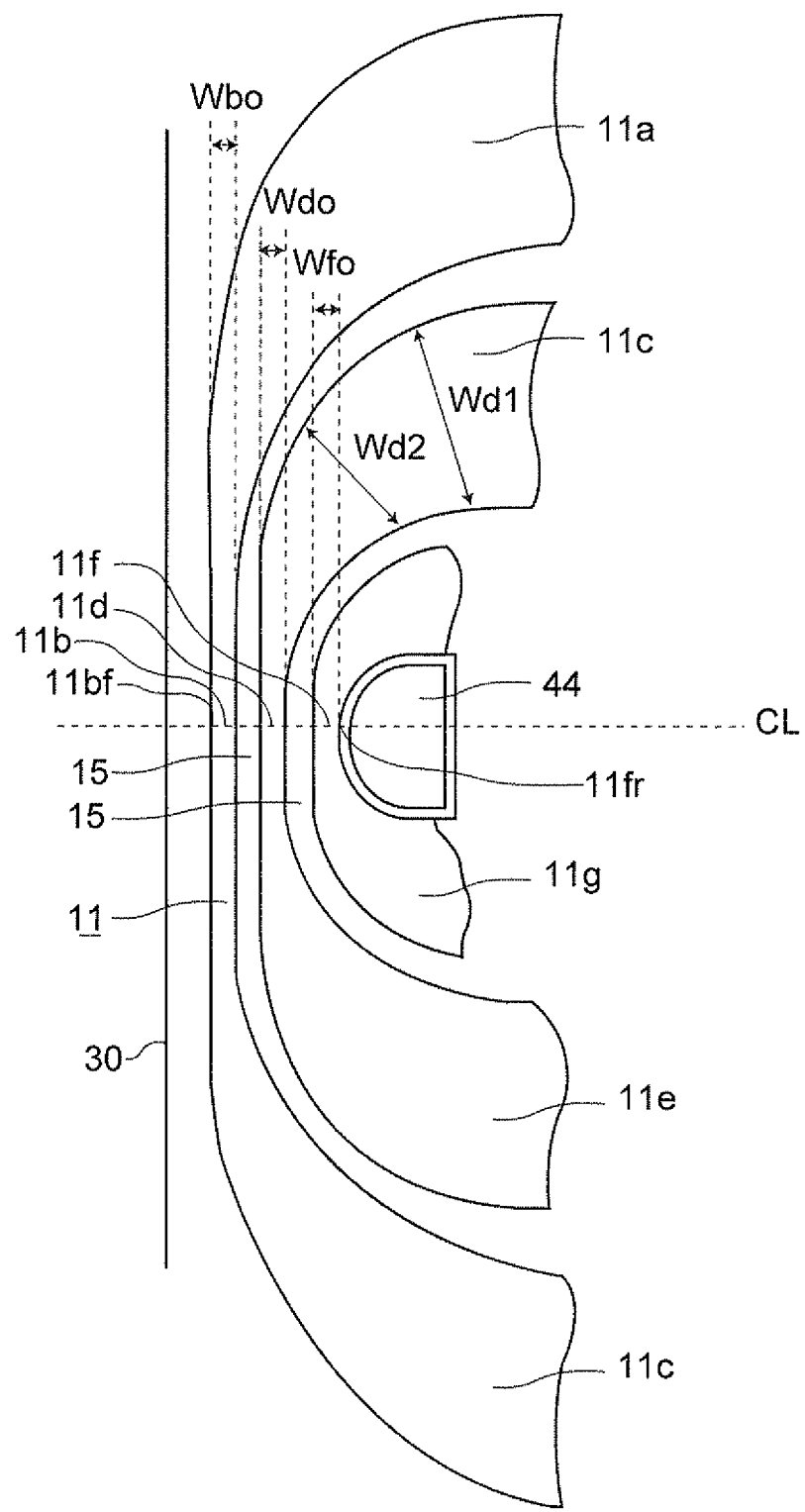
FIG. 6 is a plan view illustrating a principal part of the lower thin-film coil.

In the thin-film magnetic head 300, a hard guard frame layer 49 surrounds a lower thin-film coil 11 as a flat spiral as illustrated in FIG. 3 from outside, and the hard guard frame layer 49 restrains the lower thin-film coil 11 which tends to spread outward to suppress the partial protrusion of the ABS 30 due to the expansion of a photoresist layer 15. Note that FIG. 3 is a plan view illustrating the lower thin-film coil 11, the hard guard frame layer 49 and a lower front shield part 41, and FIG. 4 is a sectional view taken along the line 4-4 of FIG. 3. Further, FIG. 5 is a plan view illustrating an upper thin-film coil 51, and FIG. 6 is a plan view illustrating a principal part of the lower thin-film coil 11.

The thin-film magnetic head 300 comprises a substrate 1 and reproducing and recording heads laminated on the substrate 1, while having the ABS 30 as a medium-opposing surface opposing a recording medium.

The following will explain structures of main parts of the thin-film magnetic head 300, while structures of parts other than the main parts will later be explained in manufacturing steps.

The reproducing head has an MR device 5, arranged near the ABS 30, for detecting a magnetic signal. The reproducing head has an insulating layer 2 formed on the substrate 1, a lower shield layer 3 made of a magnetic material, and a shield gap film 4 shielding the MR device 5. The reproducing head further has an upper shield layer 6 made of a magnetic material formed on the shield gap film 4, and an insulating layer 7 formed on the upper shield layer 6. The reproducing head is arranged in a position closer to the substrate 1 than the recording head.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The upper shield layer 6 has an insulating part 6b in the middle thereof. Further, a first shield part 6a is formed on the lower side of the insulating part 6b and a second shield part 6c is formed on the upper side of the insulating part 6b.

In the thin-film magnetic head 300, a heating part 8 is formed in the insulating layer 2. The heating part 8 is also called a DFH (Disk flying heater) and has a function of generating heat by electric current flowing therethrough and conducting the heat to the upper shield layer 6 and the like. Further, a heat sensing part 9 is formed in the insulating layer 7. The heat sensing part 9 is also called an HDI (Head Disk Interlayer) sensor. The heat sensing part 9 is formed using an element which senses heat (temperature) near the upper shield layer 6 and changes in resistance value according to the sensed heat.

Further, in the thin-film magnetic head 300, the heating part 8 heats the upper shield layer 6 and the lower shield layer 3. The upper shield layer 6 and the lower shield layer 3 expand in volume by the heat received from the heating part 8. As a result, assuming that the upper shield layer 6 and the lower shield layer 3 come into contact with a recording medium not illustrated in FIG. 1, parts of the upper shield layer 6 and the lower shield layer 3 near the ABS 30 become heated due to friction. In the thin-film magnetic head 300, a judgment whether or not the upper shield layer 6 and the lower shield layer 3 have come into contact with the recording medium is made by detecting the change in resistance value of the heat sensing part 9 caused by the friction heat. Further, the frying height is controlled while controlling the current value flowing through the heating part 8 according to the judgment result.

The recording head has a lower thin-film coil 11, an opposing insulating layer 20, a main magnetic pole layer 26, a gap layer 29, a shield magnetic layer 40, a hard guard frame layer 49, an upper thin-film coil 51, an write shield layer 60, an upper yoke layer 65, a displacement suppression layer 85 and protective insulating layer 90, which are laminated on the substrate 1.

In the thin-film magnetic head 300, the lower thin-film coil 11 and the upper thin-film coil 51 form a continuous thin-film coil. The lower thin-film coil 11 corresponds to a part of the continuous thin-film coil, disposed closer to the substrate 1 than is the main magnetic pole layer 26. Therefore, the lower thin-film coil 11 corresponds to a lower coil layer according to the embodiment of the present invention. The upper thin-film coil 51 corresponds to a part of the continuous thin-film coil, arranged farther from the substrate 1 than is the main magnetic pole layer 26. Therefore, the upper thin-film coil 51 corresponds to an upper coil layer according to the embodiment of the present invention.

Further, the lower thin-film coil 11 is a part of the continuous thin-film coil, equidistant from the substrate 1. The lower thin-film coil 11 corresponds to an equidistant coil part, according to the embodiment of the present invention. The upper thin-film coil 51 is also a part of the continuous thin-film coil, equidistant from the substrate 1. The upper thin-film coil 51 also corresponds to an equidistant coil part, according to the embodiment of the present invention.

As illustrated in FIG. 3, the lower thin-film coil 11 has three turn parts 11b, 11d, 11f. The turn parts 11b, 11d, 11f are arranged between a later-described lower front shield part 41 and a first rear shield part 44. The lower thin-film coil 11 has a structure which the turn parts 11b, 11d, 11f align with each other while interposing a photoresist layer 15 therebetween. Since the turn part 11b is arranged at a closest position to the ABS 30 of the turn parts 11b, 11d, 11f, the turn part 11b corresponds to a front turn part. The turn part 11f corresponds to a rear turn part.

The lower thin-film coil 11 has a loop part 11a extending from a lead part 13A to the turn part 11b, a one-loop part 11c extending from the turn part 11b to the turn part 11d, and a one-loop part 11e extending from the turn part 11d to a turn part 11f, and a half-loop part 11g extending from the turn part 11f to a connecting part 11h.

The lower thin-film coil 11 is constructed as a continuous line from the lead part 13A to the connecting part 11h, so as to be wound as a flat spiral about the shield magnetic layer 40, thus forming a three-turn loop as a whole. For convenience of illustration, FIG. 1 illustrates only the turn parts 11b, 11d, 11f and connecting part 11h in the lower thin-film coil 11. Each of the turn parts 11b, 11d, 11f has a longitudinally long structure in which the thickness (height in a direction (upper and lower direction) along with the ABS 30) greater than the lateral width. Note that the lateral width means width in a direction (intersecting direction) intersecting the ABS 30, in this embodiment.

In the lower thin-film coil 11, as illustrated in FIG. 6, the one-loop part 11c has a variable width structure in which the width gradually decreases toward the ABS 30 and becomes the smallest at the position closest to the ABS 30. Namely, when widths Wd1, Wd2, Wd0 are defined in the one-loop part 11c as illustrated in FIG. 6, Wd1>Wd2>Wd0. The narrowest part in the one-loop part 11c is the turn part 11d. The loop part 11a and the one-loop part 11e have a variable width structure similar to that of the one-loop part 11c, while the narrowest part is the turn part 11b, 11f. Here, the respective widths of the turn parts 11b, 11d, 11f are Wb0 (about 0.9 µm), Wd0 (about 0.9 µm) and Wf0 (about 0.9 µm).

The lower thin-film coil 11 forms a following continuous 3-turn loop. Namely, the lead part 13A is connected to the connecting part 11h through the loop part 11a, the one-loop part 11c, one-loop part 11e and the half-loop part 11g, whereby the 3-turn loop is formed.

Note that the distance from a front side face 11bf of the turn part 11b to the ABS 30 means a front distance of the lower thin-film coil 11, in FIG. 6. Besides, the distance from a rear side face 11fr of the turn part 11f to the ABS 30 means a rear distance of the lower thin-film coil 11.

Further, the thin-film magnetic head 300 has the hard guard frame layer 49. As illustrated in FIG. 3, FIG. 4, the hard guard frame layer 49 surrounds the lower thin-film coil 11 from outside. Further, the hard guard frame layer 49 is in direct contact with almost whole outside surfaces 11af, 11cf of the lower thin-film coil 11.

The lower thin-film coil 11 is wound as a flat spiral about the first rear shield part 44 such that the loop part 11a is disposed on the ABS 30 side and the one-loop part 11c is disposed on the side distanced from the ABS 30 on the outermost side. The side surfaces on the outside of them (outside surfaces) 11af, 11cf define the outer shape of the lower thin-film coil 11, and the hard guard frame layer 49 is in contact with almost the whole outside surfaces 11af, 11cf. An insulating layer 19 is in contact, on the ABS 30 side, with the outside surfaces 11af, 11cf, and the hard guard frame layer 49 is not in contact with the outside surfaces 11af, 11cf at parts where the insulating layer 19 is in contact with them. However, the hard guard frame layer 49 is in contact with the whole outside surfaces 11af, 11cf at parts of the lower thin-film coil 11 which are distanced more from the ABS 30 than is the main magnetic pole layer 26. As illustrated in FIG. 4, the hard guard frame layer 49 has a thickness equal to the thickness of the lower thin-film coil 11.

The hard guard frame layer 49 has a wraparound end part 49a. The wraparound end part 49a is a part which is wrapped around to the ABS 30 side of the lower thin-film coil 11. The wraparound end part 49a is in direct contact with the outside surfaces 11af, 11cf. The wraparound end part 49a is inserted in a gap between the lower thin-film coil 11 and the lower front shield part 41, and formed in a tapered shape such that the width thereof narrows as it gets closer from the outside of the lower thin-film coil 11 to a later-described first rear shield part 44 along the ABS 30.

Further, the hard guard frame layer 49 is formed using a hard nonmagnetic material having a higher Vickers hardness than that of alumina constituting the opposing insulating layer 20. For example, since SiC (silicon carbide) has a Vickers hardness higher than that of alumina, the hard guard frame layer 49 can be formed using SiC.

Next, the upper thin-film coil 51 will be explained. As illustrated in FIG. 5, the upper thin-film coil 51 has three turn parts 51g, 51e, 51c. The turn parts 51g, 51e, 51c are arranged between a later-described upper front shield part 62 and a rear shield part 64. The upper thin-film coil 51 has a structure which the turn parts 51g, 51e, 51c align with each other while interposing a photoresist layer 55 therebetween. Since the turn part 51g is arranged at a closest position to the ABS 30 of the turn parts 51g, 51e, 51c, the turn part 51g corresponds to a front turn part. The turn part 51c corresponds to a rear turn part.

The upper thin-film coil 51 has a loop part 51b extending from a connecting part 51a to the turn part 51c, a one-loop part 51d extending from the turn part 51c to the turn part 51e, and a one-loop part 51f extending from the turn part 51e to a turn part 51g, and a half-loop part 51h extending from the turn part 51g to a lead part 14A.

The upper thin-film coil 51 is constructed as a continuous line from the connecting part 51a to the lead part 14A, so as to be wound as a flat spiral about the write shield layer 60, thus forming a three-turn loop as a whole. For convenience of illustration, FIG. 1 illustrates only the turn parts 51g, 51e, 51c and the connecting part 51a in the upper thin-film coil 51. Each of the turn parts 51g, 51e, 51c has the longitudinally long structure and the variable width structure similarly to the turn parts 11b, 11d, 11f. The narrowest part in the one-loop part 51f, one-loop part 51d and the loop part 51b are the turn part 51g, 51e, 51c respectively.

The upper thin-film coil 51 forms a following continuous 3-turn loop. Namely, the connecting part 51a is connected to the lead part 14A through the loop part 51b, the one-loop part 51d, one-loop part 51f and the half-loop part 51h, whereby the 3-turn loop is formed.

Figure 26:
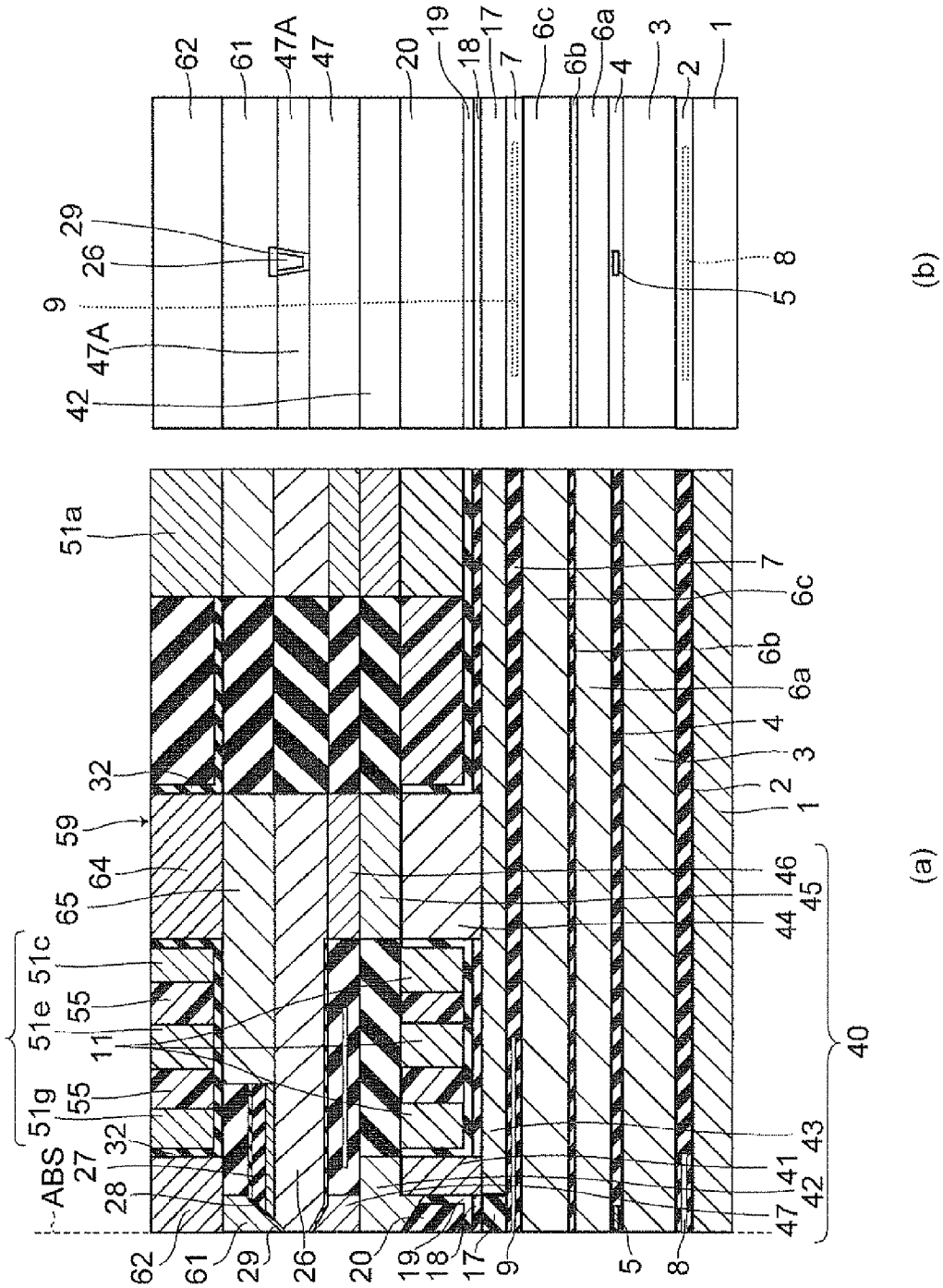
FIG. 26 illustrates a step subsequent to that of FIG. 25, in which (a) is a sectional view corresponding to FIG. 1, in which (b) is a front view corresponding to FIG. 2.
Figure 27:
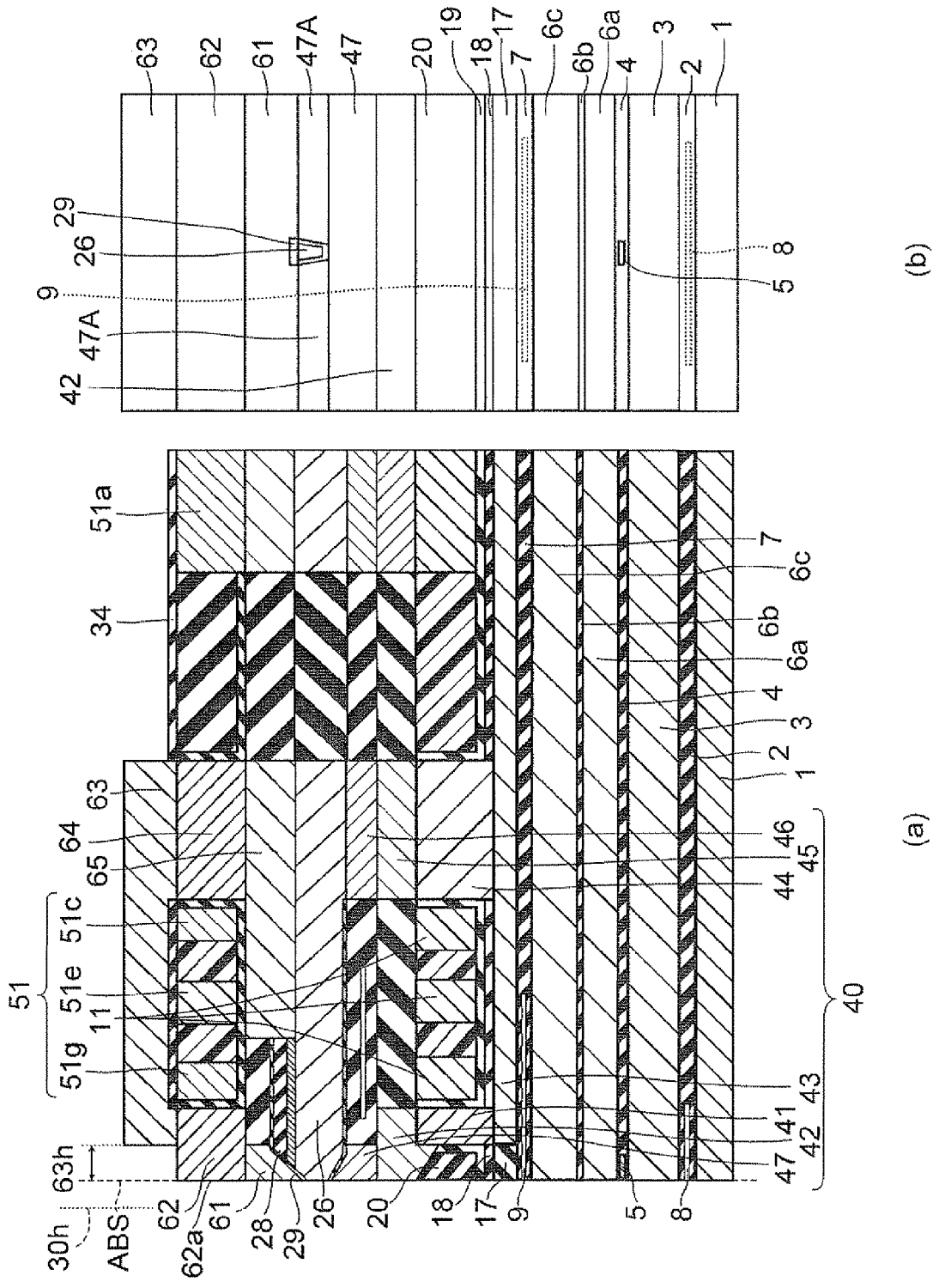
FIG. 27 illustrates a step subsequent to that of FIG. 26, in which (a) is a sectional view corresponding to FIG. 1, in which (b) is a front view corresponding to FIG. 2.
Figure 28:
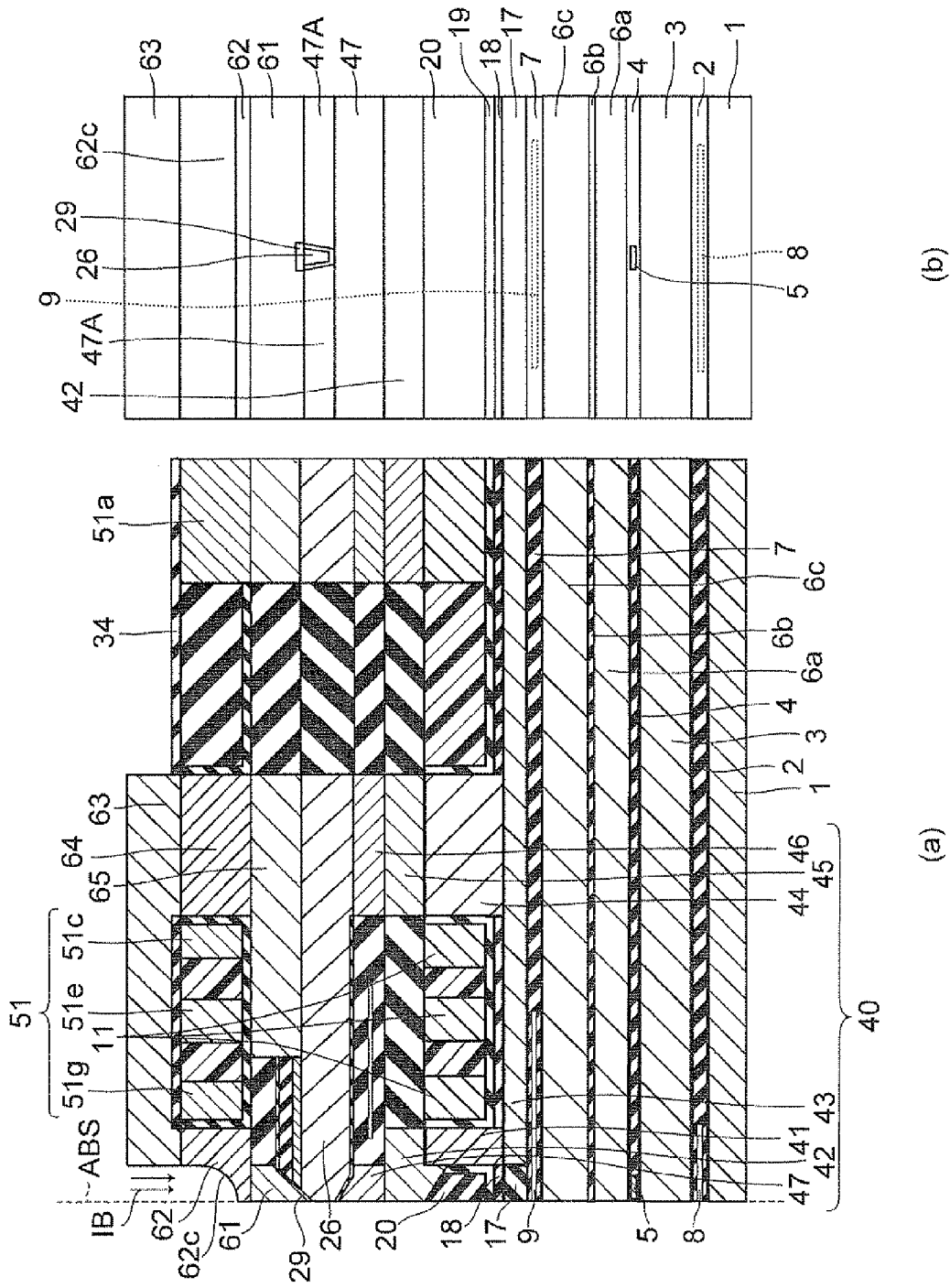
FIG. 28 illustrates a step subsequent to that of FIG. 27, in which (a) is a sectional view corresponding to FIG. 1, in which (b) is a front view corresponding to FIG. 2.

Further, as illustrated in FIG. 1, the upper thin-film coil 51 has an upper end face 51A. The upper end face 51A is disposed at a position most distanced from the substrate 1. The upper end face 51A is formed without level difference to a later-described shield upper end face 62f to form a common flat surface 59 (see FIG. 26) together with the shield upper end face 62f. Further, the upper thin-film coil 51 is connected to an upper face of a later-described upper yoke layer 65 via only the interlayer insulating layer 32. The upper thin-film coil 51 is connected to the upper yoke layer 65 without a magnetic layer made of a magnetic material intervening therebetween.

In the thin-film magnetic head 300, the connecting part 11h of the lower thin-film coil 11 is connected to the connecting part 51a of the upper thin-film coil 51. By this, the lower thin-film coil 11 and the upper thin-film coil 51 form a continuous of coils. A current corresponding to data to be recorded on a recording medium is flowed through the lower thin-film coil 11 and the upper thin-film coil 51, a recording magnetic field is generated by the current.

Figure 7:
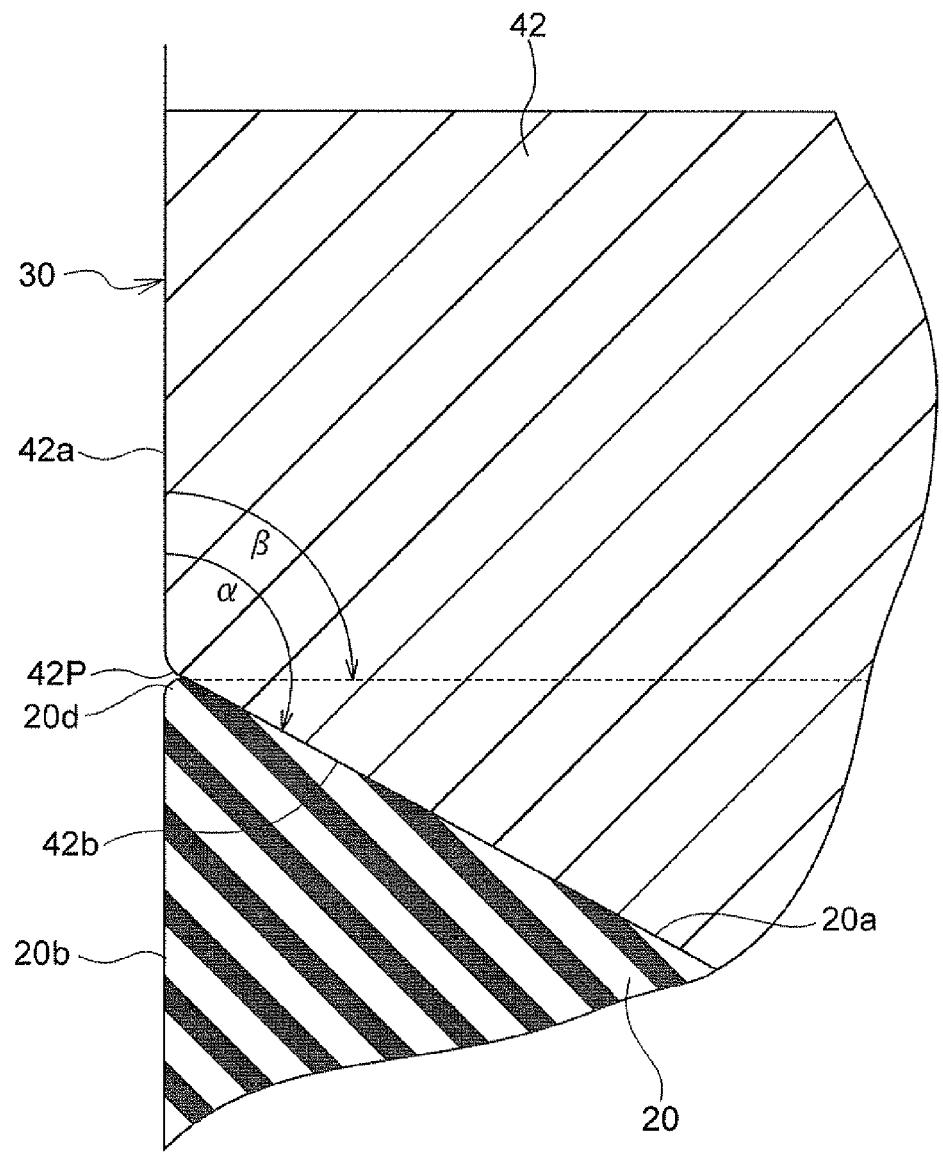
FIG. 7 is a sectional view illustrating an enlarged principal part of the ABS.
Figure 12:
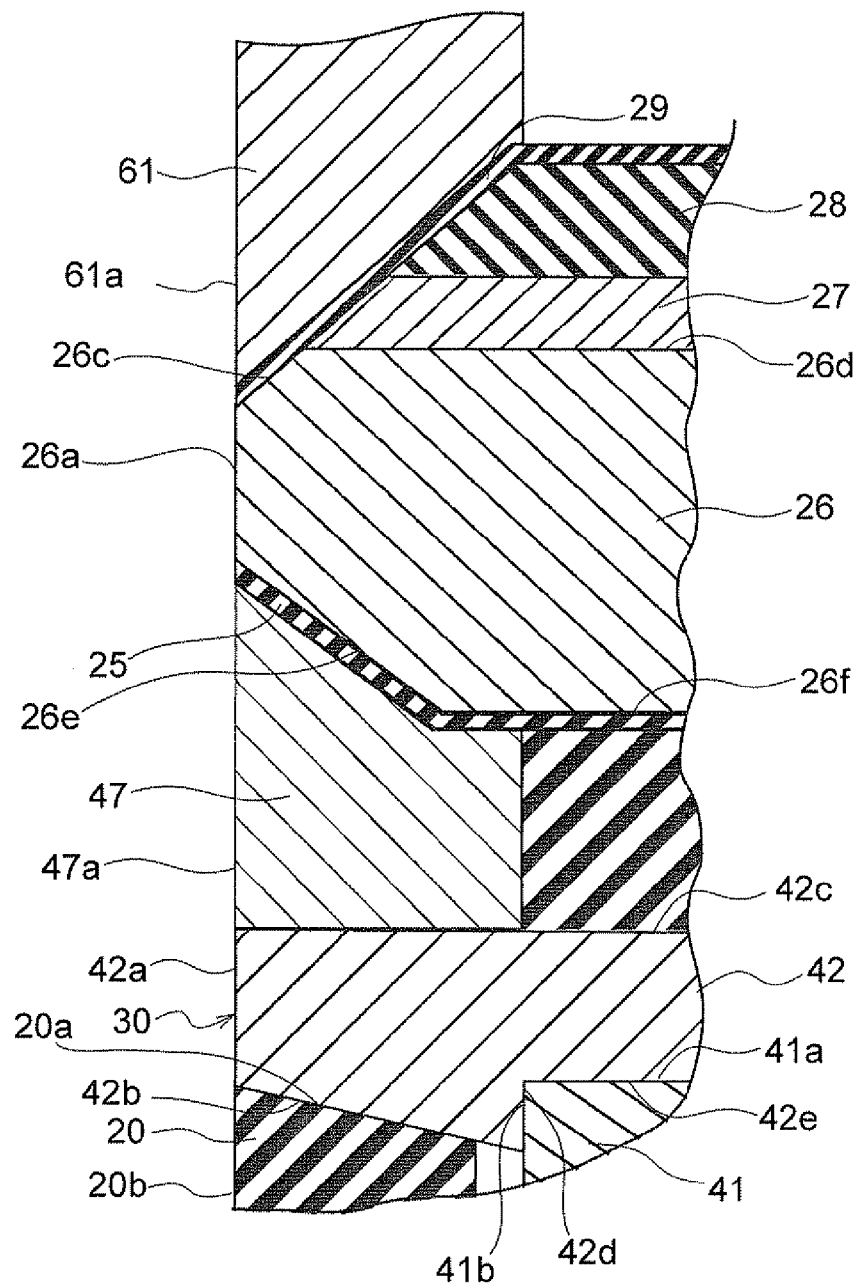
FIG. 12 is a sectional view illustrating a principal part of FIG. 1.
Figure 13:
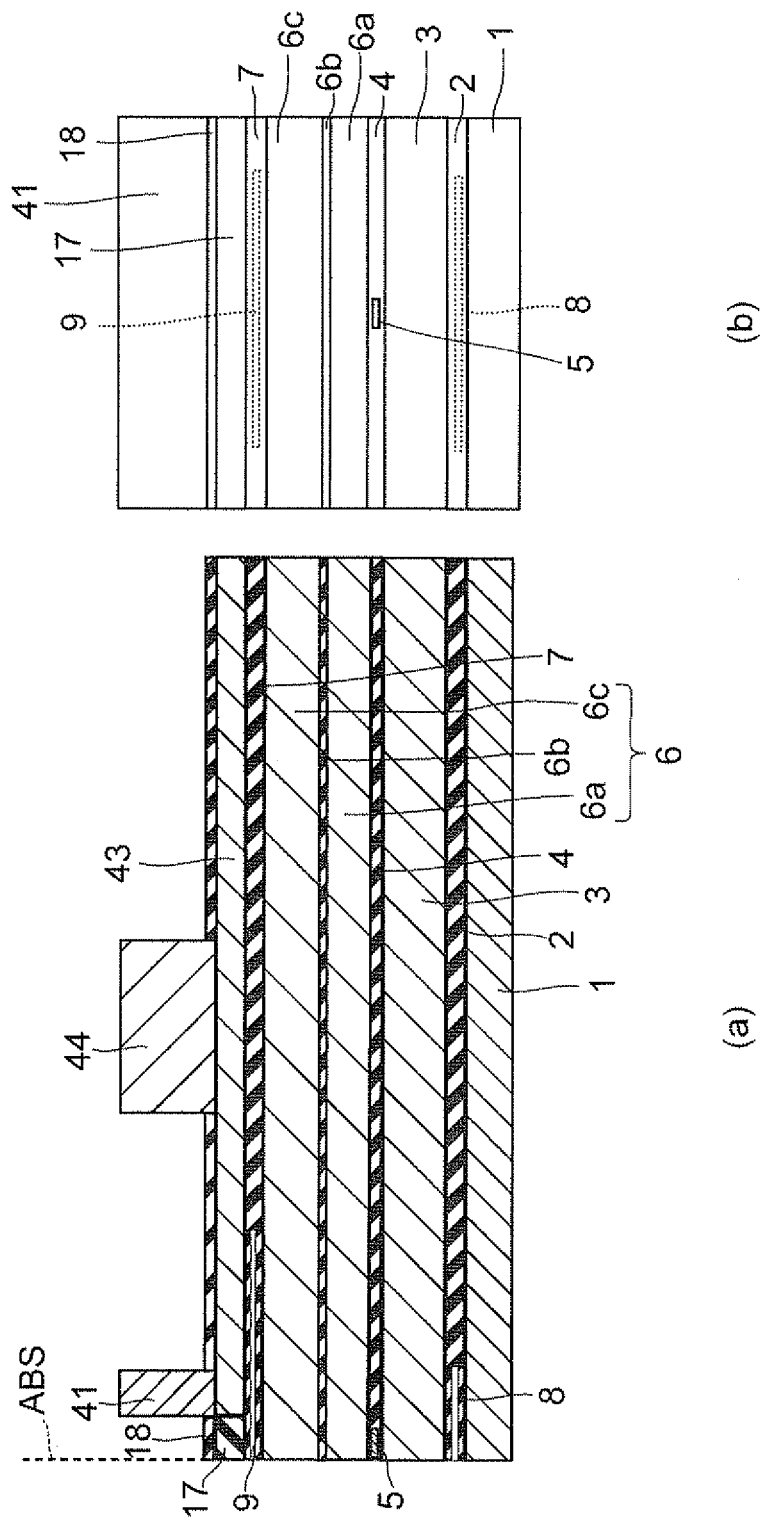
FIG. 13 illustrates a step of manufacturing the thin-film magnetic head illustrated in FIG. 1, in which (a) is a sectional view corresponding to FIG. 1, in which (b) is a front view corresponding to FIG. 2.
Figure 14:
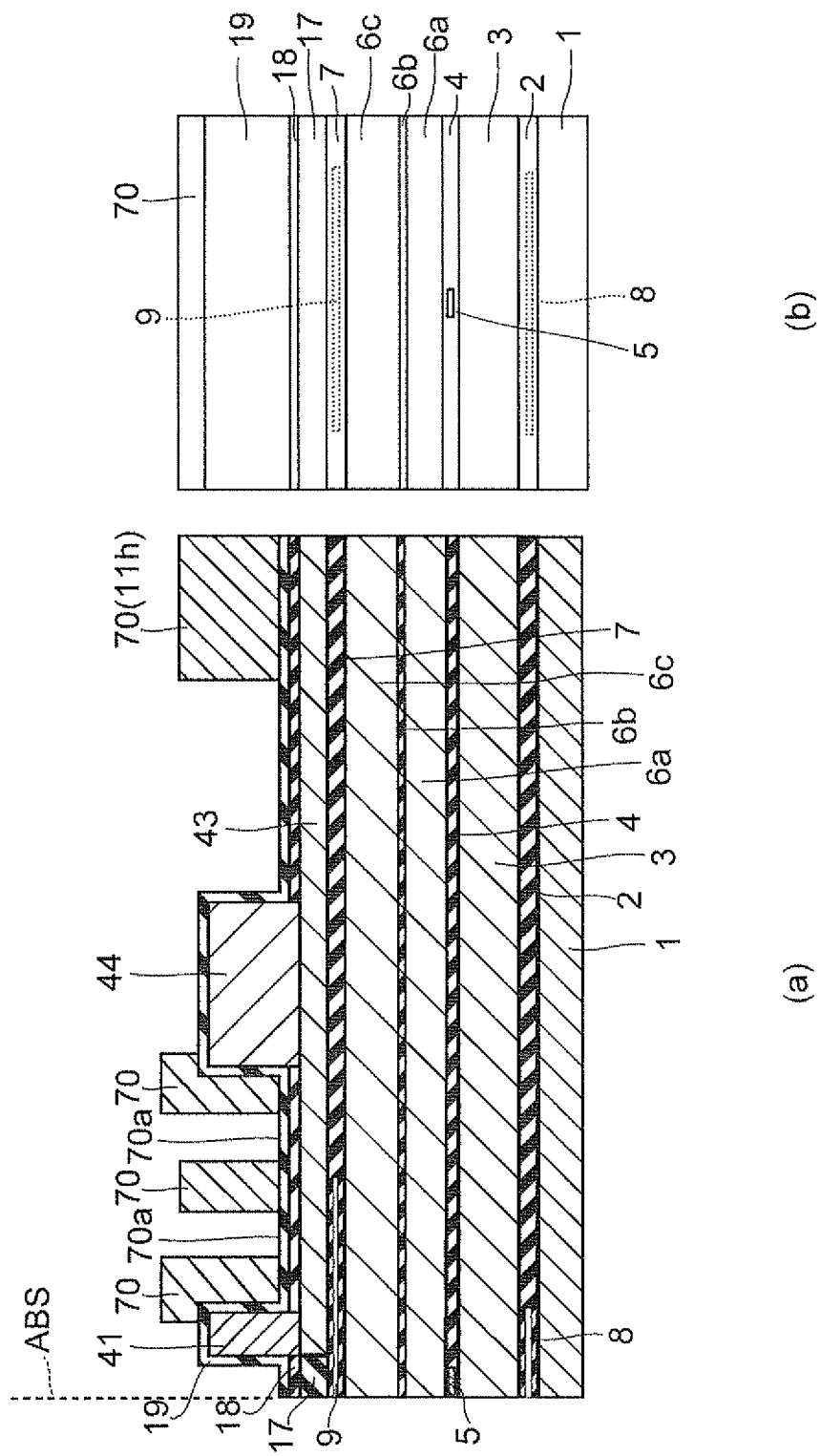
FIG. 14 illustrates a step subsequent to that of FIG. 13, in which (a) is a sectional view corresponding to FIG. 1, in which (b) is a front view corresponding to FIG. 2.
Figure 15:
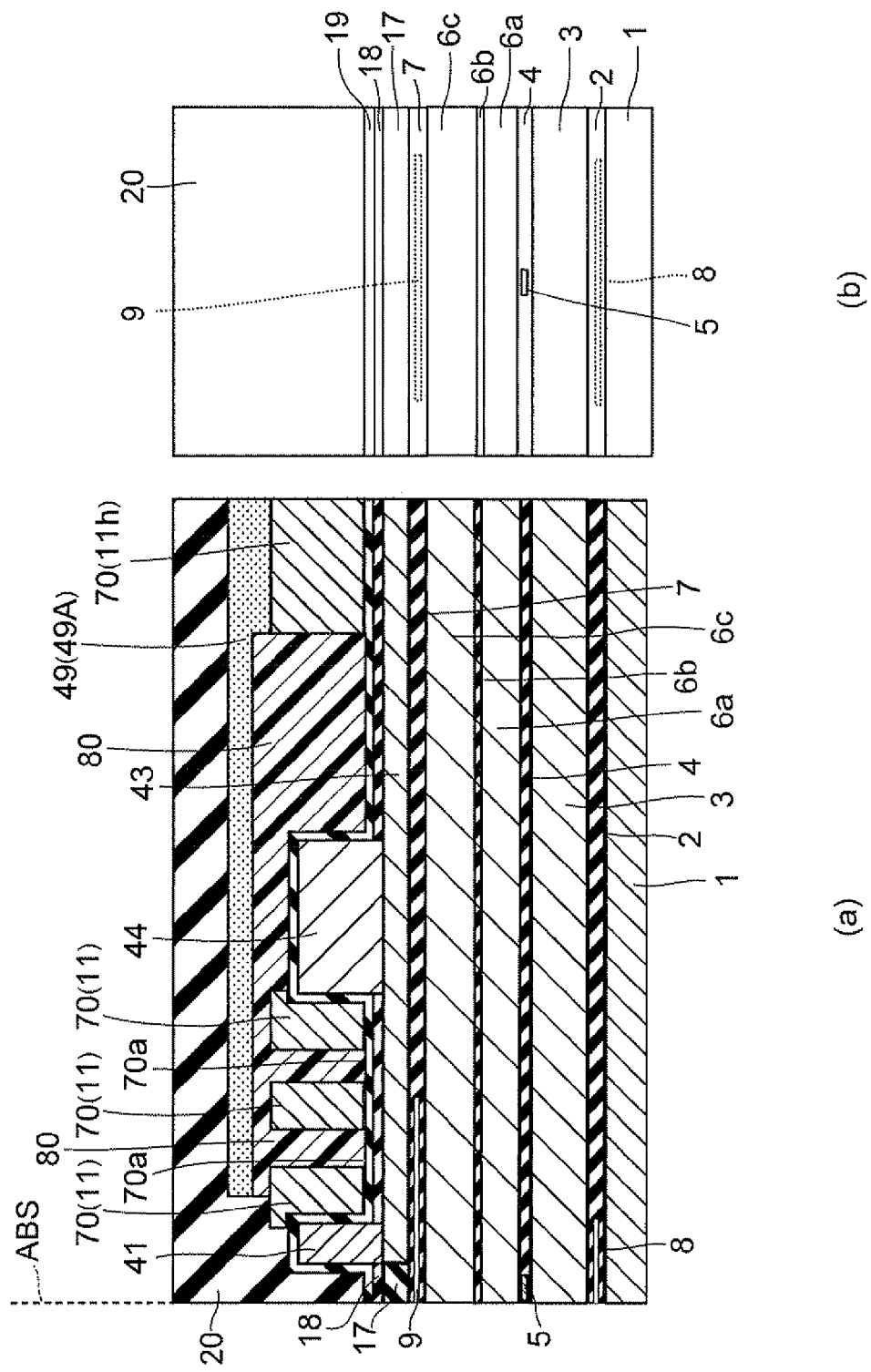
FIG. 15 illustrates a step subsequent to that of FIG. 14, in which (a) is a sectional view corresponding to FIG. 1, in which (b) is a front view corresponding to FIG. 2.
Figure 16:
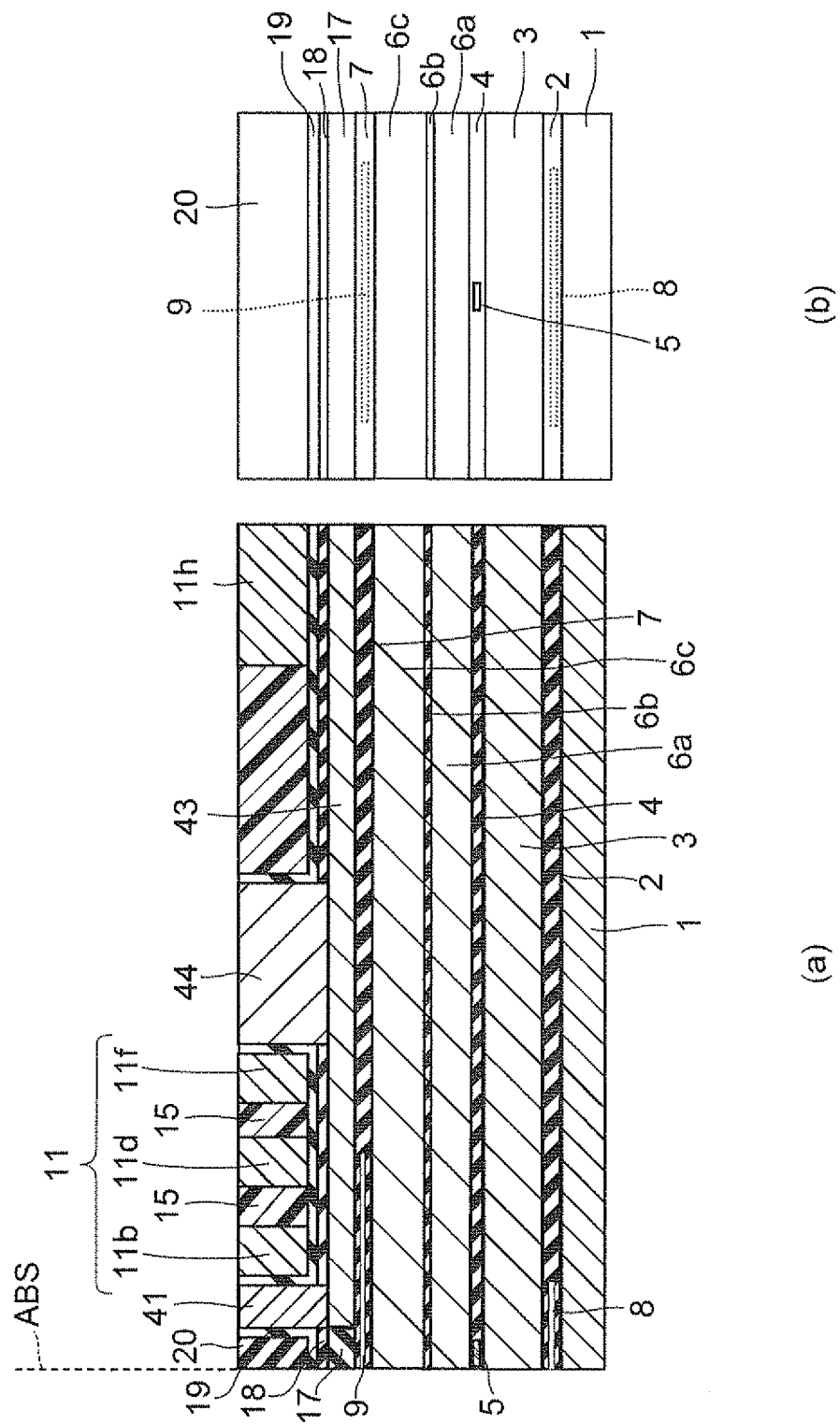
FIG. 16 illustrates a step subsequent to that of FIG. 15, in which (a) is a sectional view corresponding to FIG. 1, in which (b) is a front view corresponding to FIG. 2.
Figure 17:
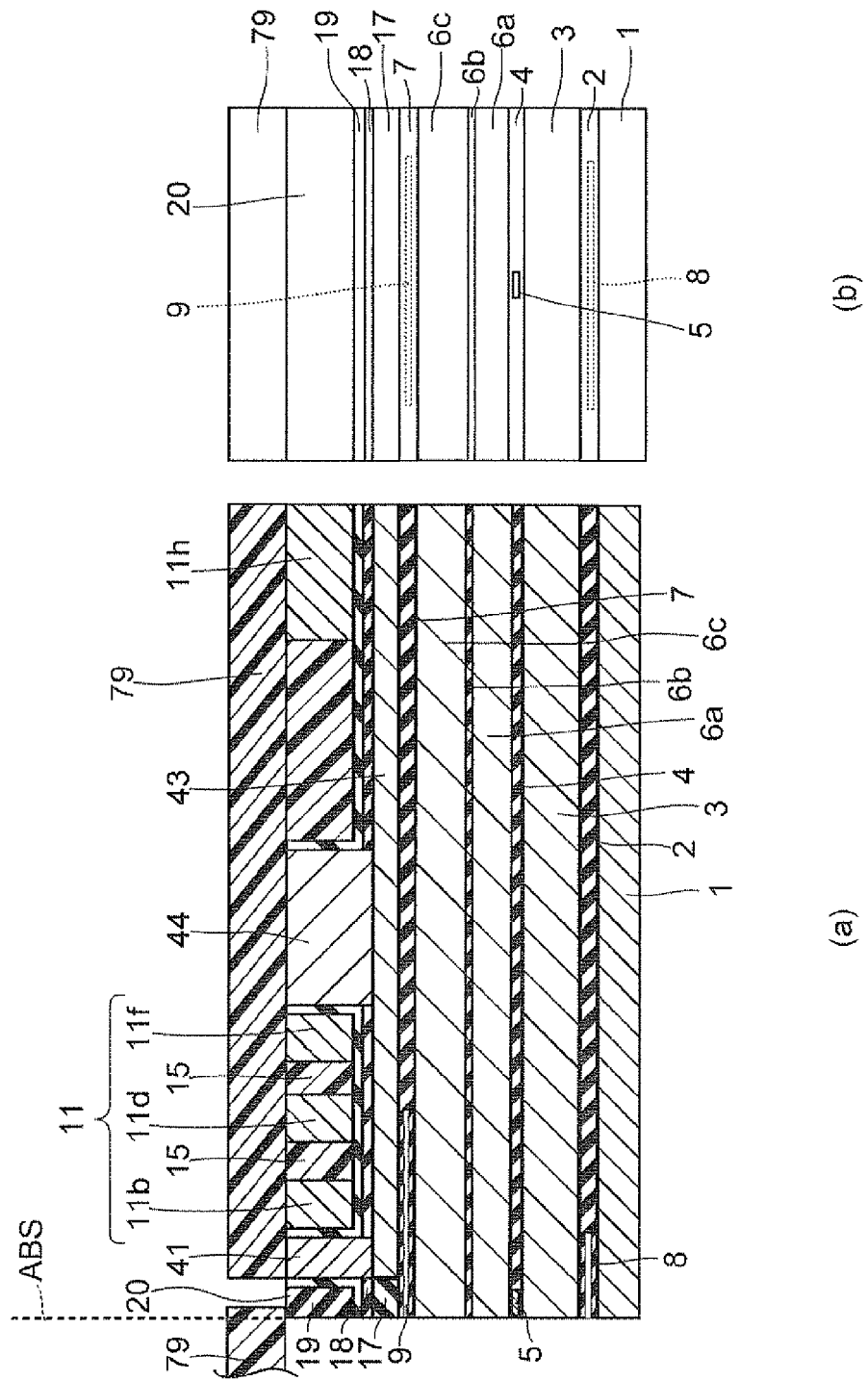
FIG. 17 illustrates a step subsequent to that of FIG. 16, in which (a) is a sectional view corresponding to FIG. 1, in which (b) is a front view corresponding to FIG. 2.
Figure 18:
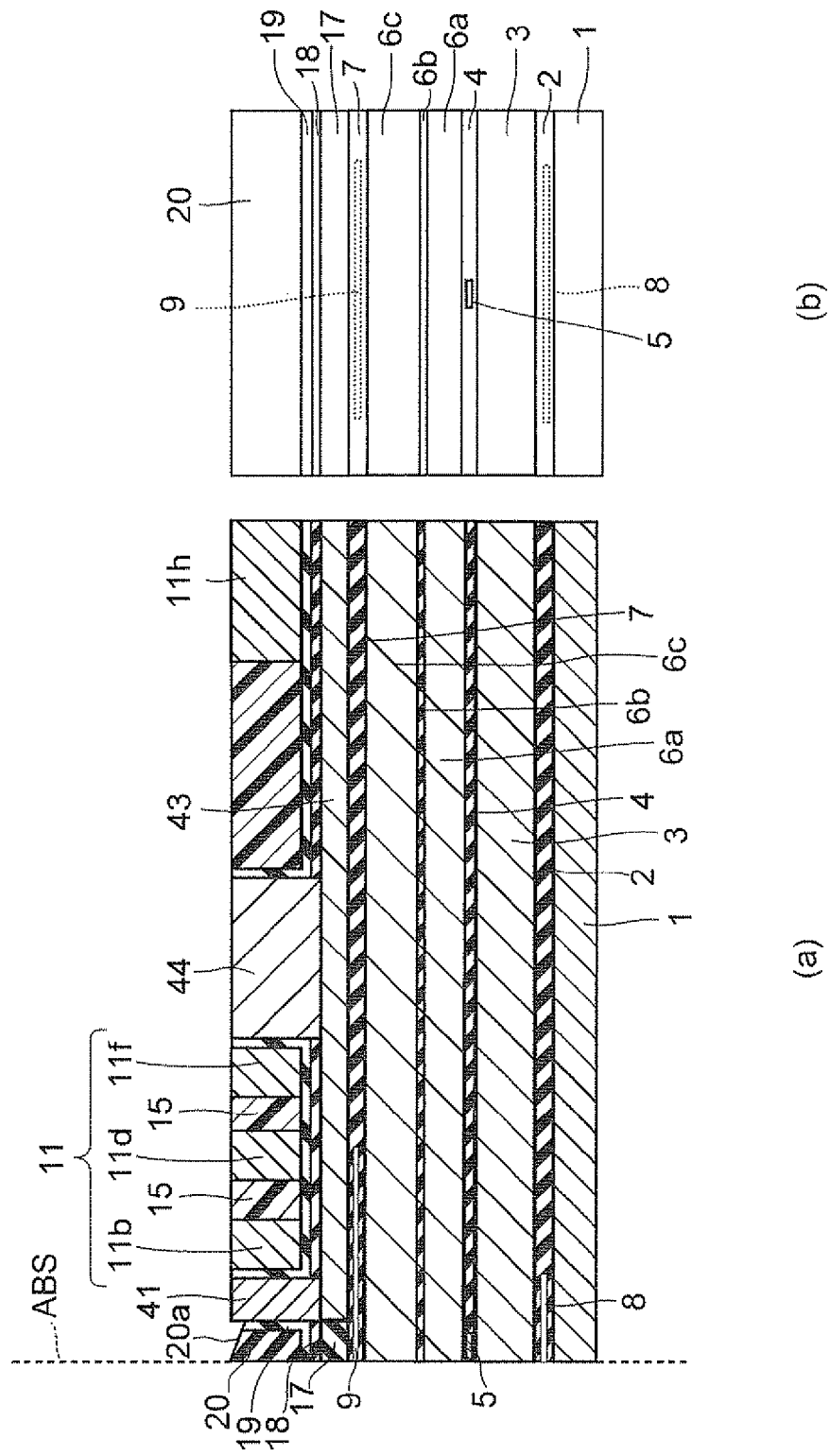
FIG. 18 illustrates a step subsequent to that of FIG. 17, in which (a) is a sectional view corresponding to FIG. 1, in which (b) is a front view corresponding to FIG. 2.
Figure 19:
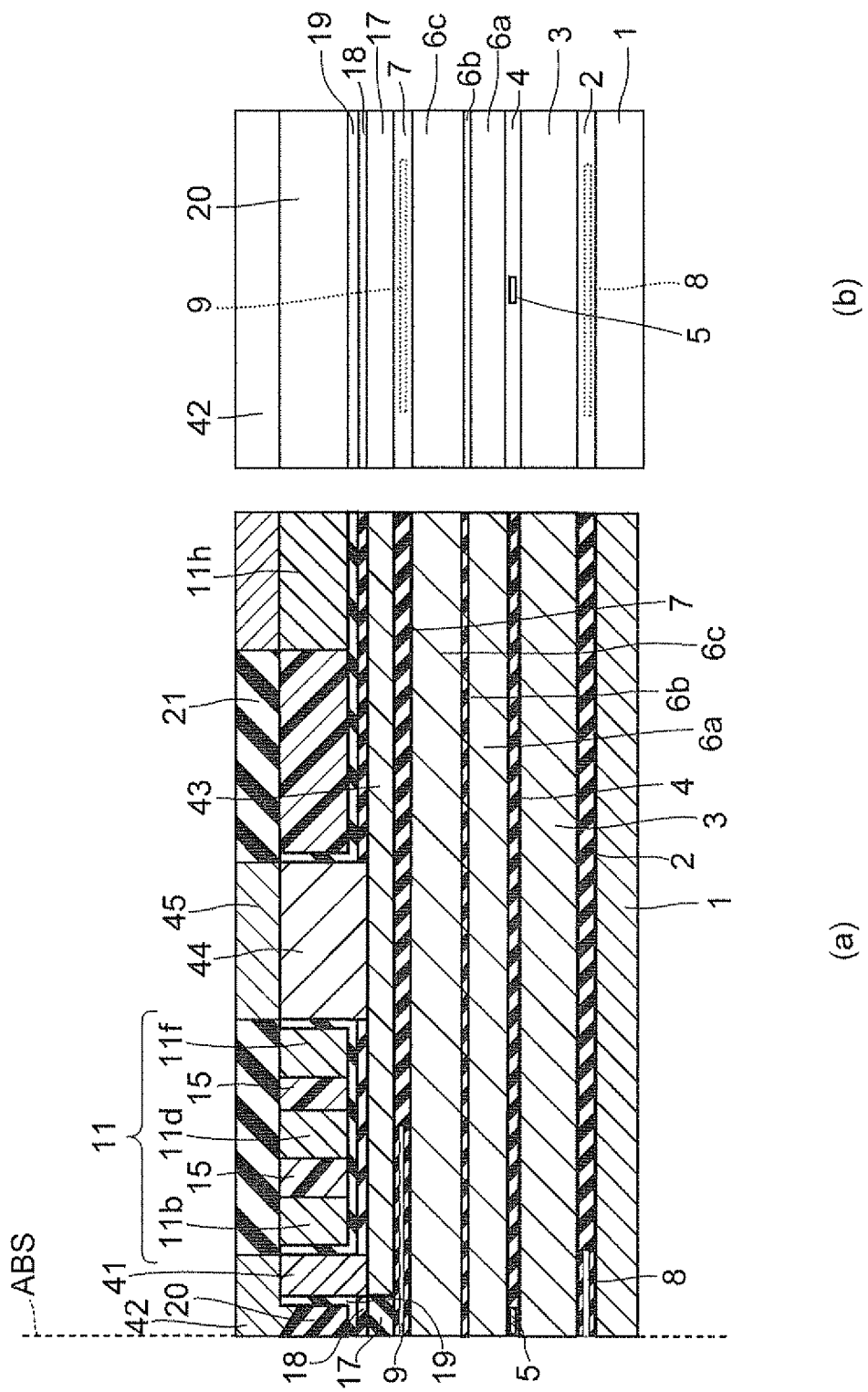
FIG. 19 illustrates a step subsequent to that of FIG. 18, in which (a) is a sectional view corresponding to FIG. 1, in which (b) is a front view corresponding to FIG. 2.

Subsequently, the opposing insulating layer 20 will be explained with reference to FIG. 7, FIG. 12. FIG. 7 is a sectional view illustrating an enlarged principal part of the ABS 30. FIG. 12 is a sectional view illustrating a principal part of FIG. 1. The opposing insulating layer 20 has a tilted upper end face 20a as illustrated in FIG. 7, FIG. 12.

This tilted upper end face 20a is in direct contact with a tilted lower end face 42b of a later-described connecting shield part 42. Further, the tilted upper end face 20a is formed in a descending slope like shape closer to the substrate 1 as it is distanced more from the ABS 30. The tilted upper end face 20a is formed with a fixed tilt from the ABS 30 to the later-described lower front shield part 41. The surface is a flat surface without irregularity.

Further, the whole tilted upper end face 20a is disposed at a position closer to the substrate 1 than is an upper end face 41a of the lower front shield part 41. The tilted upper end face 20a is made by scraping the surface of the insulating layer. The tilted upper end face 20a is formed to form a depression in the surface of the opposing insulating layer 20. In the depression, a later-described front end face 41b of the lower front shield part 41 emerges.

The opposing insulating layer 20 has a front end face 20b. The front end face 20b is disposed in the ABS 30. Further, in the opposing insulating layer 20, a chipped end part 20d is formed at a position closest to the connecting shield part 42 in the front end face 20b as illustrated in FIG. 7. The chipped end part 20d is formed by chipping a small part of the opposing insulating layer 20 when polishing and the like for forming the ABS 30 are performed in the step of manufacturing the thin-film magnetic head 300.

Next, the main magnetic pole layer 26 will be explained. The main magnetic pole layer 26 is formed using a magnetic material made of a ferromagnetic body such as NiFe, CoNiFe, CoFe or the like. The ferromagnetic body such as NiFe, CoNiFe, CoFe or the like has a high magnetic permeability. Therefore, a magnetic flux is likely to transmit through the main magnetic pole layer 26, much more magnetic flux transmit through the main magnetic pole layer 26. For this reason, more strong magnetic flux corresponding to the recording magnetic field is emitted from the main magnetic pole layer 26 to the ABS 30.

The main magnetic pole layer 26 has a magnetic pole end face 26a on the ABS 30 side, as illustrated in FIG. 2, FIG. 12. The magnetic pole end face 26a has a bevel form which is wider on the upper thin-film coil 51 side than on the lower thin-film coil 11 side and gradually decreases its width toward the lower thin-film coil 11. The width of the magnetic pole end face 26a on the upper thin-film coil 51 side defines the track width. The track width is about 0.06 to 0.12 μm, for example. The magnetic pole end face 26a is positioned on the ABS 30.

The main magnetic pole layer 26 includes a track width determining part having the magnetic pole end face 26a, a wider part and a width extending part. The track width determining part has a fixed width regardless of the distance from the ABS 30. The wider part is arranged at a position distanced more from the ABS 30 than is the track width determining part and has a width greater than that of the track width determining part. The wider part has the same width as that of the track width determining part at the boundary with the track width determining part, gradually increases the width as it is distanced more from the ABS 30. The width extending part has a fixed width greater than the wider part. In this embodiment, a part from the magnetic pole end part 26a until the width begins to increase is defined as the track width determining part.

Further, as illustrated in FIG. 12, in the main magnetic pole layer 26, an upper tilted surface 26c and a lower tilted surface 26e are formed in the track width determining part.

The upper tilted surface 26c is formed in an ascending slope like shape distanced more from the substrate 1 as it is distanced more from the ABS 30. The upper tilted surface 26c is connected to the magnetic pole end face 26a and an upper end face 26d.

The lower tilted surface 26e is formed in a descending slope like shape closer to the substrate 1 as it is distanced more from the ABS 30. The lower tilted surface 26e is connected to the magnetic pole end face 26a and the lower end face 26f of the wider part. The lower tilted surface 26e is formed from the track width determining part to wider part. The lower end face 26f is disposed on the nearest position to the substrate 1 in the main magnetic pole layer 26.

In the main magnetic pole layer 26, nonmagnetic layers 27, 28 are laminated on a part of the upper end face 26d between an opposing shield part 61 and the upper yoke layer 65 which will be explained later, as also illustrated in FIG. 1.

A length of the above-described track width determining part from the ABS 30 is referred to as neck height. The neck height is about 0.05 to 0.3 μm, for example.

The gap layer 29 is formed along the upper tilted surface 26c and the upper end face 26d of the main magnetic pole layer 26 between the opposing shield part 61, the insulating layer 31 and the main magnetic pole layer 26, the nonmagnetic layers 27, 28. The gap layer 29 is formed so as to cover the upper tilted surface 26c and the upper end face 26d. The gap layer 29 is made of a nonmagnetic insulating material such as alumina ($Al_2O_3$), nonmagnetic conductive material such as Ru, NiCu, Ta.

Figure 8:
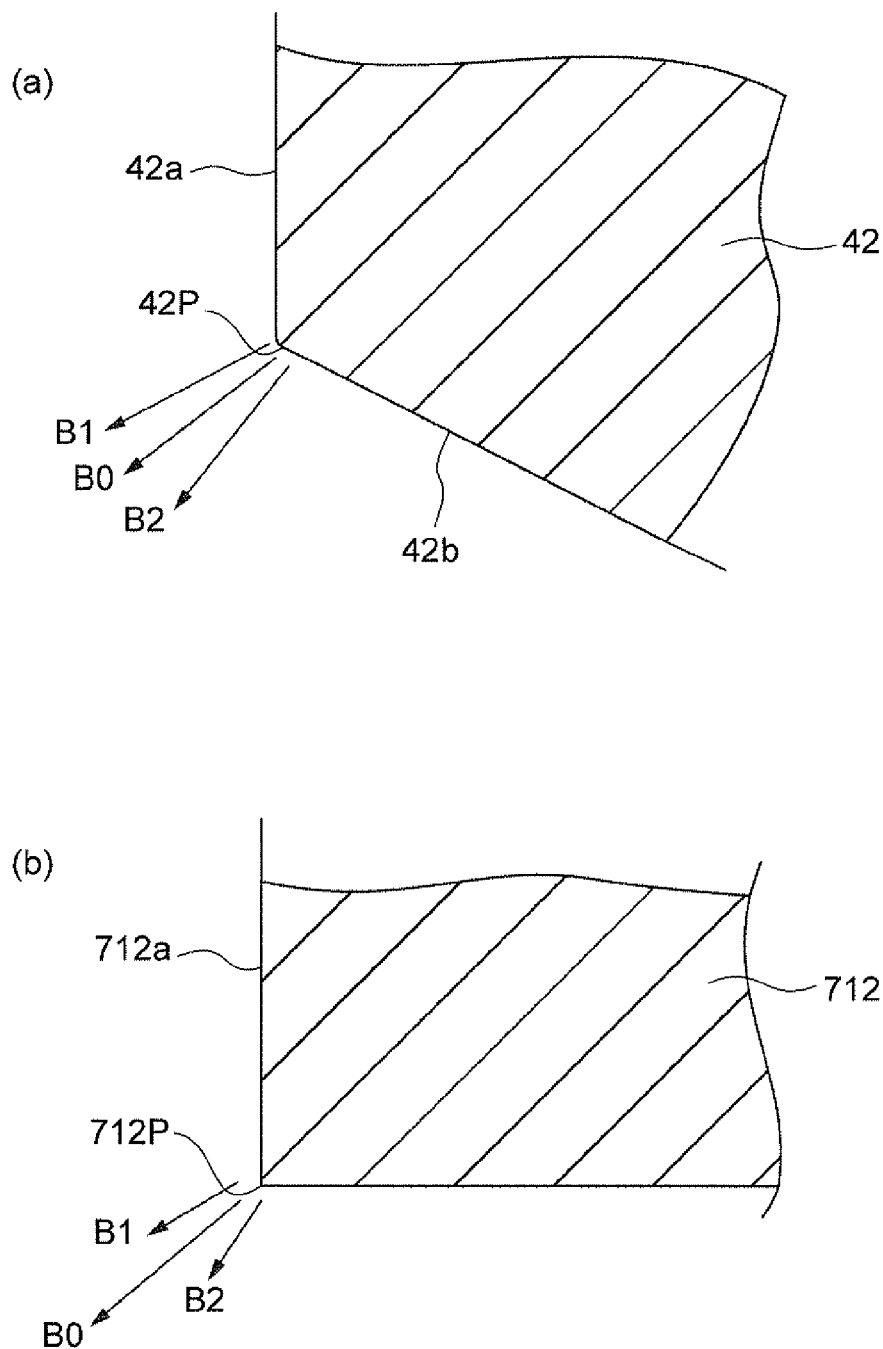
FIG. 8 (a) is a sectional view of a principal part of a connecting shield part according to an embodiment of the present invention with a part thereof omitted, FIG. 8 (b) is a sectional view of a principal part of a conventional connecting shield part with a part thereof omitted.

Next, the shield magnetic layer 40 will be explained with reference to FIG. 8 in addition to the drawings referenced to above-described explanation. Here, FIG. 8 (a) is a sectional view of a principal part of the connecting shield part 42 with a part thereof omitted, FIG. 8 (b) is a sectional view of a principal part of a conventional connecting shield part with a part thereof omitted.

As illustrated in FIG. 1, FIG. 2, the shield magnetic layer 40 is arranged substrate 1 side of the main magnetic pole layer 26. The shield magnetic layer 40 has the lower front shield part 41, the connecting shield part 42, a linking shield part 43, a first rear shield part 44, a second rear shield part 45, a third rear shield part 46, a leading shield part 47 and a side shield part 47A. The shield magnetic layer 40 is formed using a magnetic material made of a ferromagnetic body such as NiFe, CoNiFe, CoFe or the like.

The lower front shield part 41 and connecting shield part 42 are arranged closer to the ABS 30 than are the lower thin-film coil 11. Besides, one part of the connecting shield part 42 overlies the lower front shield part 41. The lower front shield part 41 is arranged at a position distanced from the ABS 30. But, the connecting shield part 42 has a shield end face 42a arranged within the ABS 30 (see FIG. 7).

Here, the lower front shield part 41 will be described in detail referring to FIG. 1, FIG. 12. The lower front shield part 41 connects the connecting shield part 42 and the linking shield part 43. The lower front shield part 41 is disposed at a position more distanced from the ABS 30 than is the opposing insulating layer 20.

The lower front shield part 41 has the upper end face 41a and the front end face 41b. In the lower front shield part 41, the upper end face 41a and the front end face 41b are connected to the connecting shield part 42. The upper end face 41a is disposed at a position most distanced from the substrate 1 in the lower front shield part 41. The front end face 41b is disposed at a position closest to the ABS 30 in the lower front shield part 41.

Next, the connecting shield part 42 will be explained in detail with reference to FIG. 1, FIG. 7, FIG. 12. The connecting shield part 42 has a front end face 42a, a tilted lower end face 42b, an upper end face 42c, a standing end face 42d, an intersecting end face 42e and a front end convex part 42P.

In the connecting shield part 42, the whole front end face 42a is disposed in the ABS 30. The tilted lower end face 42b is in direct contact with the above-described tilted upper end face 20a of the opposing insulating layer 20. The tilted lower end face 42b is formed, similarly to the tilted upper end face 20a, in a descending slope like shape closer to the substrate 1 as it is distanced more from the ABS 30. Further, the tilted lower end face 42*b* is formed with a fixed tilt from the ABS 30 to the lower front shield part 41. The surface is a flat surface without ruggedness.

Further, in the connecting shield part 42, a front end angle α illustrated in FIG. 7 is set at an obtuse angle. The front end angle α represents an angle formed between the front end face 42*a* and the tilted lower end face 42*b*. The front end angle α is an angle measured clockwise from the front end face 42*a* to the tilted lower end face 42*b*.

The upper end face 42*c* is disposed at a position most distanced from the substrate 1 in the connecting shield part 42. The whole upper end face 42*c* is formed flat. The standing end face 42*d* is formed at a position most distanced from the ABS 30 in the tilted lower end face 42*b*. The standing end face 42*d* is formed in a manner to stand along the ABS 30 from the tilted lower end face 42*b*. Further, the standing end face 42*d* is in direct contact with the front end face 41*b* of the lower front shield part 41. The intersecting end face 42*e* is formed flat along a direction intersecting the ABS 30 from the uppermost part of the standing end face 42*d*. Further, the intersecting end face 42*e* is in direct contact with the upper end face 41*a* of the lower front shield part 41.

Further, as illustrated in detail in FIG. 7, the front end convex part 42P corresponds to a corner part where the front end face 42*a* intersects the tilted lower end face 42*b*. The front end convex part 42P is a rounded convex-shape part and is formed by the front end face 42*a* and the tilted lower end face 42*b* gently intersecting each other, unlike the case that the front end angle is set at a right angle such as an angle β illustrated in FIG. 7.

The linking shield part 43 is formed such as to straddle the turn parts 11*b*, 11*d*, 11*f* of the lower thin-film coil 11, and connects the lower front shield part 41 and the first rear shield part 44 to each other. The linking shield part 43 has a function as a return pole which backs the magnetic flux emitted from the main magnetic pole layer 26.

The first, second, third rear shield parts 44, 45, 46 are arranged farther from the ABS 30 than are the turn parts 11*b*, 11*d*, 11*f* of the lower thin-film coil 11. The second rear shield part 45 overlies the first rear shield part 44, the third rear shield parts 46 overlies the second rear shield part 45. The first, second, third rear shield parts 44, 45, 46 form a three-stage structure in which their respective front side faces closer to the ABS 30 are equidistant from the ABS 30. The first, second, third rear shield parts 44, 45, 46 has a function as a linking part which link the linking part 43 to the main magnetic pole layer 26.

Next, the leading shield part 47 will be explained. The leading shield part 47 is connected to the connecting shield part 42, and the side shield parts 47A, 47A are formed on its upper face on the opposite side. The leading shield part 47 has a shield end face 47*a* arranged in the ABS 30 (see FIG. 12).

The side shield parts 47A, 47A are formed on the leading shield part 47. The side shield parts 47A, 47A are arranged on both sides in the track width direction of the main magnetic pole layer 26 respectively. The side shield parts 47A, 47A also have shield end faces 47Aa arranged in the ABS 30 respectively (see FIG. 2). The side shield parts 47A, 47A and the leading shield part 47 are formed to surround the magnetic pole end face 26*a* via a nonmagnetic thin-film 25 and arranged near the main magnetic pole layer 26.

Figure 9:
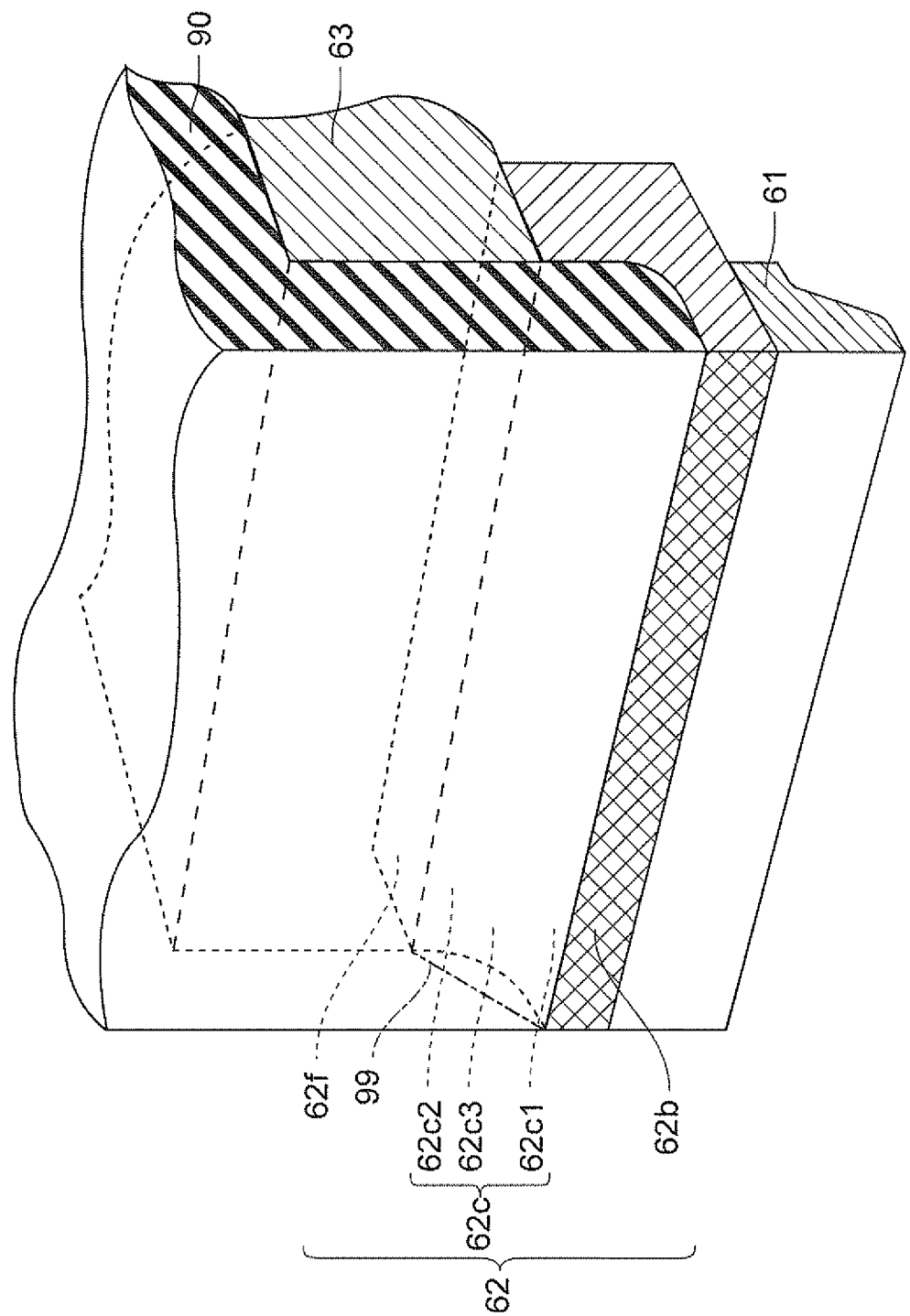
FIG. 9 is a perspective view illustrating principal parts of an opposing shield part, an upper front shield part and a linking shield part.
Figure 10:
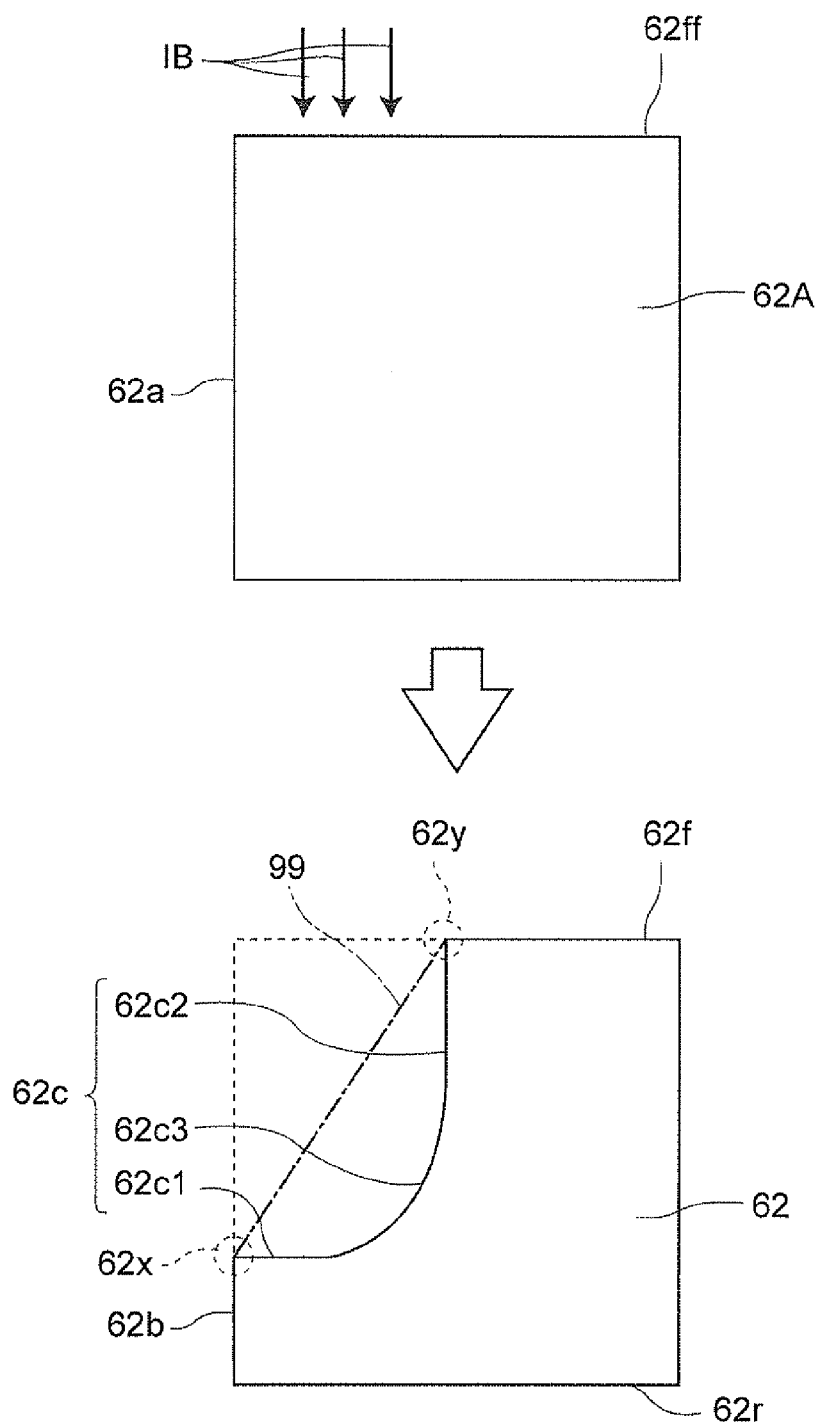
FIG. 10 is a side elevation view illustrating a pre-trim shield part and the upper front shield part.

Next, the write shield layer 60 will be explained with reference to FIG. 9 to FIG. 10, in addition to the drawings referenced to above-described explanation. Here, FIG. 9 is a perspective view illustrating principal parts of an opposing shield part 61, an upper front shield part 62 and a linking shield part 63. FIG. 10 is a side elevation view illustrating a pre-trim shield part and the upper front shield part. The write shield layer 60 has the opposing shield part 61, the upper front shield part 62, the linking shield part 63 and the rear shield part 64.

The opposing shield part 61 has end face exposed at the ABS 30. The opposing shield part 61 opposes the leading shield part 47 within the ABS 30. Besides, a very small space which the gap layer 29 is arranged is formed in the front end face of the opposing shield part 61 exposed at the ABS 30. A part of ABS 30 side of the gap layer 29 is formed in the very small space. The opposing shield part 61 is formed such as to oppose the main magnetic pole layer 26, nonmagnetic layer 27, and nonmagnetic layer 28 sequentially from the ABS 30 side through the gap layer 29. The opposing shield part 61 has a flat upper face, to which the upper front shield part 62 is connected.

The upper front shield part 62 is arranged closer to the ABS 30 than are the upper thin-film coil 51. This upper front shield part 62 will be explained in detail.

The upper front shield part 62 has a shield front end face 62*b*, a shield upper end face 62*f*, a shield connecting part 62*c*, and a shield lower end face 62*r*. The shield front end face 62*b* is disposed in the ABS 30. The shield front end face 62*b* is exposed in the ABS 30. In FIG. 9, a part with cross-hatching represents the shield front end face 62*b*. The shield upper end face 62*f* is disposed at a position distanced more from the substrate 1 than is the shield front end face 62*b*. The side distanced more from the substrate 1 is also called an upper side and the side closer to the substrate 1 is also called a lower side. The shield upper end face 62*f* is connected to the linking shield part 63. The shield upper end face 62*f* is formed along the direction intersecting the ABS 30. In addition, the shield upper end face 62*f* is formed separated from the ABS 30. The shield upper end face 62*f* has a size smaller than that of the shield lower end face 62*r*.

The shield connecting part 62*c* is a part connecting the shield front end face 62*b* to the shield upper end face 62*f*. The whole part of the shield connecting part 62*c* excepting a connecting part 62*x* with the shield front end face 62*b* is disposed at a position distanced from the ABS 30.

The shield connecting part 62*c* has a tilt structure tilted to be gradually distanced more from the ABS 30 as it gets closer, starting from the connecting part 62*x*, to a connecting part 62*y* connected to the shield upper end face 62*f*. The connecting part 62*x* is disposed in the ABS 30, but the connecting part 62*y* is disposed at a position distanced from the ABS 30 and thus receded from the ABS 30.

Further, as illustrated in FIG. 10, considering an imaginary flat surface 99 linking the connecting part 62*x* and the connecting part 62*y*, the flat surface 99 is a flat surface linking the shield front end face 62*b* and the shield upper end face 62*f* at a shortest distance. The shield connecting part 62*c* has a receding tilt structure tilted to be distanced more from the ABS 30 than is the flat surface 99. Further, the shield connecting part 62*c* has a lateral flat part 62*c*1, a longitudinal flat part 62*c*2, and a curved part 62*c*3 and has a structure that they are smoothly linked together into one body. The lateral flat part 62*c*1 is generally formed along the direction intersecting the ABS 30. The longitudinal flat part 62*c*2 is generally formed along the ABS 30.

The shield lower end face 62*r* is formed along the direction intersecting the ABS 30. The shield lower end face 62*r* has a size reaching the ABS 30. The shield lower end face 62*r* has a size larger than that of the shield upper end face 62*f*. The shield lower end face 62*r* is connected with the opposing shield part 61 on the ABS 30 side, and connected with the insulating layer 31 on the rear side of the shield lower end face 62r distanced more from the ABS 30.

The upper front shield part 62 has the above-described structure and therefore has an end face disposed in the ABS 30 that is smaller in size and in volume than that of the pre-trim front shield part 62A (the upper side in FIG. 10). The pre-trim front shield part 62A is a front shield part immediately before it is formed by performing a later-described trimming step. The pre-trim front shield part 62A has the shield upper end face 62f reaching the ABS 30 and has a pre-trim front end face 62a. Comparing the sizes of the pre-trim front end face 62a and the shield front end face 62b, the shield front end face 62b<the pre-trim front end face 62a.

Next, the linking shield part 63 will be explained. The linking shield part 63 is formed such as to straddle the turn part 51g, 51e, 51c of the upper thin-film coil 51. The linking shield part 63 is formed separated from the ABS 30. The linking shield part 63 is connected to the upper front shield part 62 and the rear shield part 64.

The rear shield part 64 is arranged at a position distanced more from the ABS 30 than is the turn part 51g, 51e, 51c of the upper thin-film coil 51. The rear shield part 64 is connected to the linking shield part 63 and the upper yoke layer 65. A height of the rear shield part 64 is equal to a height of the upper front shield part 62. Therefore, the rear shield part 64 forms a common flat surface 59 together with the upper thin-film coil 51 and shield upper end face 62f.

Figure 23:
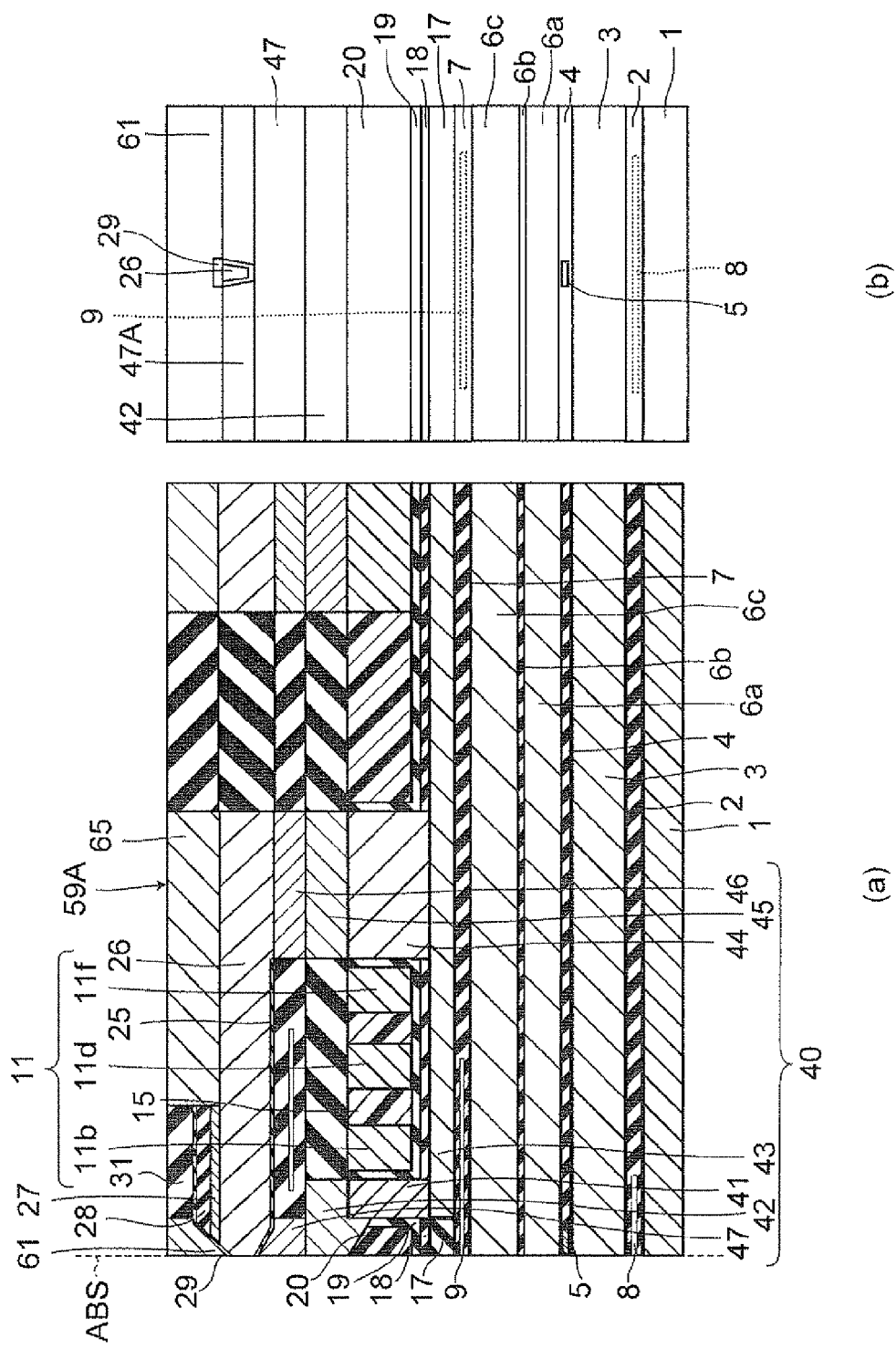
FIG. 23 illustrates a step subsequent to that of FIG. 22, in which (a) is a sectional view corresponding to FIG. 1, in which (b) is a front view corresponding to FIG. 2.
Figure 24:
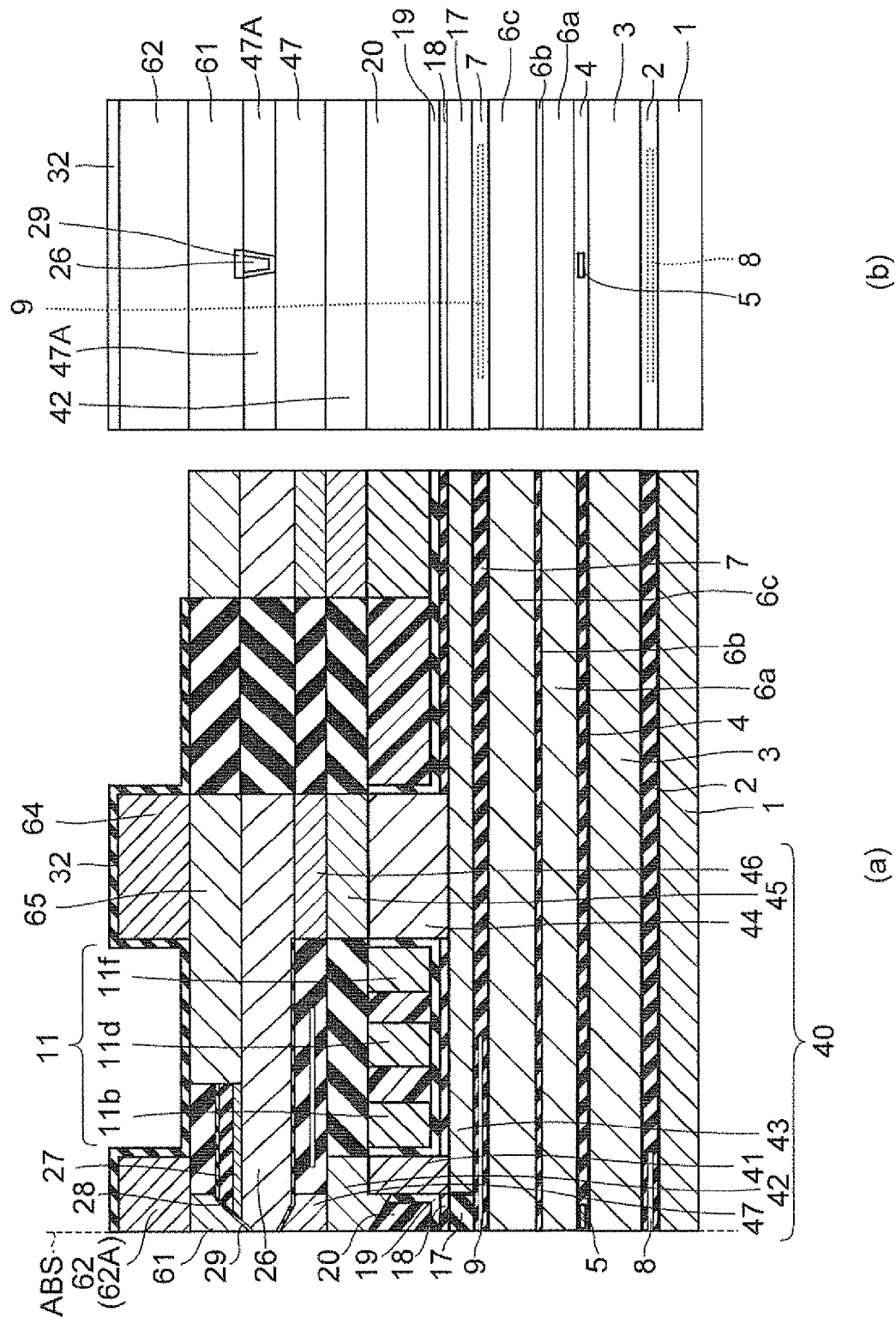
FIG. 24 illustrates a step subsequent to that of FIG. 23, in which (a) is a sectional view corresponding to FIG. 1, in which (b) is a front view corresponding to FIG. 2.
Figure 25:
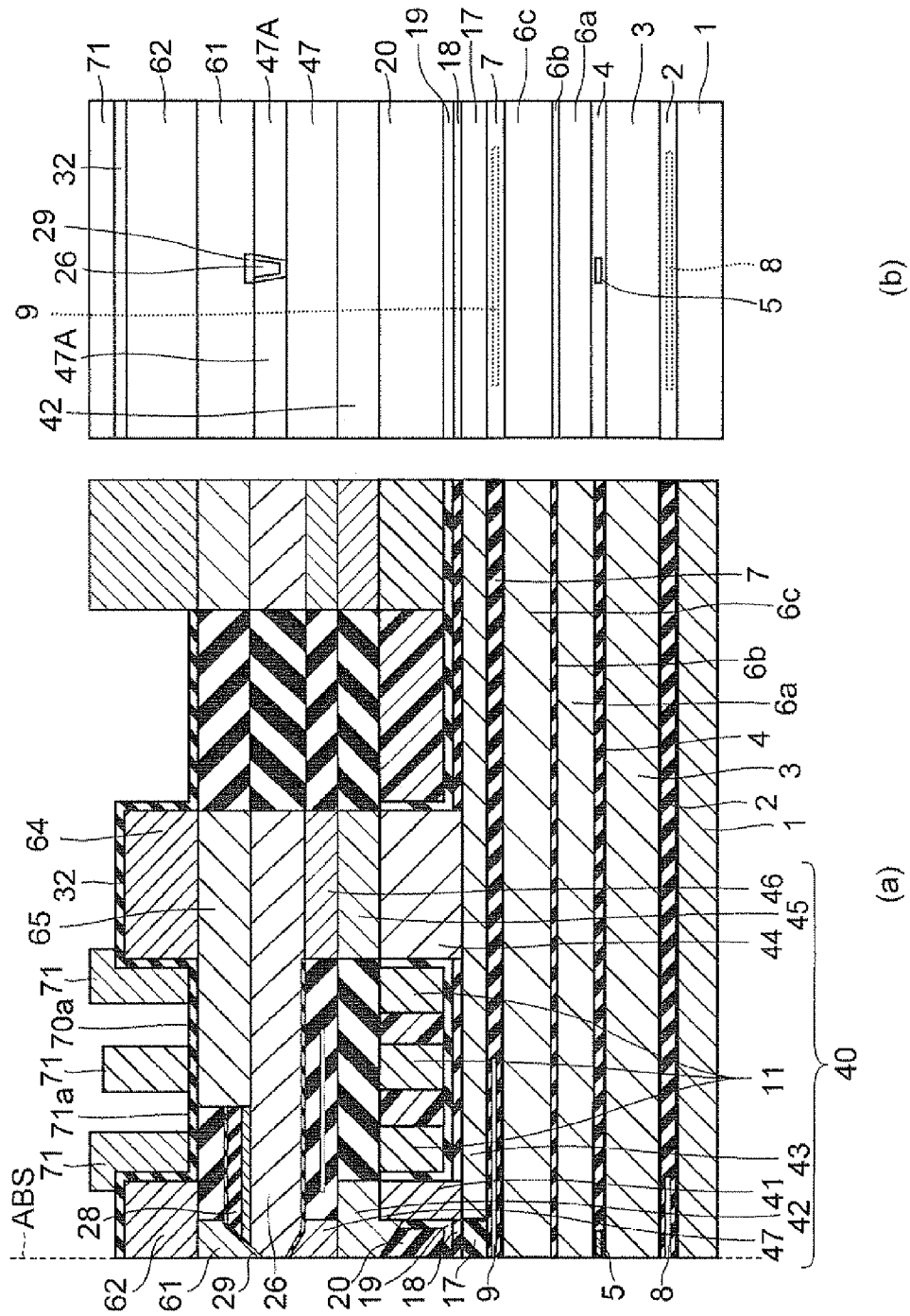
FIG. 25 illustrates a step subsequent to that of FIG. 24, in which (a) is a sectional view corresponding to FIG. 1, in which (b) is a front view corresponding to FIG. 2.

The upper yoke layer 65 is connected to a rear side of the upper end face 26d in the main magnetic pole layer 26, distanced more from the ABS 30 than is the nonmagnetic layers 27, 28. An upper end face of the upper yoke layer 65 is formed without level difference to an upper end face of the opposing shield part 61. The upper end face of the upper yoke layer 65 forms a common flat surface 59A (see FIG. 23) together with the upper end face of the opposing shield part 61.

Moreover, the thin-film magnetic head 300 has a displacement suppression layer 85. The displacement suppression layer 85 is connected an upper end face of the linking shield part 63. The displacement suppression layer 85 is formed from a nonmagnetic material having a low coefficient of linear thermal expansion. For example, the displacement suppression layer 85 is preferably made of an inorganic or metal material, examples of which include SiC, AlN, $Si_3N_4$, and W (tungsten). It will be preferred in particular to use a nonmagnetic material having a high hardness for the displacement suppression layer 85. For example, the displacement suppression layer 85 is preferably made of SiC, which has a Vickers hardness higher than that of alumina.

Further, the thin-film magnetic head 300 has a protective insulating layer 90. The protective insulating layer 90 is formed using an insulating material such as alumina ($Al_2O_3$). The protective insulating layer 90 has an embedded part 90a and a cover part 90b. The embedded part 90a and the cover part 90b are formed in one body. The embedded part 90a comes in contact with an all of the shield connecting part 62c, and is embedded with no space between the shield connecting part 62c and the ABS 30. The cover part 90b is formed so as to cover the linking shield part 63 and the displacement suppression layer 85.

(Method of Manufacturing Thin-Film Magnetic Head)

A method of manufacturing the thin-film magnetic head 300 having the structure mentioned above will now be explained with reference to FIG. 13(a), FIG. 13(b) to FIG. 19(a), FIG. 19(b), FIG. 20, FIG. 21(a), FIG. 21(b) to FIG. 28(a), FIG. 28(b) together with FIG. 1 to FIG. 12 mentioned above.

Figure 20:
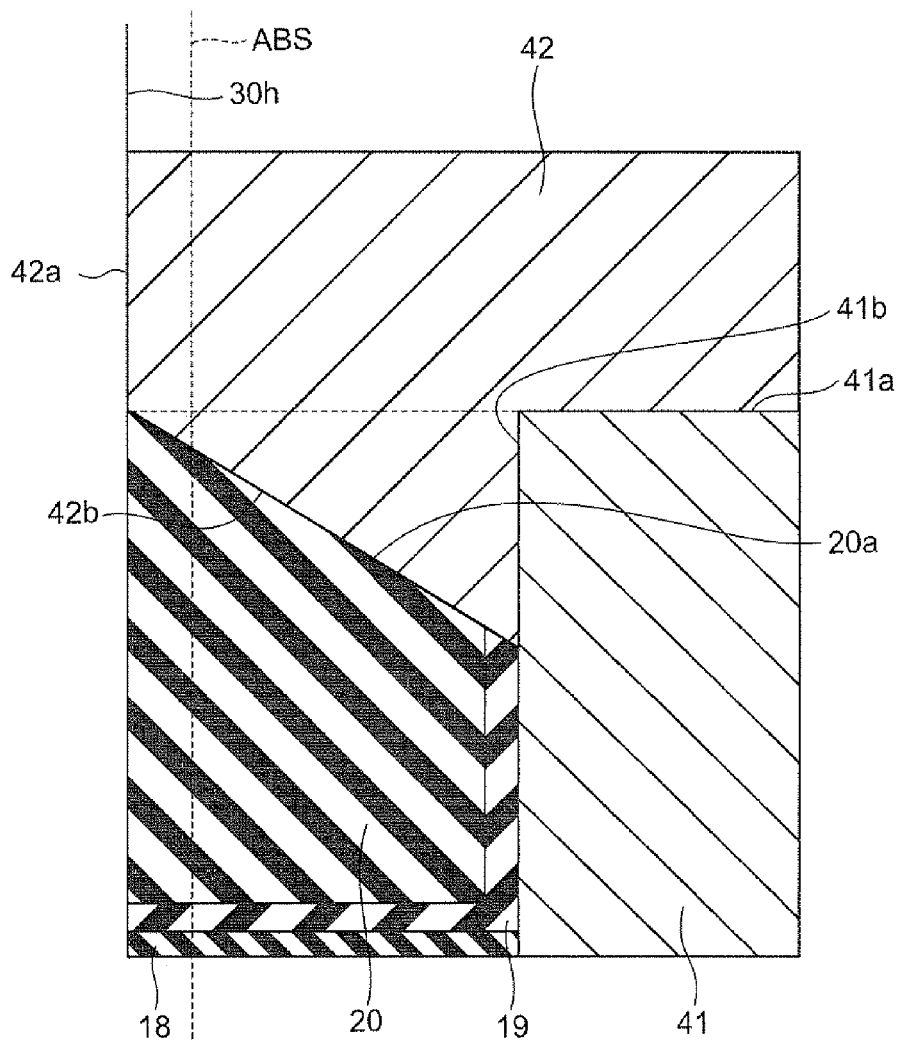
FIG. 20 is a sectional view illustrating a principal part of FIG. 19 (a)
Figure 21:
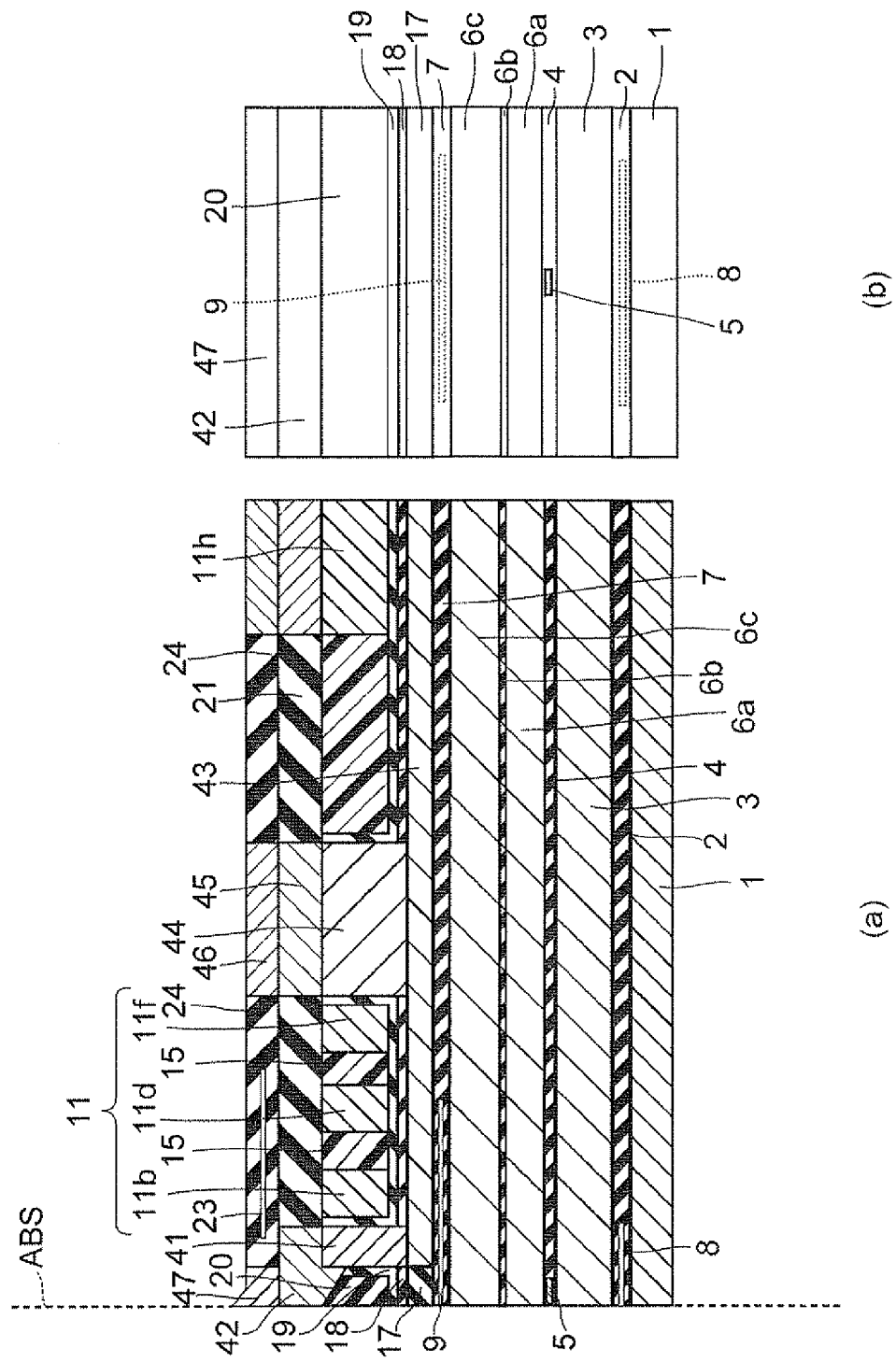
FIG. 21 illustrates a step subsequent to that of FIG. 19, in which (a) is a sectional view corresponding to FIG. 1, in which (b) is a front view corresponding to FIG. 2.
Figure 22:
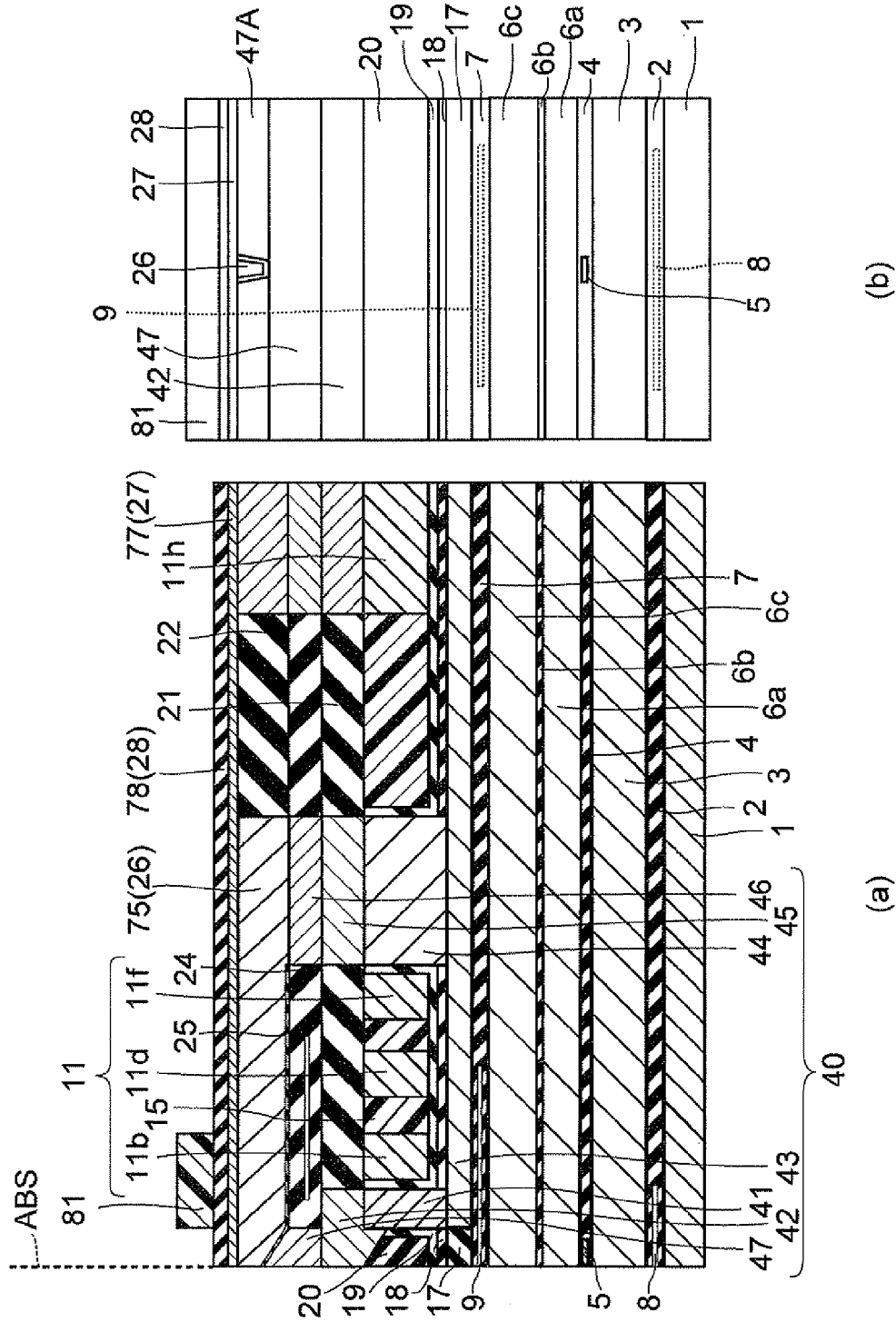
FIG. 22 illustrates a step subsequent to that of FIG. 21, in which (a) is a sectional view corresponding to FIG. 1, in which (b) is a front view corresponding to FIG. 2.

FIG. 13(a) to FIG. 19(a) and FIG. 21(a) to FIG. 28(a) are sectional view corresponding to FIG. 1 in respective step of manufacturing the thin-film magnetic head 300, while FIG. 13(b) to FIG. 19(b) and FIG. 21(b) to FIG. 28(b) are front view similarly corresponding to FIG. 2. FIG. 20 is a sectional view illustrating a principal part of FIG. 19 (a). In each drawing, "ABS" represents a part which the ABS 30 will be formed later.

First, the substrate 1 made of a ceramic material such as aluminum oxide-titanium carbide ($Al_2O_3$.TiC) is prepared. Subsequently, as illustrated in FIG. 13(a), FIG. 13(b), the insulating layer 2 made of an insulating material such as alumina ($Al_2O_3$) and the lower shield layer 3 made of a magnetic material are successively formed on the substrate 1. The heating part 8 is formed when the insulating layer 2 is formed.

Then, the shield gap film 4 is formed by an insulating material such as to shield the MR device 5. Here, an undepicted lead connected to the MR device 5 is formed, and the MR device 5 and the lead are covered with the shield gap film 4. Thereafter, using a magnetic material and an insulating material, the upper shield layer 6 (the first shield part 6a, the insulating part 6b, the second shield part 6c) is formed on the shield gap film 4.

Next, the insulating layer 7 for separating the upper shield layer 6 and a recording head to be formed later from each other is formed by an insulating material such as alumina ($Al_2O_3$). The heat sensing part 9 is formed when the insulating layer 7 is formed. The foregoing steps yield a multilayer body for forming the recording head. Thereafter, a magnetic layer (having a thickness of about 0.6 μm) for forming the linking shield part 43 is formed by using a magnetic material such as NiFe or CoNiFe or the like, so as to form an insulating layer on the surface of the multilayer body, and the surface of the multilayer body is flattened by chemical mechanical polishing (hereinafter, referred to as "CMP"). This forms an opposing insulating layer 17 and the linking shield part 43. Here, the linking shield part 43 is formed such as to be separated from the ABS 30 by 0.3 μm to 1 μm (about 0.5 μm in this embodiment).

Subsequently, an insulating layer 18 (having a thickness of about 0.1 μM to 0.3 μm) made of alumina ($Al_2O_3$) is formed on the whole surface of the multilayer body. Then, after applying a photoresist to the whole surface of the multilayer body, patterning is performed with a predetermined photomask, so as to form a resist pattern (not depicted). Using this resist pattern as a mask, etching such as RIE is performed, so as to selectively perforate the insulating layer 18. Thereafter, a shield magnetic layer forming step is performed. A lower front shield part forming step is included in this step. In the lower front shield part forming step, by frame plating method using a magnetic material made of a ferromagnetic body such as NiFe or CoNiFe or the like, the lower front shield part 41, the first rear shield part 44 are formed by a thickness of about 1 to 1.5 μm each.

Next, as illustrated in FIG. 14(a), FIG. 14(b), an insulating layer 19 (having a thickness of about 0.02 μm to 0.3 μm, preferably about 0.1 μm to 0.2 μm) made of alumina ($Al_2O_3$) is formed on the whole surface of the multilayer body by CVD (Chemical Vapor Deposition) according to an atomic layer method. The insulating layer 19 is formed so as to cover the lower front shield part 41 and the first rear shield part 44.

Then, a conductor layer 70 is formed by performing a conductor layer forming step. The conductor layer 70 is a layer for forming the lower thin-film coil 11. In this step, first, a conductor layer 70 is formed between the lower front shield part 41 and the first rear shield part 44 by frame plating method. The conductor layer 70 is formed such as to have two interstices 70a between the lower front shield part 41 and the first rear shield part 44 and come into contact with the lower front shield part 41 and the first rear shield part 44 through the insulating layer 19 without gaps. The conductor layer 70 is an intermittent conductor layer, since it is provided with interstices 70a.

Next, as illustrated in FIG. 15(a), FIG. 15(b), a photoresist layer 80 (having a thickness of about 1.5 μm to 2.5 μm) is formed so as to be embedded the two interstices 70a in the conductor layer 70.

Subsequently, a hard nonmagnetic layer forming step is performed. In this step, a hard nonmagnetic layer 49A is formed using a hard nonmagnetic material. In this embodiment, since SiC is used as the material of the hard guard frame layer 49, the hard nonmagnetic layer 49A is formed using SiC. The hard nonmagnetic layer 49A is formed such as to surround almost the whole conductor layer 70 from outside and cover almost the whole conductor layer 70. Further, the hard nonmagnetic layer forming step forms the hard nonmagnetic layer 49A such that the hard nonmagnetic layer 49A is inserted between the lower front shield part 41 and the conductor layer 70 and comes into direct contact with the outside surface on the ABS 30 side of the conductor layer 70. In short, the hard nonmagnetic layer 49A is formed such that the above-described wraparound end part 49a is formed later.

Next, an insulating layer 20 adapted to cover the surface of multilayer body is formed using alumina ($Al_2O_3$) by a thickness of about 3 μm to 4 μm. Then the hard guard frame layer forming step is performed. In this step, the surface of the multilayer body is polished by CMP until the lower front shield part 41 and the first rear shield part 44 emerge, so as to become flat. The hard guard frame layer 49 mentioned-above is formed with the thin-film coil 11 by performing the flattening step.

Then, as illustrated in FIG. 16(a), FIG. 16(b), the conductor layer 70 is flattening, the lower front shield part 41 and the first rear shield part 44 emerge together with it. Since the opposing insulating layer 20 is formed by performing this flattening step, the flattening step has meaning as an opposing insulating layer forming step. Further, the lower thin-film coil 11 is formed together with the opposing insulating layer 20.

Subsequently, as illustrated in FIG. 17(a), FIG. 17(b), a resist pattern 79 exposing the surfaces of the opposing insulating layer 20 and the insulating layer 19 is formed. Subsequently, a tilt processing step is performed. In tilt processing step, wet etching, ion beam etching and so on are performed with the resist pattern 79 as a mask to scrape off the surfaces of the opposing insulating layer 20 and the insulating layer 19 as illustrated in FIG. 18(a), FIG. 18(b) to thereby form a depression in the surface of the opposing insulating layer 20. In this case, the surface of the opposing insulating layer 20 and the surface of the insulating layer 19 are scraped such that the surfaces after the scraping are formed in a descending slope like shape, whereby the tilted upper end face 20a is formed at the uppermost surface of the opposing insulating layer 20. Further, in the tilt processing step, wet etching and so on are performed so as to expose a part on the ABS 30 side of the lower front shield part 41. Furthermore, in the tilt processing step, wet etching and so on are performed such that the whole uppermost surface (the upper end face most distanced from the substrate 1) of the opposing insulating layer 20 is disposed at a position closer to the substrate 1 than is the upper end face 41a.

Subsequently, as illustrated in FIG. 19(a), FIG. 19(b), an insulating layer 21 (having a thickness of about 0.3 μm to 0.7 μm) made of alumina ($Al_2O_3$) is formed on the whole surface of the multilayer body. After that, the insulating layer 21 is selectively perforated.

Next, a connecting shield part forming step is performed to form the connecting shield part 42 whose front end angle α is an obtuse angle. In this step, by frame plating method using a magnetic material made of a ferromagnetic body such as NiFe or CoNiFe or the like, both the connecting shield part 42 and the second rear shield part 45 are formed at the perforated part by a thickness of about 0.5 μm to 1.2 μm each. In this case, since the tilted upper end face 20a in a descending slope like shape is formed in the uppermost surface of the opposing insulating layer by the above-described tilt processing step, the frame plating method is performed such that the magnetic material comes into direct contact with the tilted upper end face 20a, whereby the connecting shield part 42 is formed. The connecting shield part forming step is performed in this manner. Further, since the lower front shield part 41 on the ABS 30 side is exposed in the tilt processing step, the connecting shield part 42 is formed to come into contact with not only the upper end face 41a but also the front end face 41b.

Note that the ABS 30 is not formed yet at this point of time. Therefore, a flat front end face 30h without level difference is formed of the front end face of the connecting shield part 42 and the front end face of the opposing insulating layer 20 as illustrated in FIG. 20.

After that, the surface of the multilayer body is polished by CMP so as to become flat. Then, as illustrated in FIG. 21(a), FIG. 21(b), the base insulating layer 24 is formed using an insulating material such as alumina ($Al_2O_3$) or the like. The heating part 23 is formed when the base insulating layer 24 is formed. After that, the base insulating layer 24 is selectively perforated. Subsequently, the leading shield part 47 and the third rear shield part 46 are formed at the perforated part in a thickness of 0.5 μm to 1.0 μm by the frame plating method using a magnetic material made of a ferromagnetic body such as NiFe or CoNiFe.

Next, as illustrated in FIG. 22(a), FIG. 22(b), the side shield part 47A is formed on the leading shield part 47 by frame plating method using a magnetic material made of a ferromagnetic body such as NiFe or CoNiFe by a thickness of about 0.5 μm to 0.8 μm.

Then, a nonmagnetic thin-film 25 is formed so as to cover the base insulating layer 24, the leading shield part 47 and the side shield part 47A. The nonmagnetic thin-film 25 is formed by sputtering with a nonmagnetic metal material such as Ru, NiCr, or NiCu, or an insulating material such as alumina.

Subsequently, a magnetic layer 75 having a thickness of about 0.4 to 0.8 μm is formed with a magnetic material made of a ferromagnetic body such as CoNiFe, CoFe, NiFe, for example by sputtering. By this magnetic layer 75, the main magnetic pole layer 26 will be formed later. Further, the whole surface of the multilayer body is polished by CMP, so as to become flat.

After that, a nonmagnetic layer 77 (having a thickness of about 0.04 to 0.1 μm) is formed on the surface of the multilayer body with a metal material such as Ru, NiCr, or NiCu, for example by sputtering. The nonmagnetic layer 77 will partly be etched away later, so as to become the above-mentioned nonmagnetic layer 27. Further, using an inorganic insulating material such as alumina ($Al_2O_3$) or silicon oxide, a nonmagnetic layer 78 (having a thickness of about 0.1 to 0.3 μm) is formed on the whole surface of the multilayer body. The nonmagnetic layer 78 will partly be etched away later, so as to become the above-mentioned nonmagnetic layer 28.

Subsequently, after applying a photoresist to the whole surface of the multilayer body, patterning with a predetermined photomask is performed, so as to form a resist pattern 81 near the ABS 30.

Next, using the resist pattern 81 as a mask, etching such as RIE, for example, is performed, so as to remove a part of the nonmagnetic layer 78. The etching in this case is performed such as to stop at the time when the bottom part of a groove formed by etching reaches the upper face of the nonmagnetic layer 77. To this aim, a material yielding an etching rate lower than that of the nonmagnetic layer 77 is used for the nonmagnetic layer 78.

After that, the resist pattern 81 is removed. Then, using the remaining nonmagnetic layer 78 as a mask, a part of the nonmagnetic layer 77 is etched away by IBE, for example. Further, using the remaining nonmagnetic layer 77 as a mask, a part of the nonmagnetic layer 75 is etched away by IBE, for example. This step forms the upper tilted surface 26c on the ABS side of the magnetic layer 75.

Subsequently, as illustrated in FIG. 23(a), 23(b), the gap layer 29 is formed on the whole surface of the multilayer body by sputtering or CVD with an insulating material such as alumina ($Al_2O_3$) or a nonmagnetic conductive material such as Ru, NiCu, or Ta.

Further, an undepicted stopper film is formed by sputtering, for example, and a nonmagnetic film is formed thereon. Subsequently, an undepicted photoresist is applied to the whole surface of the multilayer body. Then, patterning with a predetermined photomask is performed, so as to form an undepicted resist pattern. Using this resist pattern as a mask, the nonmagnetic film is etched by RIE, for example. This etching is performed such as to stop when the bottom part of a groove formed by etching reaches the upper face of the stopper film. Then, after removing the resist pattern that is not depicted, the remaining nonmagnetic film is used as a mask for partly etching the gap layer 29, nonmagnetic layer 77 and nonmagnetic layer 78 away by RIE or the like. Here, the gap layer 29, nonmagnetic layer 77 and nonmagnetic layer 78 are partly removed, so as to secure a space for forming the upper yoke layer 65.

Subsequently, the opposing shield part 61 is formed by performing an opposing shield part forming step. In this step, first, a magnetic layer is formed on the surface of the multilayer body. This magnetic layer is formed by plating method using a magnetic material made of a ferromagnetic body such as CoNiFe, CoFe, CoFeN, NiFe or the like by a thickness of about 0.5 to 1.2 μm. This magnetic layer will later form the opposing shield part 61 and the upper yoke layer 65.

Subsequently, an insulating layer (having a thickness of about 1 to 3 μm) is formed on the whole surface of the multilayer body using an insulating material such as alumina ($Al_2O_3$). Further, the whole surface of the multilayer body is polished by CMP until a surface of the magnetic layer emerges, so as to be made flat. This forms the opposing shield part 61, the upper yoke layer 65 and an insulating layer 31. At this time, the surface of the multilayer body is polished such that the opposing shield part 61 has a thickness of about 0.5 to 1.0 μm.

Next, a first shield part forming step is performed. In this step, as illustrated in FIG. 24(a), FIG. 24(b), at parts of the surface of the multilayer body where the upper front shield part 62 and the rear shield part 64 will be formed, the pre-trim front shield part 62A and the rear shield part 64 are formed respectively. In this event, the pre-trim front shield part 62A is disposed in the ABS 30 and therefore corresponds to the first shield part. In the first shield part forming step, the pre-trim front shield part 62A and the rear shield part 64 are formed by, for example, frame plating method using a magnetic material made of a ferromagnetic body such as NiFe or CoNiFe. In this event, the space between the pre-trim front shield part 62A and the rear shield part 64 is made to range from about 3.0 μm to about 3.5 μm.

In addition, the pre-trim front shield part 62A is formed to be connected to the opposing shield part 61 and disposed in the ABS 30. The pre-trim front shield part 62A has a shape illustrated on the upper side in FIG. 10. In the pre-trim front shield part 62A, the whole front end face 62a is disposed in the ABS 30.

Then, an interlayer insulating layer 32 is formed on the surface of the multilayer body using such as alumina ($Al_2O_3$), after that, as illustrated in FIG. 25(a), FIG. 25(b), a conductor layer 71 is formed on the surface of multilayer body between the first shield part (pre-trim front shield part 62A) and the rear shield part 64. This conductor layer 71 will later form the upper thin-film coil 51. The conductor layer 71 is formed such as to have two interstices 71a and come into contact with the first shield part (pre-trim front shield part 62A) and the rear shield part 64 through an interlayer insulating layer 32 without gaps. The conductor layer 71 is an intermittent conductor layer, since it is provided with interstices 71a.

After that, a photoresist layer 55 (having a thickness of about 2 μm to 3 μm) is formed so as to cover the two interstices 71a in the conductor layer 71, a cover insulating film adapted to cover the surface of the multilayer body is formed using alumina ($Al_2O_3$) by a thickness of about 3 μm to 4 μm. Subsequently, the surface of the multilayer body is polished by CMP until the pre-trim front shield part 62A and the rear shield part 64 emerge, so as to become flat.

This forms the upper thin-film coil 51 and the photoresist layer 55, as illustrated in FIG. 26(a), FIG. 26(b). In this event, flattening of the surface of the multilayer body is performed so that the thickness of the upper thin-film coil 51 is about 1.0 μm to 1.8 μm. Besides, the above-described common flat surface 59 is formed by the flattening of the surface of the multilayer body.

Subsequently, as illustrated in FIG. 27(a), FIG. 27(b), an insulating layer 34 is formed on the whole surface of the multilayer body using an insulating material such as alumina ($Al_2O_3$), and the insulating layer 34 is partially perforate. After that, a linking shield part forming step is performed. In this step, the linking shield part 63 is formed by frame plating method using a magnetic material made of a ferromagnetic body such as NiFe, CoNiFe or the like. The linking shield part 63 is formed so as to connect to the pre-trim shield part 62A. The linking shield part 63 is formed so as to straddle the turn parts 51g, 51e, 51c of the upper thin-film coil 51 through the insulating layer 34.

Further, the linking shield part 63 is receded from the front end face 30h (also receded from the ABS 30) and formed at a position distanced from the ABS 30. In other words, the linking shield part 63 is formed at a position where a receding space 63h is ensured between the linking shield part 63 and the ABS 30. The receding space 63h becomes an elongated part having a width, for example, about 0.4 μm to 0.7 μm along the ABS 30 and the same height as that of the linking shield part 63.

Next, a trimming step is performed. In this step, as illustrated in FIG. 28(a), FIG. 28(b), IBE is performed by applying ion beams IB from the upper direction using the linking shield part 63 as a mask to cut off the part of the pre-trim front shield part 62A which is not covered with the linking shield part 63. Since the part of the pre-trim front shield part 62A on the ABS side is not covered with the linking shield part 63, the part on the ABS side of the pre-trim front shield part 62A is cut off by performing IBE. In this event, IBE is performed in a manner to leave a part of the pre-trim front end face 62a of the pre-trim front shield part 62A disposed in the ABS 30. Thus, as shown in FIG. 10, the above-described shield front end face 62b is formed of the part of the pre-trim front end face 62a which has not been cut off but left. Further, IBE is performed in a manner to cause the shield connecting part 62c having the above-described receding tilt structure to appear.

Though the linking shield part 63 itself is used as a mask in the above-described trimming step, a mask such as a photoresist or the like covering the upper face of the linking shield part 63 may be used instead of using the linking shield part 63. More specifically, a mask equal in size to the linking shield part 63 may be formed on the upper face of the linking shield part 63 using photoresist or the like, and the part of the pre-trim front shield part 62A which is not covered with the linking shield part 63 may be cut off using the mask.

Further, with chemical action of gas plasma used in etching, the etching can proceed not only in the vertical direction (the longitudinal direction in FIG. 28) but also in the horizontal direction (the lateral direction in FIG. 28) of the pre-trim front shield part 62A. Therefore, it is preferable to perform non-active IBE, namely, ion milling in the trimming step. Etching performed utilizing physical impact when inactive ions are applied is also called ion milling for distinction from reactive ion etching.

Subsequently, as illustrated in FIG. 1, the displacement suppression layer 85 is formed. After that, the protective insulating layer 90 is formed by an insulating material such as alumina (Al$_2$O$_3$) so as to cover the displacement suppression layer 85. After that, the ABS 30 is formed by performing polishing processing or mechanical processing to the front end face 30h, whereby the thin-film magnetic head 300 is completed.

The protective insulating layer 90 is formed such as to come into contact with an entire the shield connecting part 62c and be embedded without gap between the shield connecting part 62c and the ABS 30.

(Operation and Effect of Thin-Film Magnetic Head 300)

As in the foregoing, the thin-film magnetic head 300 has the hard guard frame layer 49. The hard guard frame layer 49 is in direct contact with almost the whole outside surfaces 11af, 11cf of the lower thin-film coil 11, and has a frame-like structure surrounding the lower thin-film coil 11 from outside. Further, the current flowing through the lower thin-film coil 11 generates Joule heat, and when the Joule heat expands the photoresist layer 15, the photoresist layer 15 applies an outward pressure spreading outward to the lower thin-film coil 11. Under the outward pressure, the lower thin-film coil 11 tends to spread outward and push the hard guard frame layer 49 outward.

However, the hard guard frame layer 49 is formed using the hard nonmagnetic material having a higher Vickers hardness than that of alumina. Therefore, if the outward pressure is applied from the lower thin-film coil 11, the hard guard frame layer 49 rarely deforms. Accordingly, the hard guard frame layer 49 restrains the lower thin-film coil 11 which tends to spread outward due to the expansion of the photoresist layer 15. The pressure exerted outward by the lower thin-film coil 11 is held inside the hard guard frame layer 49 and does not reach the outside of the hard guard frame layer 49.

Therefore, the pressure in the direction toward the ABS 30 exerted from the lower thin-film coil 11 is also suppressed by the hard guard frame layer 49 and hardly reaches the opposing insulating layer 20. Therefore, in the thin-film magnetic head 300, the partial protrusion of the ABS 30 can be suppressed without increasing the sectional area of the lower thin-film coil 11.

On the other hand, in the above-described conventional PMR 600, the lower coil 612 is surrounded merely by the insulating layer 613 made of alumina. Therefore, in the conventional PMR 600, the outward pressure of the lower coil 612 which tends to spread outward due to the expansion of the coil insulating layer 615 is exerted on the insulating layer 613. However, the insulating layer 613 cannot sufficiently restrain the outward pressure of the lower coil 612. Therefore, it is difficult to suppress the partial protrusion of the ABS in the conventional PMR 600.

In contrast, in the thin-film magnetic head 300, the lower thin-film coil 11 which tends to spread outward is restrained by the hard guard frame layer 49 to the inside thereof as described above, so that it is possible to suppress the partial protrusion of the ABS without increasing the sectional area of the lower thin-film coil 11.

Incidentally, the photoresist layer 15 is formed using photoresist (photosensitive resin), and the photoresist is a high molecular material containing a high molecular substance. It is widely and generally known that the high molecular substance has a property called viscoelasticity. The viscoelasticity means a phenomenon that viscosity and elasticity appears in overlapping, and is a property having both viscosity and elasticity. A body with the viscoelasticity is called a viscoelastic body, and a body made of the high molecular substance applies to the viscoelastic body. Since the viscosity is a liquid-like property and the elasticity is a solid-like property, the photoresist layer 15 has both the liquid-like property and the solid-like property. When a load is instantaneously applied to the viscoelastic body from outside, the elasticity property appears first to exhibit the stress to return to the original state. Then, the viscosity property appears a little behind. If the load is continuously applied, the viscosity property prominently appears with time, and the viscoelastic body keeps deformed without loading from outside.

On the other hand, when the photoresist layer 15 expands by the Joule heat generated by the lower thin-film coil 11, the photoresist layer 15 tends to spread outward the lower thin-film coil 11 and receives an inward external force from the lower thin-film coil 11 due to the reaction thereto. In this event, since the photoresist layer 15 has the viscoelasticity, the elasticity property appears first to exhibit the stress to return to the original state but the viscosity property prominently appears with time, and the photoresist layer 15 finally keeps deformed without loading from outside. In other words, the photoresist layer 15 deforms according to the load from the lower thin-film coil 11 because of its viscosity property.

The phenomenon can be more effectively obtained only by surely restraining the lower thin-film coil 11 which tends to spread outward, by the hard guard frame layer 49. In the conventional PMR 600, even if the lower coil 612 spreads outward due to the expansion of the coil insulating layer 615, the expansion of the coil insulating layer 615 is likely to be left as it is because the action of the insulating layer 613 to restrain the lower coil 612 is weak, the inward pressure received by the coil insulating layer 615 from the lower coil 612 is therefore low, and the force to restrain the expansion of the coil insulating layer 615 is also weak. Thus, the lower coil 612 is likely to be kept spread outward, and it is difficult to suppress the partial protrusion of the ABS. In contrast, in the thin-film magnetic head 300, the hard guard frame layer 49 surely restrains the lower thin-film coil 11 which tends to spread outward, so that the lower thin-film coil 11 is not likely to be kept spread and it is possible to more effectively suppress the partial protrusion of the ABS 30.

Further, the hard guard frame layer 49 has the wraparound end part 49a. The wraparound end part 49a is wrapped around to the ABS 30 side of the lower thin-film coil 11. Therefore, if the lower thin-film coil 11 tends to spread toward the ABS 30, the wraparound end part 49a can receive the pressure in the direction toward the ABS 30 due to the spreading. Accordingly, the hard guard frame layer 49 has the wraparound end part 49a, whereby the partial protrusion of the ABS 30 can be more surely suppressed.

In addition, the hard guard frame layer 49 has the thickness equal to the thickness of the lower thin-film coil 11, and is in direct contact with the whole outside surface at a part of the lower thin-film coil 11 which is distanced more from the ABS 30 than is the main magnetic pole layer 26. The hard guard frame layer 49 in its entirety in the thickness direction receives the outward pressure when the lower thin-film coil 11 tends to spread outward. Accordingly, the outward pressure by the lower thin-film coil 11 is more surely suppressed by the hard guard frame layer 49.

Meanwhile, the thin-film magnetic head 300 has the connecting shield part 42. The connecting shield part 42 has the front end convex part 42P, and the front end convex part 42P is a rounded convex-shape part. The magnetic flux then leaks from the main magnetic pole layer 26 to the connecting shield part 42, and when the magnetic flux leaks to the outside of the connecting shield part 42, the magnetic flux proceeds to the outside from the front end convex part 42P while appropriately dispersing as magnetic fluxes B0, B1, B2 as illustrated in FIG. 8(a).

However, since the front end convex part 42P is a rounded gentle convex-shape part, the difference in intensity among the magnetic fluxes B0, B1, B2 is little. Therefore, even when the magnetic fluxes B0, B1, B2 reach the recording medium, there hardly occur a poor condition that the data recorded on the recording medium is erased or rewritten. Accordingly, data erasure and the like are reduced.

On the other hand, when the front end angle of the lower front shield part 712 is set at a right angle as in the conventional thin-film magnetic head illustrated in FIG. 8(b), the convex part 712P is sharply angulated. Therefore, when magnetic fluxes leak from the main magnetic pole layer to the lower front shield part 712, the magnetic fluxes tend to concentrate to the convex part 712P. Accordingly, the intensity of the magnetic flux B0 at the middle becomes stronger than those of the magnetic fluxes B1, B2 on the outside thereof. Therefore, when the magnetic fluxes B0, B1, B2 reach the recording medium, the strongest magnetic flux B0 often causes the poor condition that the data recorded on the recording medium is erased or rewritten.

As described above, the thin-film magnetic head 300 according to the embodiment of the present invention has the connecting shield part 42 and is thereby configured to be able to reduce the data erasure and the like caused from the structure of the shield magnetic layer.

Further, the front end convex part 42P corresponds to the corner part where the front end face 42a intersects the tilted lower end face 42b. Since the front end angle α is set at an obtuse angle, an angle formed between the front end face 20b and the tilted upper end face 20a of the opposing insulating layer 20 in contact with the connecting shield part 42 (an angle measured counterclockwise from the front end face 20b to the tilted upper end face 20a, referred also to as a counter-front end angle) becomes an acute angle. Then the volume of the acute part facing the connecting shield part 42 in the front end face 20b of the opposing insulating layer 20 (precisely, the front end face 30h) is smaller than the case that the counter-front end angle is set at a right angle. For this reason, when the polishing processing or mechanical processing to the front end face 30h is performed in order to form the ABS 30, the acute part facing the connecting shield part 42 is likely to chip (the above-described chipped end part 20d is formed caused from this chipping). Accompanying the chipping of the acute part, a small gap is formed at a boundary part between the connecting shield part 42 and the opposing insulating layer 20. Then, polishing proceeds not only from the direction intersecting the ABS 30 but also from a direction different therefrom at the boundary part of the front end face 42a with the opposing insulating layer 20 in the connecting shield part 42, resulting in formation of the rounded front end convex part 42P. By setting the front end angle α of the connecting shield part 42 to an obtuse angle as described above, the front end convex part 42P can be easily and surely formed.

Note that when the front end angle is set at a right angle as in the conventional thin-film magnetic head 700, the counter-front end angle is also set at a right angle. Then, the corner parts at right angles of the connecting shield part 42 and the opposing insulating layer 20 face each other at the front end face 30h, so that the corner part facing the connecting shield part 42 never chips. Accordingly, the rounded front end convex part 42P is not formed.

Further, the thin-film magnetic head 300 has the opposing insulating layer 20 and its tilted upper end face 20a is formed in a descending slope like shape. Therefore, when a magnetic layer in contact with the opposing insulating layer 20 is formed, the front end angle of the magnetic layer becomes an obtuse angle. Accordingly, by forming a magnetic layer to overlie the opposing insulating layer 20, the connecting shield part 42 is obtained, so that the connecting shield part 42 can be surely formed.

Further, the thin-film magnetic head 300 has the lower front shield part 41, and the upper end face 41a and the front end face 41b are connected to the connecting shield part 42. Therefore, the contact area between the connecting shield part 42 and the lower front shield part 41 is made larger than the case that the front end angle is set at a right angle. Accordingly, the magnetic flux is surely transmitted from the connecting shield part 42 to the lower front shield part 41.

Meanwhile, the thin-film magnetic head 300 is structured such that only the upper front shield part 62 is formed as the magnetic layer which is to be disposed between the opposing shield part 61 and the linking shield part 63. Therefore, as compared to the case where the two magnetic layers such as the front shield part and the connecting shield part are formed between the opposing shield part and the linking shield part, the length of the magnetic path along the top-down direction is shorter so that the magnetic path length is able to be reduced in the thin-film magnetic head 300.

Hence, the thin-film magnetic head 300 is able to improve the flux rise time, non-linear transition shift (NLTS) characteristic, overwrite characteristic, and the like of the recording head, and follow rapid changes in recording signals having a high frequency and changing fast. This makes the thin-film magnetic head 300 suitable as a recording head for hard disk drives mounted to servers in particular.

In addition, the upper front shield part 62 has a lateral width capable of reaching, from the ABS 30, the upper thin-film coil 51 via the interlayer insulating layer 32. Therefore, even though the write shield layer 60 has a different-distance structure, the front shield part 62 is surely connected to both of the opposing shield part 61 and the linking shield part 63. Accordingly, the opposing shield part 61 opposing the main magnetic pole layer 26 and the linking shield part 63 straddling the turn parts 51g, 51e, 51c of the upper thin-film coil 51 are liked together as a continuous line and are able to form the magnetic circuit as a continuous line. Note that the different-distance structure means a structure that the respective distances of the opposing shield part 61 and the linking shield part 63 from the ABS 30 are different because the opposing shield part 61 is disposed in the ABS 30 and the linking shield part 63 is receded from the ABS 30.

A structure is discussed here which is intended to surely connect both of the opposing shield part 61 and the linking shield part 63 by the upper front shield part 62 in the different-distance structure of the write shield layer 60. Since the sizes of the upper end face and the lower end face are maximum when the whole front end face is disposed in the ABS 30 as in the pre-trim front shield part 62A, it is preferable that the whole front end face is disposed in the ABS 30 like the pre-trim front shield part 62A in order to realize the aforementioned structure.

However, this causes the pre-trim front end face 62a to be largely exposed in the ABS 30. The upper front shield part 62 and the pre-trim front shield part 62A are formed of a magnetic material made of a ferromagnetic body such as CoNiFe, CoFe, CoFeN, NiFe or the like. Therefore, if the whole pre-trim front end face 62a is exposed in the ABS 30 like the pre-trim front shield part 62A, the pre-trim front shield part 62A will be affected more strongly when the photoresist layer 55 expands due to the heat generation of the upper thin-film coil 51.

Since the frying height is very small, collision between the thin-film magnetic head 300 and the recording medium can occur even when only a limited and small part of the pre-trim front end face 62a projects. That the whole pre-trim front end face 62a is exposed in the ABS 30 means that many such small parts which will project exist in the ABS 30, which means that there are accordingly many projecting forms which can collide with the recording medium and collision between the thin-film magnetic head 300 and the recording medium is more likely to occur.

Hence, in the thin-film magnetic head 300, the upper front shield part 62 having the structure illustrated on the lower side in FIG. 10 is formed. Thus, the part exposed in the ABS 30 is the shield front end face 62b.

Further, in the upper front shield part 62, the shield upper end face 62f is disposed at a position distanced more from the substrate 1 than is the shield front end face 62b, and the upper front shield part 62 has the shield connecting part 62c connecting the shield front end face 62b to the shield upper end face 62f. In such a structure, the front end face disposed in the ABS 30 is smaller in size than that when the shield upper end face 62f reaches the ABS 30, namely, the pre-trim front shield part 62A as illustrated on the upper side in FIG. 10. Therefore, provision of the upper front shield part 62 makes it possible to suppress the situation that the thin-film magnetic head 300 collides with the recording medium.

Hence, the thin-film magnetic head 300 is able to restrain the write shield layer 60 from projecting as the upper thin-film coil 51 generate heat especially. Consequently, the thin-film magnetic head 300 is very unlikely to be damaged by the protrusion of the recording head and thus can approach recording media.

While the thin-film magnetic head 300 is incorporated in an undepicted slider, the flying height of the slider from the recording medium surface can be reduced. Therefore, the thin-film magnetic head 300 can enhance the resolution of recording and reproducing heads, thereby improving their signal-to-noise ratio. This can also increase the recording density of the thin-film magnetic head 300.

On the other hand, the upper front shield part 62 is formed, after the formation of the linking shield part 63, by cutting off a part thereof on the ABS 30 side where the linking shield part 63 is not in contact therewith. For this reason, though the part exposed in the ABS 30 is small, the shield upper end face 62f is surely ensured, resulting in a structure in which the upper front shield part 62 and the linking shield part 63 can be surely connected.

Further, when cutting off the part of the upper front shield part 62 on the ABS 30 side, the shield front end face 62b is ensured so that a part of the pre-trim front end face 62a is left as the shield front end face 62b without cutting off the whole pre-trim front end face 62a. If IBE proceeds to the degree that the shield front end face 62b is not ensured when cutting off the part of the pre-trim front shield part 62A on the ABS 30 side, the shield lower end face 62r can also be cut off. In this case, the part which is to be connected to the opposing shield part 61 becomes smaller, so that the connection between the opposing shield part 61 and the upper front shield part 62 can be insufficient. However, there is no such possibility in the thin-film magnetic head 300.

Further, the upper front shield part 62 has the shield connecting part 62c, and the shield connecting part 62c has the tilt structure. Therefore, the upper front shield part 62 has a structure which can be surely formed by the above-described IBE from the upper direction. Without the tilt structure, for example, when a surface part extending from the shield front end face 62b to the shield upper end face 62f is bent in an S-shape, it is difficult to form the upper front shield part 62 by IBE. However, in the thin-film magnetic head 300, there is no such possibility and the upper front shield part 62 is able to be surely formed by IBE from the upper direction.

Further, since the shield connecting part 62c has the receding tilt structure, the volume of the upper front shield part 62 is reduced as compared to the case without the receding tilt structure. This further suppresses the possibility of projection of the upper front shield part 62.

Further, the shield connecting part 62c has the lateral flat part 62c1. The lateral flat part 62c1 is generally formed along the direction intersecting the ABS 30. Accordingly, the shield connecting part 62c is able to surely receive the pressure received in the longitudinal direction from the embedded part 90a of the protective insulating layer 90 as compared to the case without the lateral flat part 62c1. Accordingly, in the thin-film magnetic head 300, the embedding state of the protective insulating layer 90 is stable.

Additionally, the shield connecting part 62c has the longitudinal flat part 62c2. The longitudinal flat part 62c2 is generally formed along the ABS 30. Accordingly, the upper front shield part 62 has a structure which can be surely formed by IBE from the upper direction or the like to the pre-trim front shield part 62A.

As has been described, in the thin-film magnetic head 300, the magnetic path length can be reduced and projection of a part of the ABS 30 can be suppressed, so that both of the suppression of projection of a part of the medium-opposing surface and the reduction in magnetic path length can be realized. Accordingly, the thin-film magnetic head 300 is configured such that the projection of a part of the ABS 30 can be suppressed without affecting the reduction in magnetic path length.

Since the lower thin-film coil 11 and upper thin-film coil 51 have the variable width structures as mentioned above, current flows are less likely to be obstructed, whereby the resistance value is able to be restrained from rising. Accordingly, generation of heat from the lower thin-film coil 11 and the upper thin-film coil 51 is able to be suppressed effectively in the thin-film magnetic head 300.

Modified Example 1

Figure 39:
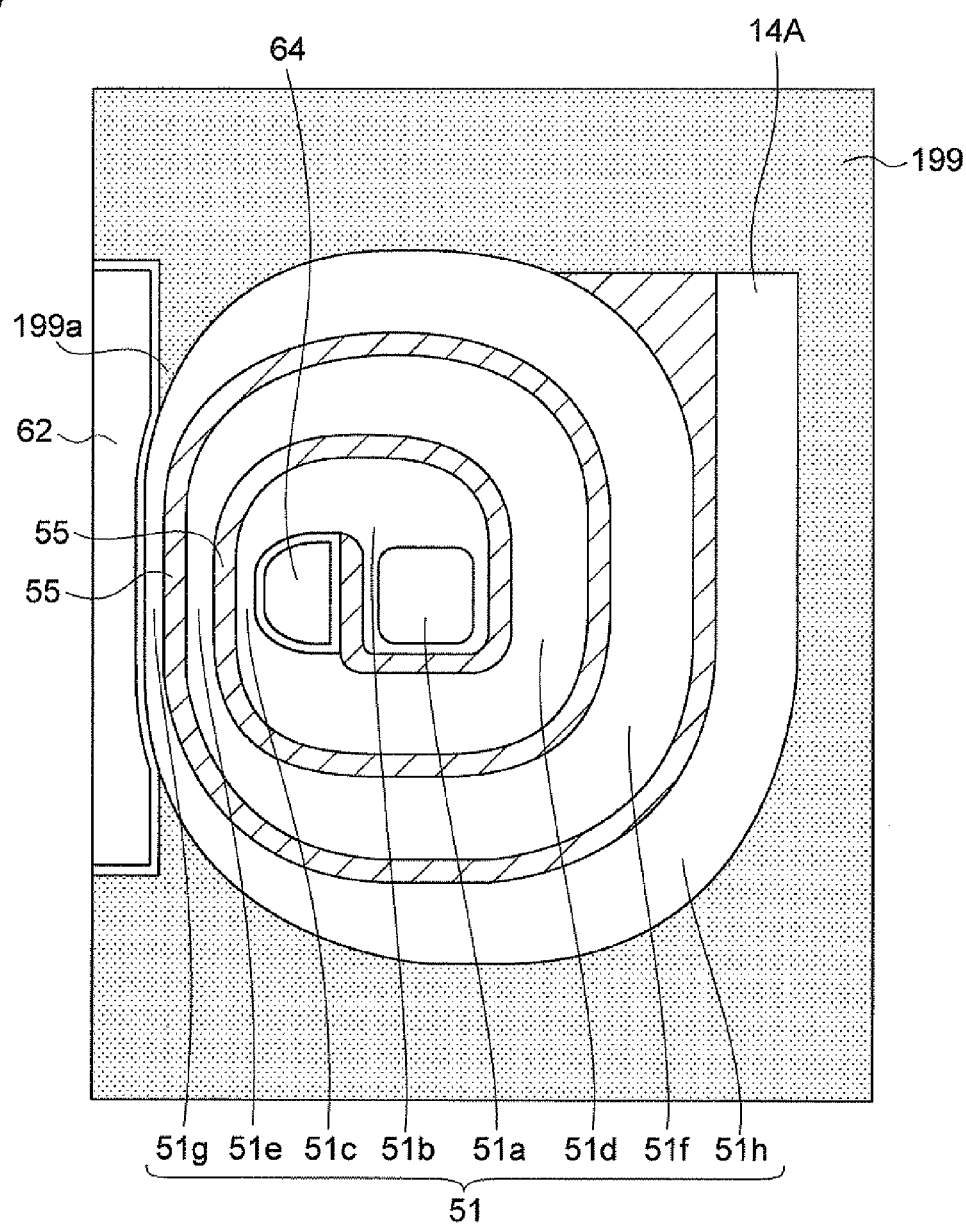
FIG. 39 is a plan view illustrating an upper thin-film coil, the hard guard frame layer and an upper front shield part, according to a modified example, of the thin-film magnetic head according to a first embodiment of the present invention.

In the case of the thin-film magnetic head 300, the hard guard frame layer is not formed for the upper thin-film coil 51. However, as illustrated in FIG. 39, a hard guard frame layer similar to that for the lower thin-film coil 11, namely, an upper hard guard frame layer 199 may be formed for the upper thin-film coil 51. The upper hard guard frame layer 199 surrounds the upper thin-film coil 51 from outside and is in direct contact with almost the whole outside surface defining the outer shape of the upper thin-film coil 51. The upper hard guard frame layer 199 is formed using a nonmagnetic material such as SiC as with the hard guard frame layer 49. Further, the upper hard guard frame layer 199 has a wraparound end part 199*a* similar to that of the hard guard frame layer 49.

The upper hard guard frame layer 199 restrains the upper thin-film coil 51 which tends to spread outward due to the expansion of the photoresist layer 55. Therefore, the partial protrusion of the ABS 30 is more surely suppressed.

Modified Example 2

Figure 11:
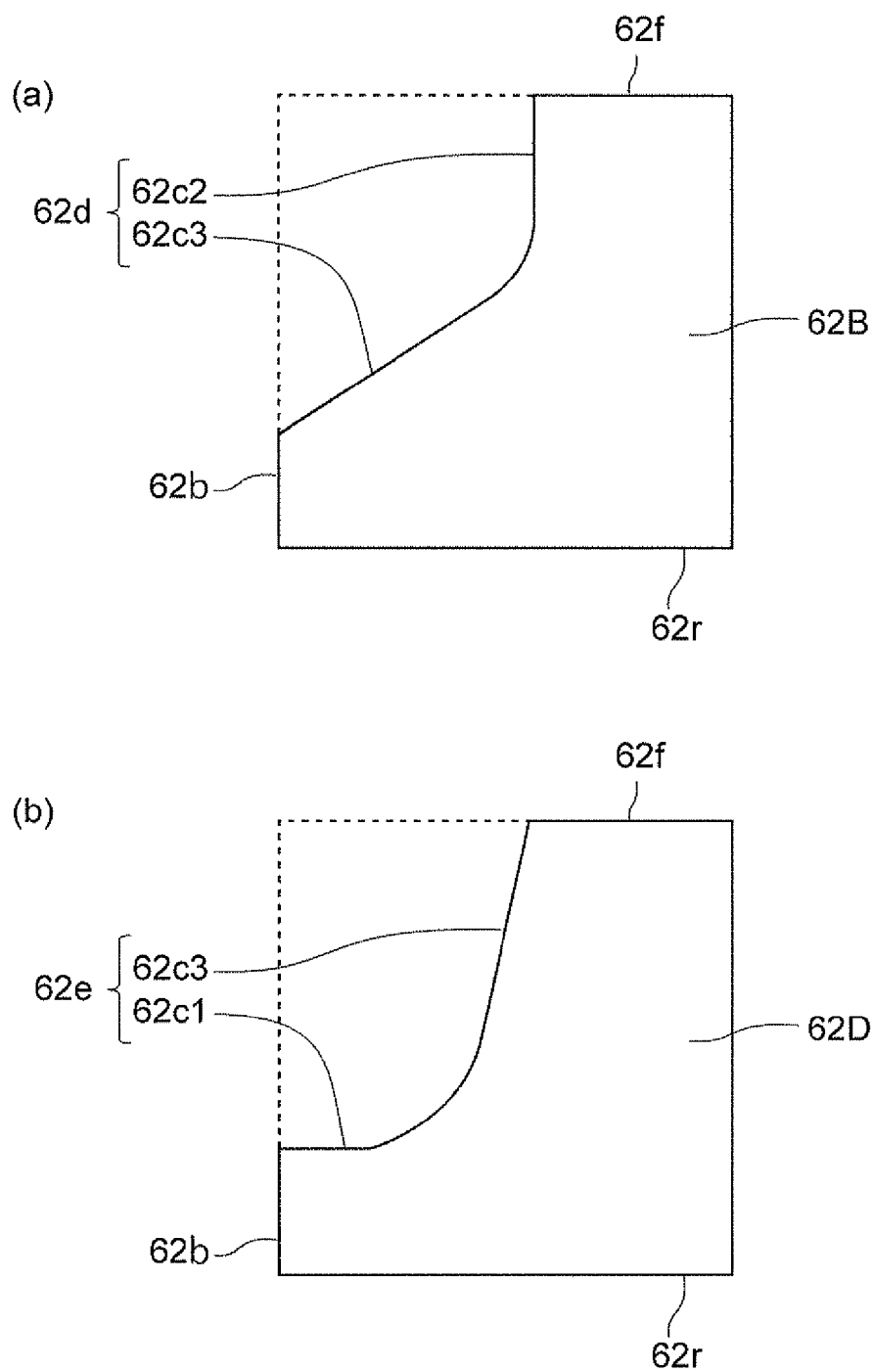
FIG. 11 illustrates a modified example, in which (a) is a side elevation view of the upper front shield part not having a lateral flat part, in which (b) is a side elevation view of the upper front shield part not having a longitudinal flat part.

The above-described thin-film magnetic head 300 may have the upper front shield part 62B as illustrated in FIG. 11(*a*) in place of the above-described upper front shield part 62. The upper front shield part 62B is different in that it has a shield connecting part 62*d* in place of the shield connecting part 62*c*, as compared with the upper front shield part 62. The shield connecting part 62*d* is different in that it dose not have the lateral flat part 62*c*1, as compared with the shield connecting part 62*c*.

The thin-film magnetic head 300 may have the upper front shield part 62D as illustrated in FIG. 11(*b*) in place of the upper front shield part 62. The upper front shield part 62D is different in that it has a shield connecting part 62*e* in place of the shield connecting part 62*c*, as compared with the upper front shield part 62. The shield connecting part 62*e* is different in that it dose not have the longitudinal flat part 62*c*2, as compared with the shield connecting part 62*c*.

In both of the case where the upper front shield part 62B is provided and the case where the upper front shield part 62D is provided, the shield front end face 62*b* is disposed in the ABS 30 and the size of the part thereof exposed in the ABS 30 is reduced as compared to that of the pre-trim front shield part 62A. Therefore, the possibility of projection of the upper front shield parts 62B, 62D is surely suppressed as compared to the pre-trim front shield part 62A. Accordingly, both of the suppression of projection of a part of the medium-opposing surface and the reduction in magnetic path length can be realized in both of the case where the upper front shield part 62B is provided and the case where the upper front shield part 62D is provided.

Second Embodiment

Figure 29:
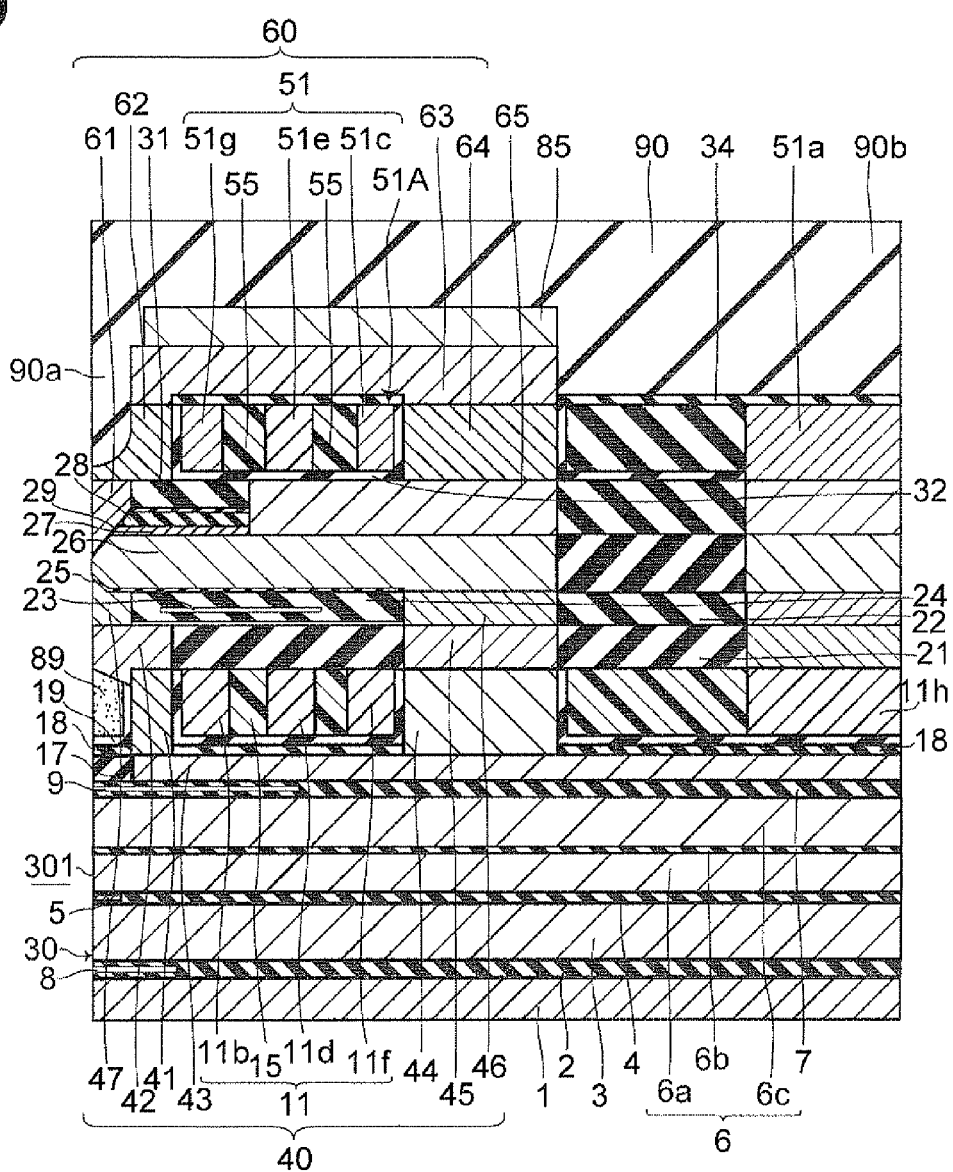
FIG. 29 is a sectional view of the thin-film magnetic head according to a second embodiment of the present invention corresponding to FIG. 1, along by a direction intersecting its air bearing surface.
Figure 30:
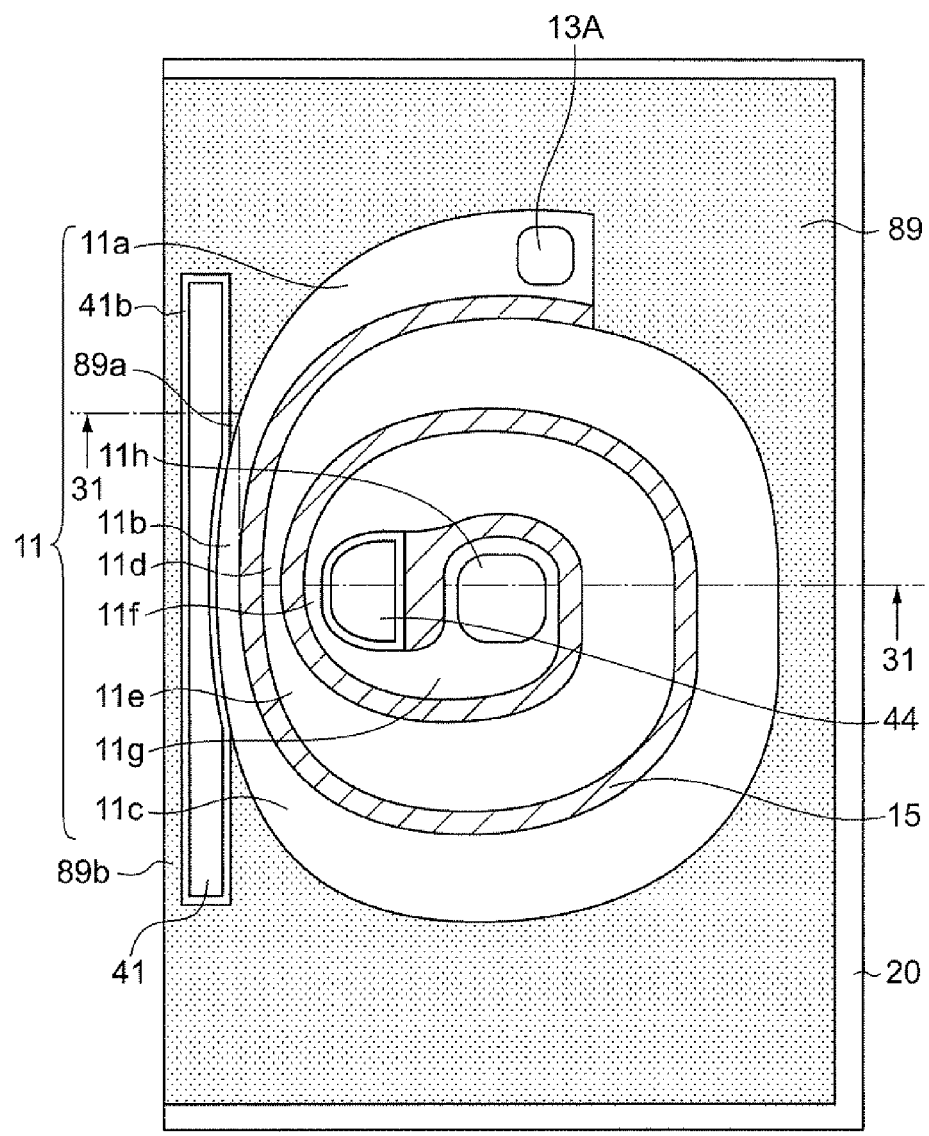
FIG. 30 is a plan view illustrating a lower thin-film coil, a hard guard frame layer and a lower front shield part of the thin-film magnetic head illustrated in FIG. 29.
Figure 31:
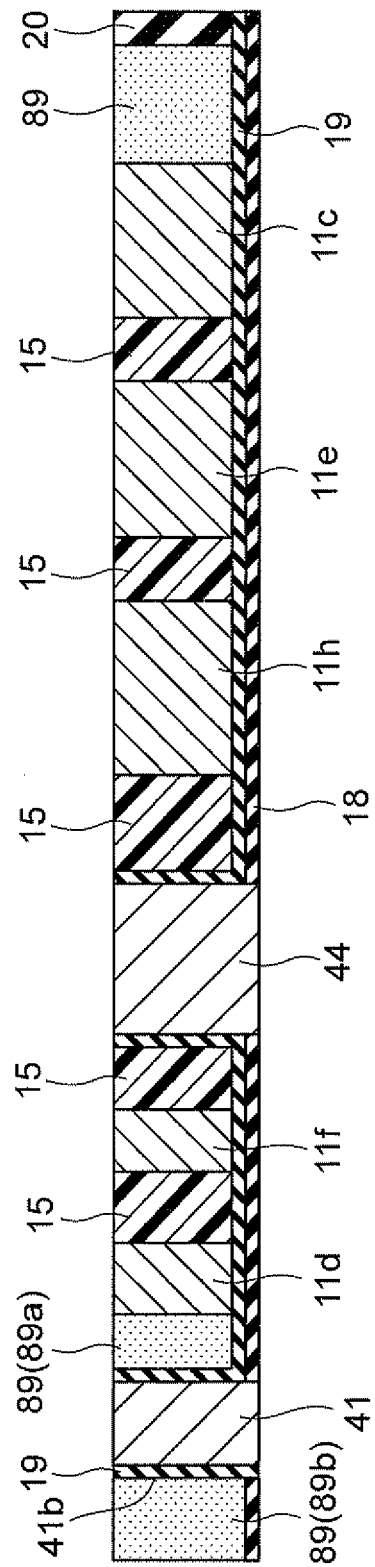
FIG. 31 is a sectional view taken along the line 31-31 of FIG. 30.

The thin-film magnetic head of perpendicular magnetic recording type according to the second embodiment of the present invention will now be explained with reference to FIG. 29 to FIG. 31. Here, FIG. 29 is a sectional view of the thin-film magnetic head 301 according to a second embodiment of the present invention corresponding to FIG. 1, along by a direction intersecting ABS 30. FIG. 30 is a plan view illustrating the lower thin-film coil 11, a hard guard frame layer 89 and the lower front shield part 41.

Since the thin-film magnetic head 301 includes configurations identical to those of the thin-film magnetic head 300, configurations of the thin-film magnetic head 301 different from those of the thin-film magnetic head 300 will mainly be explained in the following, while omitting or simplifying their common configurations.

The recording head of the thin-film magnetic head 301 is different in that it has the hard guard frame layer 89 in place of the hard guard frame layer 49, as compared with the recording head of the thin-film magnetic head 300.

The hard guard frame layer 89 surrounds the whole of the lower thin-film coil 11 and the lower front shield part 41 from outside and is in direct contact with almost the whole outside surface of the lower thin-film coil 11 and outside surface 41*b* of the lower front shield part 41. Further, the hard guard frame layer 89 has a wraparound end part 89*a* similar to the wraparound end part 49*a*. Further, the hard guard frame layer 89 has a front end part 89*b*. The front end part 89*b* is disposed closer to the ABS 30 than is the lower front shield part 41, and is in contact with the outside surface 41*b* on the ABS 30 side of the lower front shield part 41 via the insulating layer 19.

Since the thin-film magnetic head 301 has the hard guard frame layer 89 as described above, it is possible to hold the lower thin-film coil 11 which tends to spread outward due to the expansion of the photoresist layer 15 inside the hard guard frame layer 89 and prevent it from reaching the outside of the hard guard frame layer 89. The hard guard frame layer 89 has the front end part 89*b* unlike the hard guard frame layer 49. The front end part 89*b* is disposed closer to the ABS 30 than is the lower front shield part 41, and is in contact with the outside surface 41*b* on the ABS 30 side of the lower front shield part 41 via the insulating layer 19.

When the Joule heat generated by the lower thin-film coil 11 expands the photoresist layer 15, the photoresist layer 15 applies an outward pressure to the lower thin-film coil 11. In this event, the lower front shield part 41 is disposed on the ABS 30 side of the lower thin-film coil 11, and therefore the lower front shield part 41 receives the pressure toward the ABS 30 side from the lower thin-film coil 11. However, the front end part 89*b* of the hard guard frame layer 89 is disposed on the ABS 30 side of the lower front shield part 41. The whole of the lower thin-film coil 11 and the lower front shield part 41 are surrounded by the hard guard frame layer 89. In the thin-film magnetic head 301, the hard guard frame layer 89 can receive the outward spreading of the lower thin-film coil 11 and the lower front shield part 41, at a position closer to the ABS 30 than that by the hard guard frame layer 49. Therefore, the partial protrusion of the ABS 30 can be more surely suppressed in the thin-film magnetic head 301. Further, the front end part 89*b* is disposed in the ABS 30, whereby the lower thin-film coil 11, the shield magnetic layer 40 and so on can be protected from impact.

Figure 32:
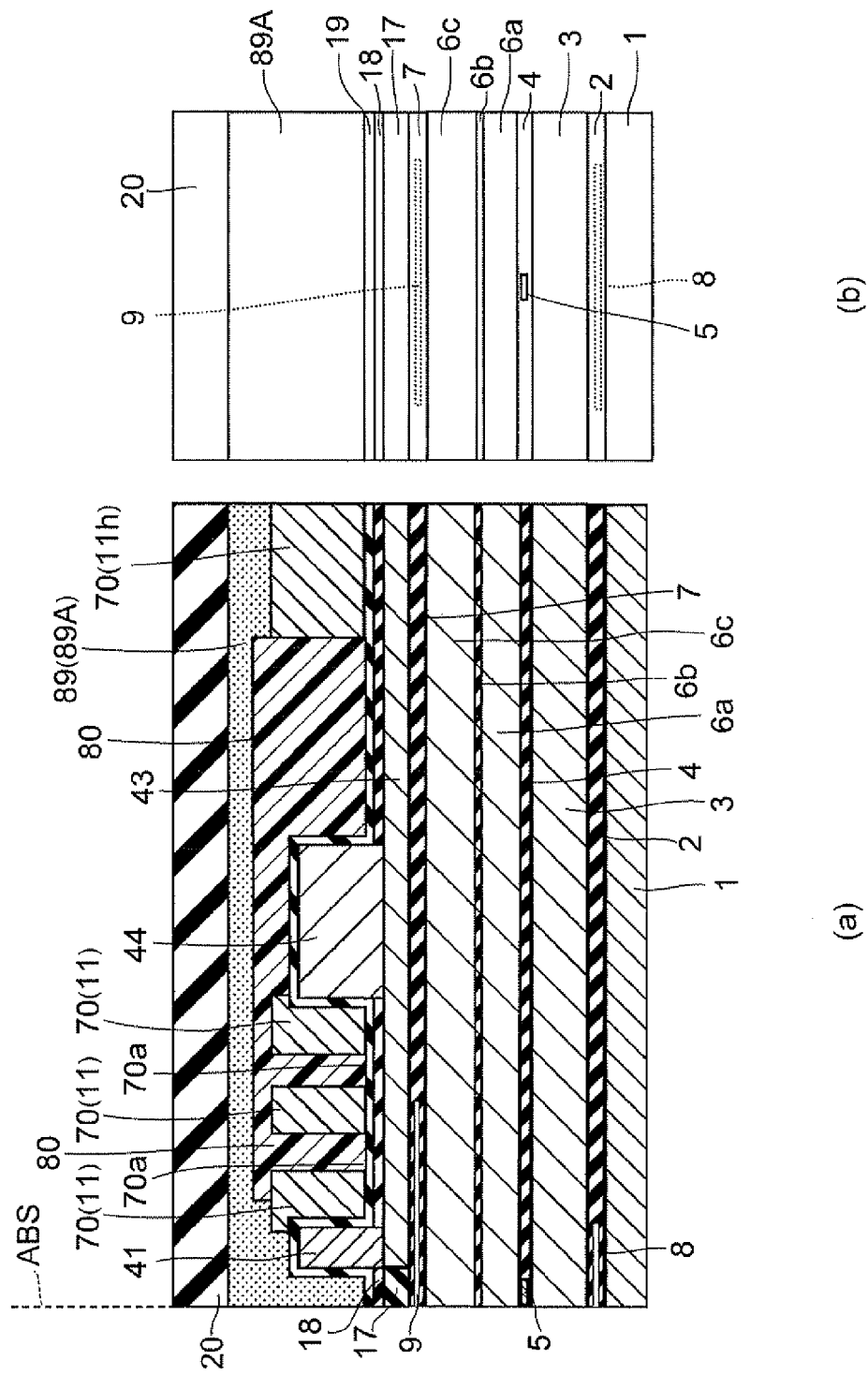
FIG. 32 illustrates a step of manufacturing the thin-film magnetic head illustrated in FIG. 30, in which (a) is a sectional view corresponding to FIG. 1, in which (b) is a front view corresponding to FIG. 2.

Meanwhile, when the thin-film magnetic head 301 is manufactured, a hard nonmagnetic layer 89A is formed by performing the hard nonmagnetic layer forming step after forming the photoresist layer 80 as in the case of manufacturing the thin-film magnetic head 300. The hard nonmagnetic layer 89A has the above-described wraparound end part 89*a* and is formed such that the above-described front end part 89*b* is disposed in the ABS 30 of the lower front shield part 41 as illustrated in FIG. 32(*a*), FIG. 32(*b*). Though the hard nonmagnetic layer 49A is receding from the ABS 30 when manufacturing the thin-film magnetic head 300, the hard nonmagnetic layer 89A is disposed in the ABS 30 when manufacturing the thin-film magnetic head 301. The subsequent steps are performed similarly to the case when the thin-film magnetic head 300 is manufactured. Incidentally, if the flattening is performed in the state illustrated in FIG. 32, the above-described hard guard frame layer 89 is formed together with the thin-film coil 11.

Third Embodiment

Figure 33:
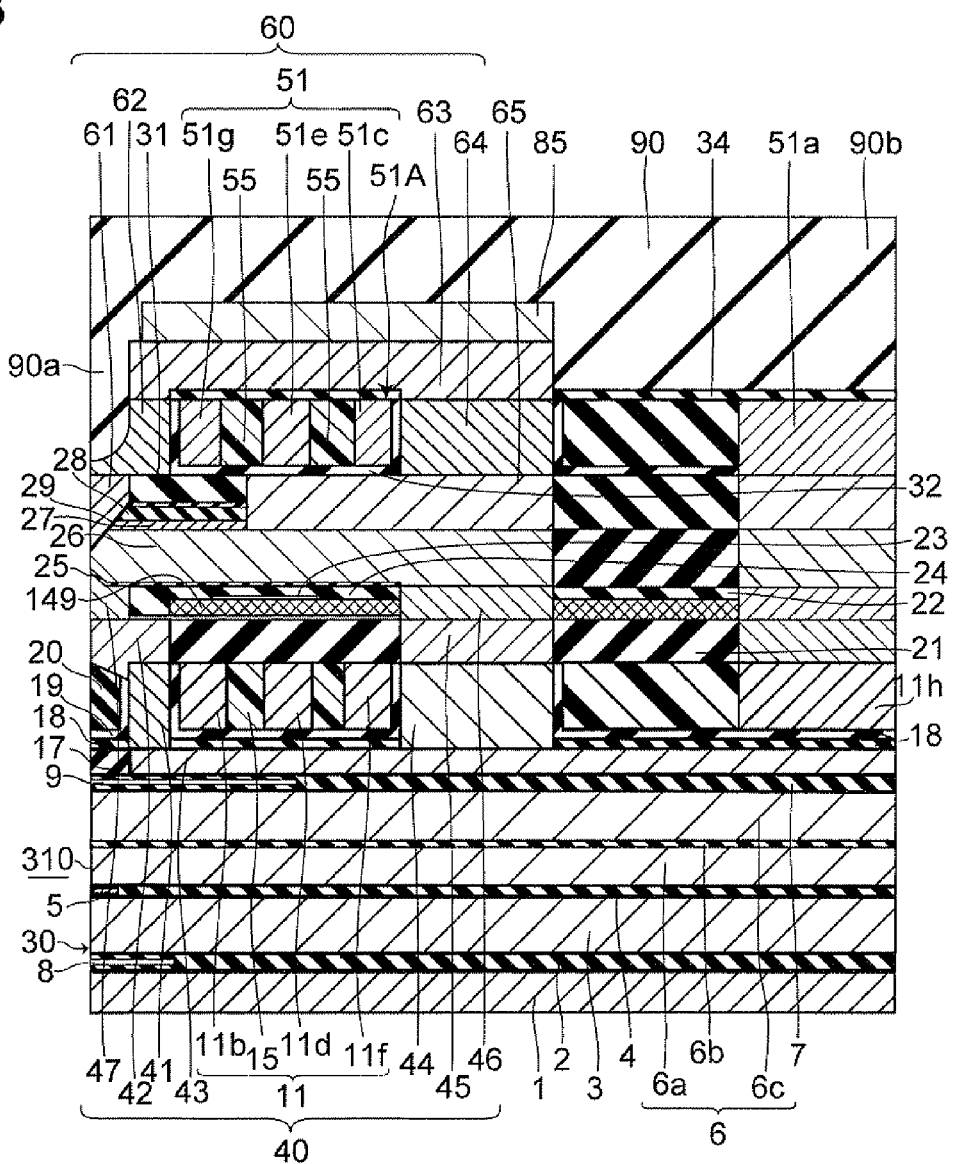
FIG. 33 is a sectional view of the thin-film magnetic head according to a third embodiment of the present invention, along by a direction intersecting its air bearing surface.
Figure 34:
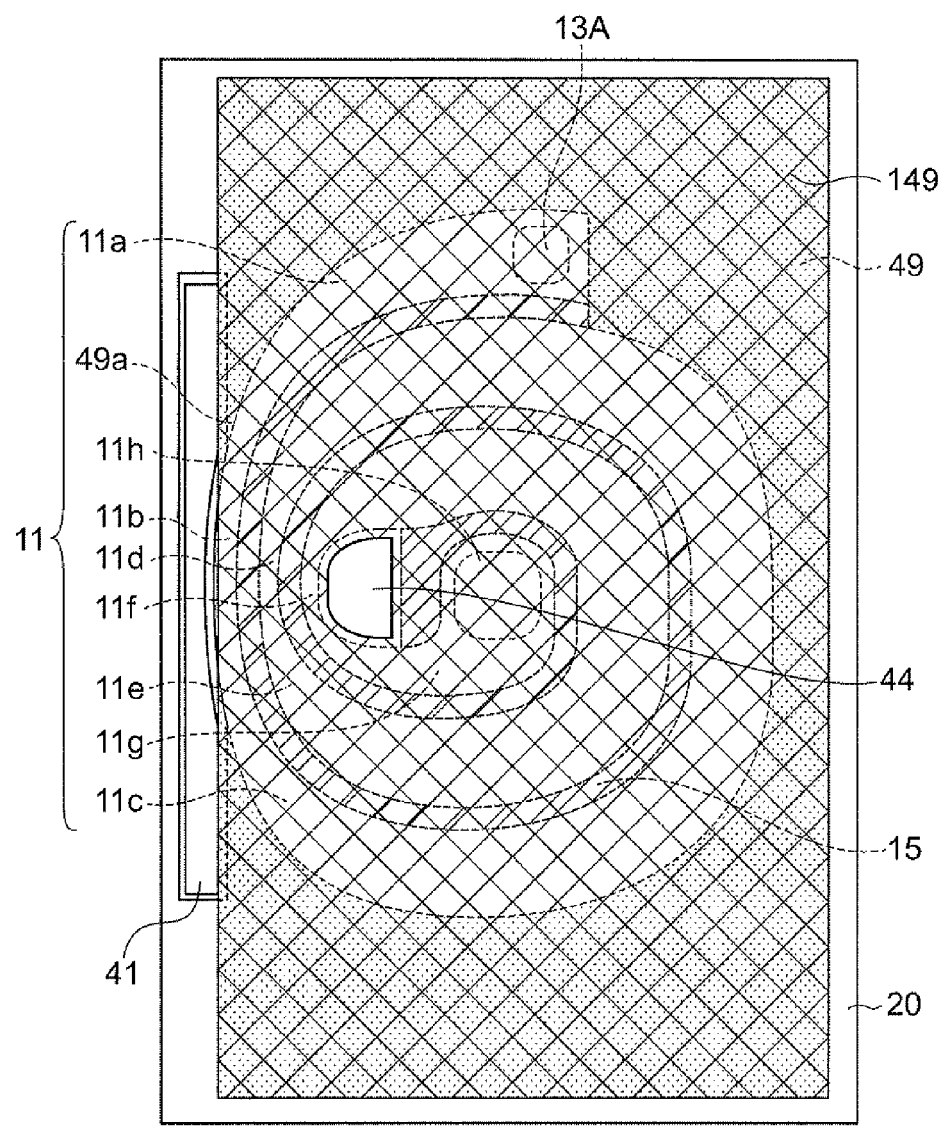
FIG. 34 is a plan view illustrating a lower thin-film coil, a hard guard frame layer, a lower front shield part and a middle adiabatic layer of the thin-film magnetic head illustrated in FIG. 30.
Figure 35:
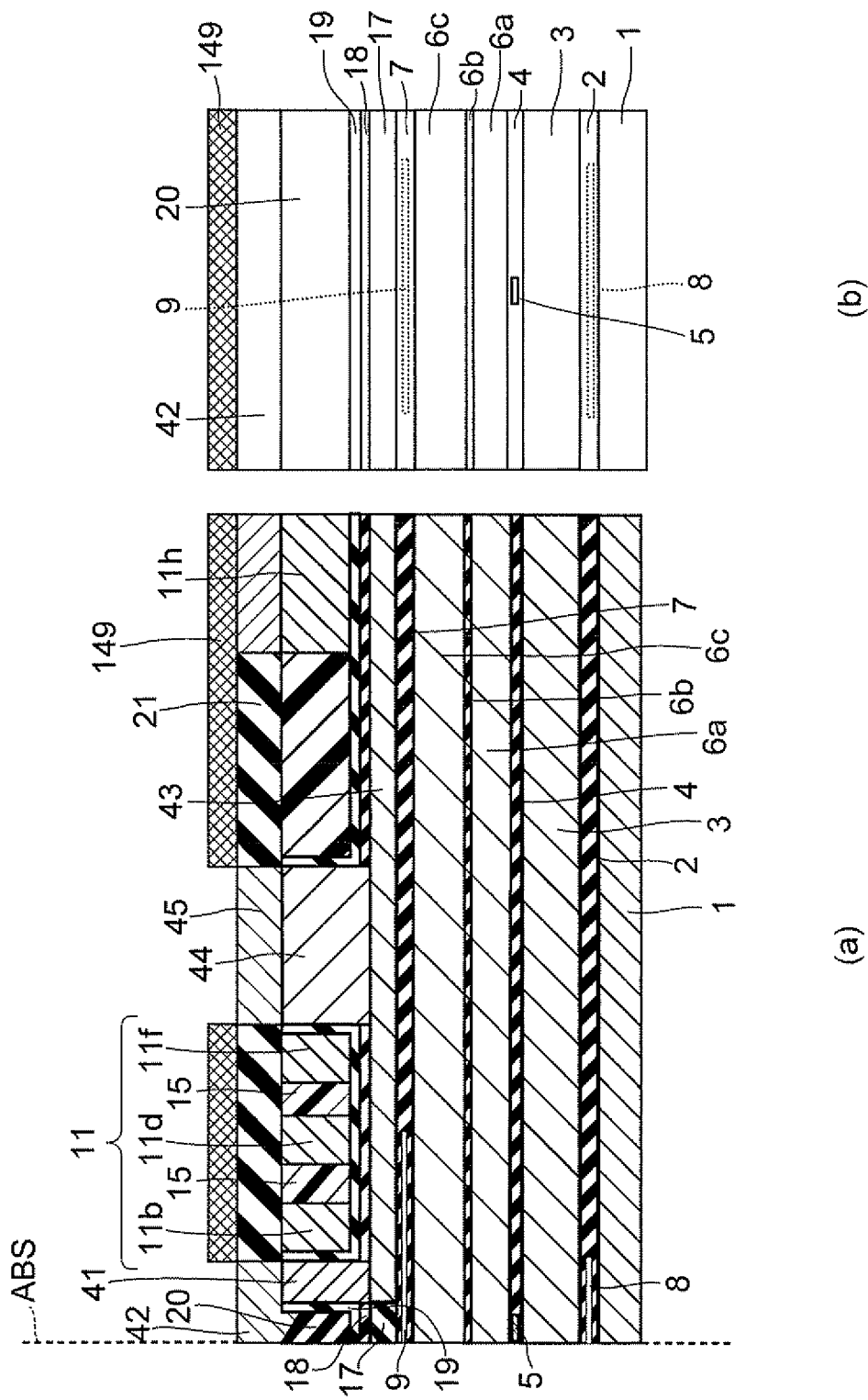
FIG. 35 illustrates a step of manufacturing the thin-film magnetic head illustrated in FIG. 33, in which (a) is a sectional view corresponding to FIG. 1, in which (b) is a front view corresponding to FIG. 2.

The thin-film magnetic head of perpendicular magnetic recording type according to the third embodiment of the present invention will now be explained with reference to FIG. 33 to FIG. 35. Here, FIG. 33 is a sectional view of the thin-film magnetic head 310 according to a third embodiment of the present invention corresponding to FIG. 1, along by a direction intersecting ABS 30. FIG. 34 is a plan view illustrating the lower thin-film coil 11, the hard guard frame layer 49, the lower front shield part 41 and a middle adiabatic layer 149. FIG. 35 (*a*) is a sectional view corresponding to FIG. 1, in a step of manufacturing the thin-film magnetic head 310, FIG. 35 (*b*) is a front view corresponding to FIG. 2, in a step of manufacturing the thin-film magnetic head 310.

Since the thin-film magnetic head 310 includes configurations identical to those of the thin-film magnetic head 300, configurations of the thin-film magnetic head 310 different from those of the thin-film magnetic head 300 will mainly be explained in the following, while omitting or simplifying their common configurations.

The recording head of the thin-film magnetic head 310 is different in that it has the middle adiabatic layer 149, as compared with the recording head of the thin-film magnetic head 300.

The middle adiabatic layer 149 is formed using a nonmagnetic material with a heat conductivity lower than that of alumina. Since, for example, silicon nitride ($Si_3N_4$) is lower in heat conductivity than alumina, the middle adiabatic layer 149 can be formed using silicon nitride.

The middle adiabatic layer 149 is formed between the lower thin-film coil 11 and the main magnetic pole layer 26. The middle adiabatic layer 149 is formed to cover almost the whole upper face of the lower thin-film coil 11 on the side distanced from the substrate.

Since the thin-film magnetic head 310 has the hard guard frame layer 49, the lower thin-film coil 11 which tends to spread outward due to the expansion of the photoresist layer 15 can be restrained by the hard guard frame layer 49. In addition, because the middle adiabatic layer 149 is provided, it is possible to inhibit the Joule heat generated by the lower thin-film coil 11 from being conducted from the lower thin-film coil 11 to the main magnetic pole layer 26. If the Joule heat generated by the lower thin-film coil 11 is conducted to the main magnetic pole layer 26, the main magnetic pole layer 26 expands and possibly causes the ABS 30 to partially protrude.

However, the middle adiabatic layer 149 is formed between the lower thin-film coil 11 and the main magnetic pole layer 26 in the thin-film magnetic head 310, the Joule heat generated by the lower thin-film coil 11 is less likely to be conducted to the main magnetic pole layer 26. Therefore, it is possible to suppress the partial protrusion of the ABS 30 caused by the Joule heat generated by the lower thin-film coil 11 without increasing the sectional area of the lower thin-film coil 11.

Then, when the thin-film magnetic head 310 is manufactured, the middle adiabatic layer 149 is formed by performing a middle adiabatic layer forming step after forming the connecting shield part 42 and the second rear shield part 45 as in the case of manufacturing the thin-film magnetic head 300. In other words, the middle adiabatic layer 149 is formed using a nonmagnetic material with a heat conductivity lower than that of alumina to cover almost the upper face on the side distanced from the substrate 1 of the lower thin-film coil 11 as illustrated in FIG. 35(*a*), FIG. 35(*b*). The subsequent steps are performed similarly to the case when the thin-film magnetic head 300 is manufactured.

Forth Embodiment

Figure 36:
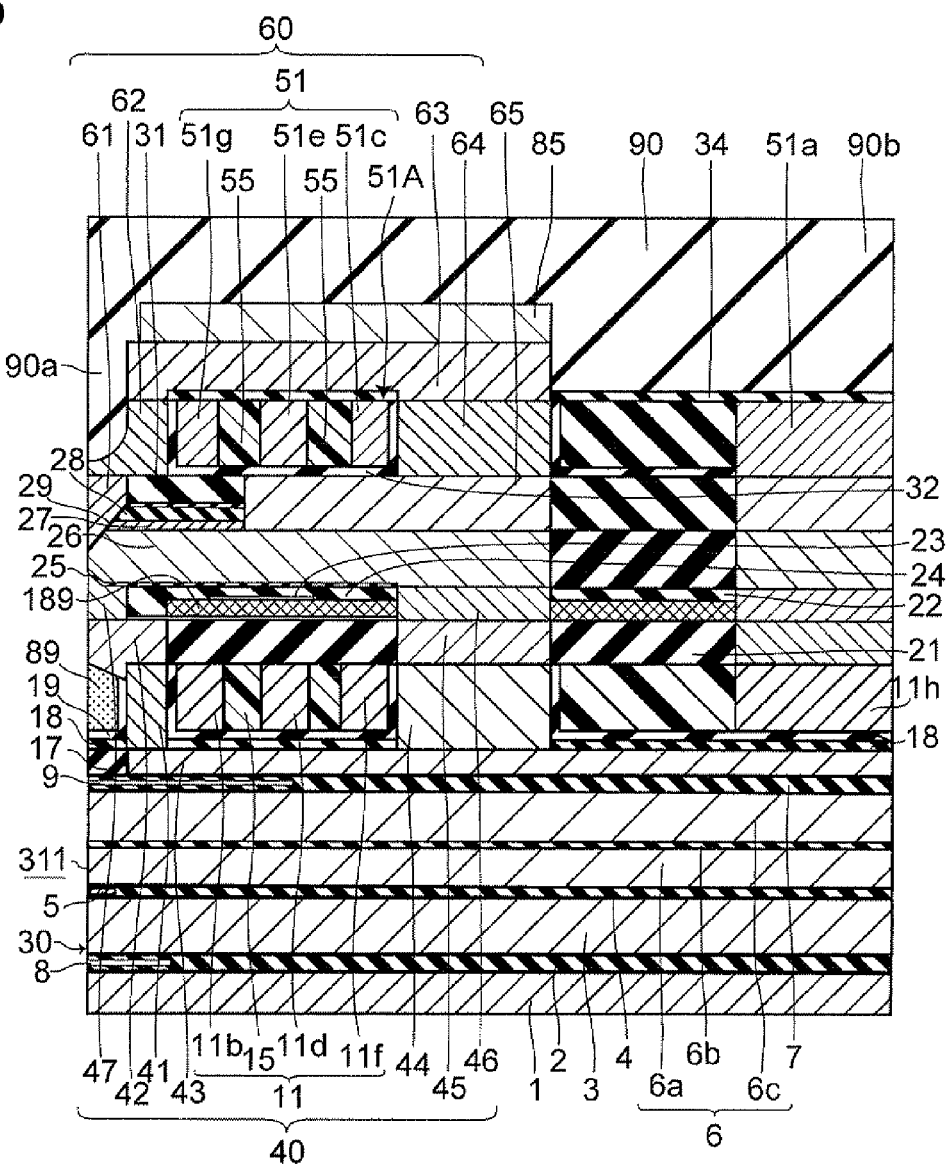
FIG. 36 is a sectional view of the thin-film magnetic head according to a forth embodiment of the present invention, along by a direction intersecting its air bearing surface.
Figure 37:
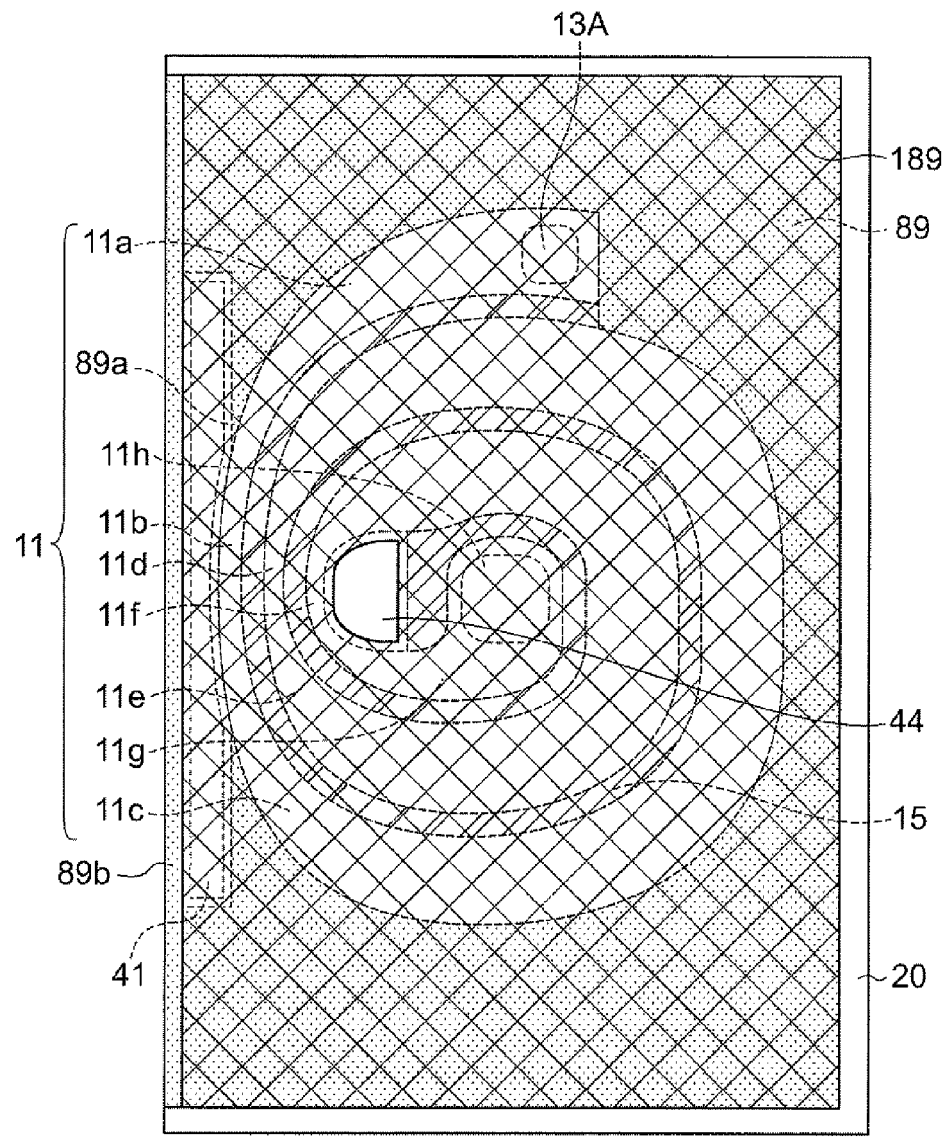
FIG. 37 is a plan view illustrating the lower thin-film coil, the hard guard frame layer, the lower front shield part and a middle adiabatic layer of the thin-film magnetic head illustrated in FIG. 36.
Figure 38:
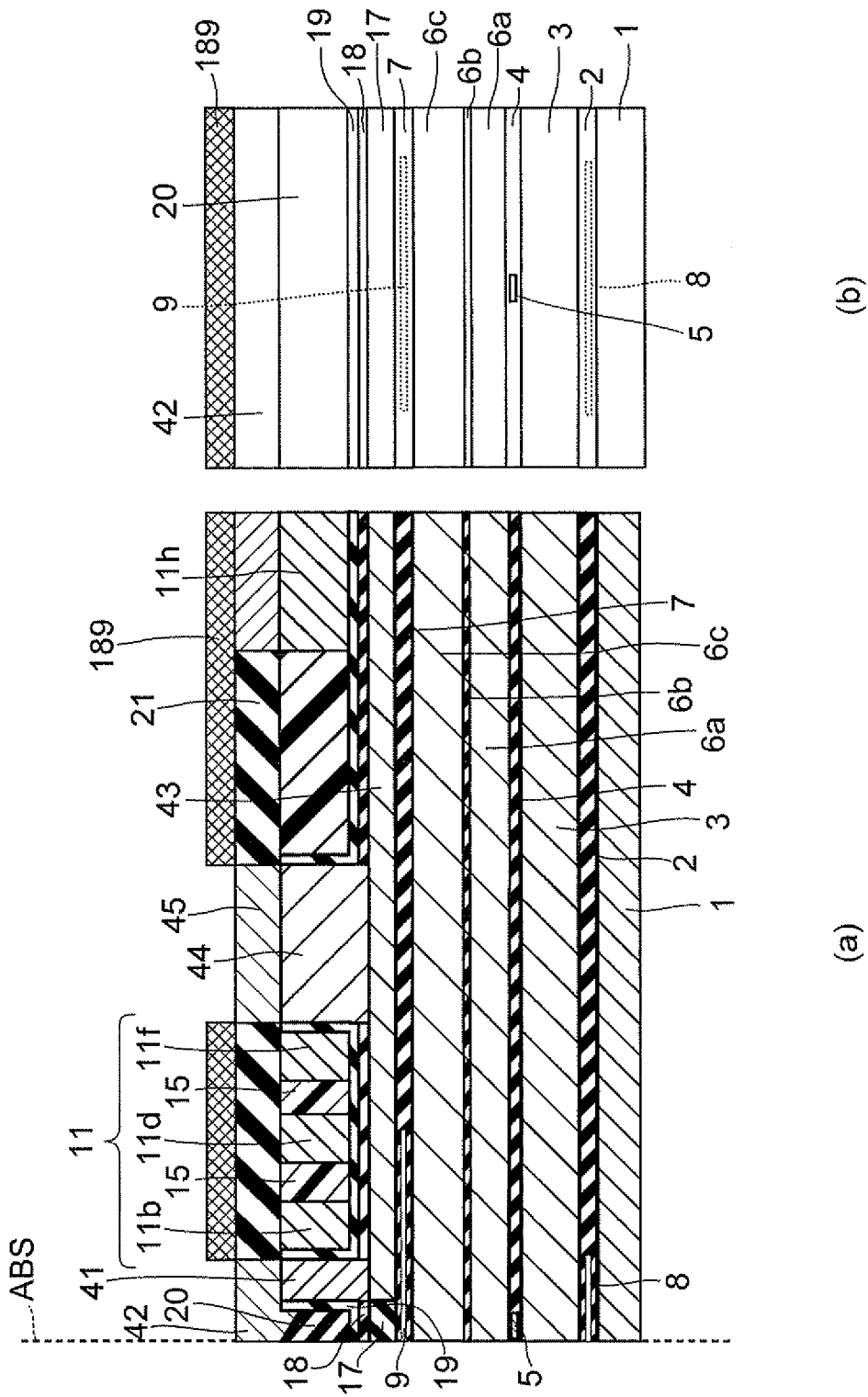
FIG. 38 illustrates a step of manufacturing the thin-film magnetic head illustrated in FIG. 36, in which (a) is a sectional view corresponding to FIG. 1, in which (b) is a front view corresponding to FIG. 2.

The thin-film magnetic head of perpendicular magnetic recording type according to the forth embodiment of the present invention will now be explained with reference to FIG. 36 to FIG. 38. Here, FIG. 36 is a sectional view of the thin-film magnetic head 311 according to a forth embodiment of the present invention corresponding to FIG. 1, along by a direction intersecting ABS 30. FIG. 37 is a plan view illustrating the lower thin-film coil 11, the hard guard frame layer 89, the lower front shield part 41 and a middle adiabatic layer 189. FIG. 38 (*a*) is a sectional view corresponding to FIG. 1, in a step of manufacturing the thin-film magnetic head 311, FIG. 38 (*b*) is a front view corresponding to FIG. 2, in a step of manufacturing the thin-film magnetic head 311.

Since the thin-film magnetic head 311 includes configurations identical to those of the thin-film magnetic head 301, configurations of the thin-film magnetic head 311 different from those of the thin-film magnetic head 301 will mainly be explained in the following, while omitting or simplifying their common configurations.

The recording head of the thin-film magnetic head 311 is different in that it has the middle adiabatic layer 189, as compared with the recording head of the thin-film magnetic head 301.

The middle adiabatic layer 189 is formed using a nonmagnetic material with a heat conductivity lower than that of alumina as with middle adiabatic layer 149. The middle adiabatic layer 189 can be formed using, for example, silicon nitride.

The middle adiabatic layer 189 is formed between the lower thin-film coil 11 and the main magnetic pole layer 26. The middle adiabatic layer 189 is formed to cover almost upper faces of the lower front shield part 41 and the lower thin-film coil 11 on the side distanced from the substrate 1.

Since the thin-film magnetic head 311 has the hard guard frame layer 89, the lower thin-film coil 11 which tends to spread outward due to the expansion of the photoresist layer 15 can be restrained by the hard guard frame layer 89 as in the thin-film magnetic head 301. In addition, because the middle adiabatic layer 189 is provided, it is possible to inhibit the Joule heat generated by the lower thin-film coil 11 from being conducted from the lower thin-film coil 11 to the main magnetic pole layer 26. Therefore, it is possible in the thin-film magnetic head 311 to suppress the partial protrusion of the ABS 30 caused by the Joule heat generated by the lower thin-film coil 11 without increasing the sectional area of the lower thin-film coil 11 as in the thin-film magnetic head 301 and in the thin-film magnetic head 310.

Then, when the thin-film magnetic head 311 is manufactured, the middle adiabatic layer 189 is formed by performing the middle adiabatic layer forming step after forming the connecting shield part 42 and the second rear shield part 45 as in the case of manufacturing the thin-film magnetic head 301. In other words, the middle adiabatic layer 189 is formed using a nonmagnetic material with a heat conductivity lower than that of alumina to cover almost the upper faces of the lower thin-film coil 11 and the lower front shield part 41 on the side distanced from the substrate 1, as illustrated in FIG. 38(*a*), FIG. 38(b). The subsequent steps are performed similarly to the case when the thin-film magnetic head 301 is manufactured.

Fifth Embodiment

Figure 40:
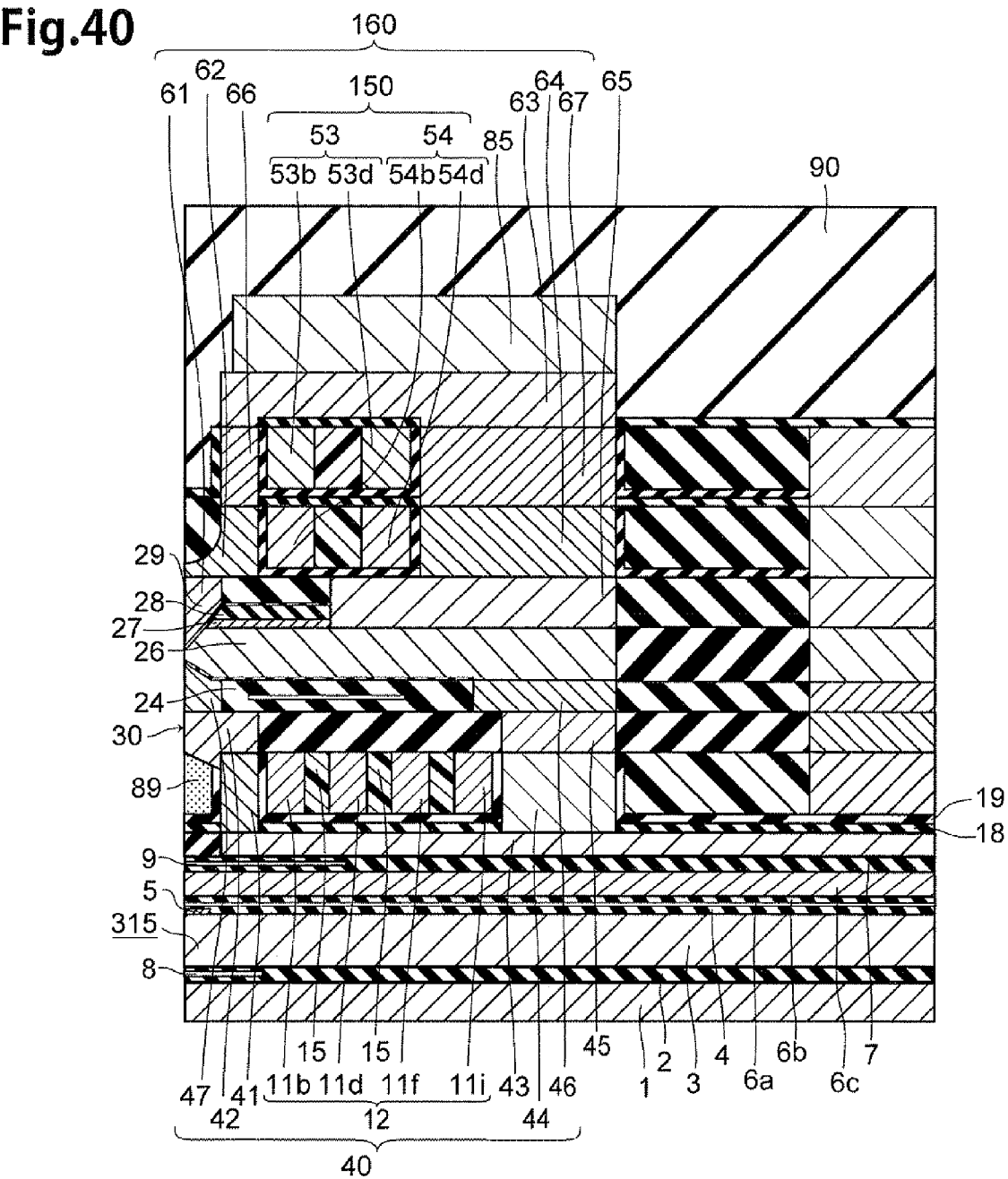
FIG. 40 is a sectional view of the thin-film magnetic head according to a fifth embodiment of the present invention, along by a direction intersecting its air bearing surface.

The thin-film magnetic head of perpendicular magnetic recording type according to the fifth embodiment of the present invention will now be explained with reference to FIG. 40. Here, FIG. 40 is a sectional view of the thin-film magnetic head 315 according to a fifth embodiment of the present invention corresponding to FIG. 1, along by a direction intersecting ABS 30.

This thin-film magnetic head 315 is different in that it has an lower thin-film coil 12 in place of the lower thin-film coil 11, and that it has an upper thin-film coil 150 in place of the upper thin-film coil 50, as compared with the above-described thin-film magnetic head 301.

The lower thin-film coil 12 is different in that it has four turns, as compared with the lower thin-film coil 11. That is to say, the lower thin-film coil 12 has a turn part 11i in addition to the turn part 11b, 11d, 11f.

Further, the upper thin-film coil 150 has a first coil-layer 54 and a second coil-layer 53 which are arranged at a position distanced from the ABS 30, while an upper conductor group is constituted by the first coil-layer 54 and second coil-layer 53. The first coil-layer 54 and second coil-layer 53 are arranged in the direction (up and down direction) along the ABS 30. The second coil-layer 53 overlies the first coil-layer 54 while interposing the coil interlayer insulating layer therebetween. The upper thin-film coil 150 has the overlapping structure by two layers. The first coil-layer 54 and second coil-layer 53 has two turns.

Since the thin-film magnetic head 315 has the hard guard frame layer 89, the lower thin-film coil 11 which tends to spread outward due to the expansion of the photoresist layer 15 can be restrained by the hard guard frame layer 89 as in the thin-film magnetic head 301. Therefore, it is possible to suppress the partial protrusion of the ABS 30 without increasing the sectional area of the lower thin-film coil 11. Further, since the upper thin-film coil 150 has the overlapping structure, the depth from the ABS 30 can be reduced.

(Embodiments of Head Gimbal Assembly and Hard Disk Drive)

Figure 42:
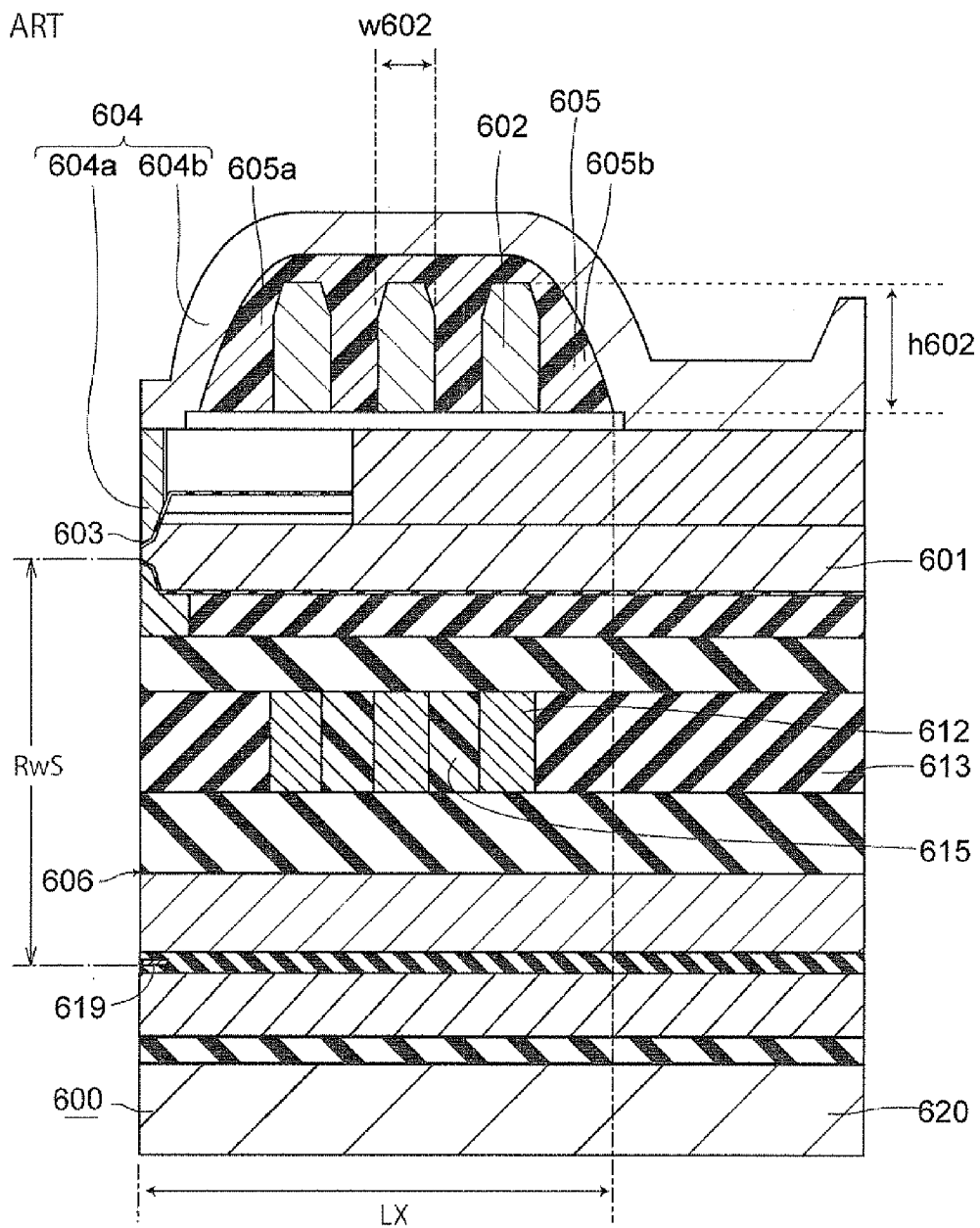
FIG. 42 is a sectional view illustrating an example of a conventional thin-film magnetic head.

Next, embodiments of the head gimbal assembly and hard disk drive will now be explained with reference to FIG. 42.

FIG. 41 (a) is a perspective view illustrating a hard disk drive 201 equipped with the above-mentioned thin-film magnetic head 300. FIG. 41 (b) is a perspective view illustrating a rear side of HGA 210. As illustrated in FIG. 41 (a), the hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding thin-film magnetic head 300.

The hard disk drive 201 positions a slider 208 illustrated in FIG. 41 (b) on a track by an assembly carriage device 203. The thin-film magnetic head 300 is formed on this slider 208. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, an HGA 210 is attached to the tip of each drive arm.

Further, the hard disk drive 201 has a control circuit 204 controlling recording/reproducing.

The HGA 210 will now be described with reference to FIG. 41 (b). In the HGA 210, the slider 208 is fixed to a tip portion of a suspension 220. Further, in the HGA 210, one end portion of a wiring member 224 is electrically connected to a terminal electrode of the slider 208.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

In the hard disk drive 201, when the HGA 210 is rotated, the slider 208 moves in a radial direction of the hard disk 202, i.e., a direction traversing track lines.

Such HGA 210 and hard disk drive 201 having the thin-film magnetic head 300 are able to suppress a partial protrusion of the ABS.

In the each above-described embodiments, the thin-film magnetic head having the displacement suppression layer is explained by way of example. The present invention is also applicable to thin-film magnetic head not having the displacement suppression layer. Besides, the thin-film coil is wound as a flat spiral about the shield magnetic layer 40, the write shield layer 60, but the thin-film coil may be wound helically about the main magnetic pole layer 26.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A thin-film magnetic head comprising:
   a main magnetic pole layer having a magnetic pole end face on a side of a medium-opposing surface that opposes a recording medium;
   a write shield layer having a write shield end face disposed in the medium-opposing surface;
   a gap layer formed between the main magnetic pole layer and write shield layer;
   a thin-film coil wound around any of the main magnetic pole layer, the write shield layer or a shield magnetic layer connected to the main magnetic pole layer, wherein the main magnetic pole layer, the write shield layer, the gap layer and the thin-film coil are laminated on a substrate; and
   a hard guard frame layer surrounding an equidistant coil part from outside and being in direct contact with almost a whole outside side surface defining an outer shape of the equidistant coil part, the outside side surface extending in a direction parallel to the medium-opposing surface, wherein a part of the thin-film coil disposed at a position equidistant from the substrate is the equidistant coil part.

2. The thin-film magnetic head according to claim 1, wherein the hard guard frame layer has a thickness equal to a thickness of the equidistant coil part, and is in direct contact with the whole outside surface at a part of the equidistant coil part which is distanced more from the medium-opposing surface than is the main magnetic pole layer.

3. The thin-film magnetic head according to claim 1, wherein the hard guard frame layer is formed using a hard nonmagnetic material having a higher Vickers hardness than that of alumina.

4. A thin-film magnetic head comprising:
a main magnetic pole layer having a magnetic pole end face on a side of a medium-opposing surface opposing a recording medium;
a write shield layer having a write shield end face disposed in the medium-opposing surface;
a gap layer formed between the main magnetic pole layer and write shield layer;
a thin-film coil wound around any of the main magnetic pole layer, the write shield layer or a shield magnetic layer connected to the main magnetic pole layer, wherein the main magnetic pole layer, the write shield layer, the gap layer and the thin-film coil are laminated on a substrate; and
a hard guard frame layer surrounding an equidistant coil part from outside and being in direct contact with almost a whole outside surface defining an outer shape of the equidistant coil part,
wherein a part of the thin-film coil disposed at a position equidistant from the substrate is the equidistant coil part,
wherein the thin-film coil has, as the equidistant coil part, a lower coil layer disposed closer to the substrate than is the main magnetic pole layer and an upper coil layer disposed at a position distanced more from the substrate than is the main magnetic pole layer,
wherein the shield magnetic layer has a lower front shield part disposed closer to the medium-opposing surface than is the lower coil layer, and
wherein the hard guard frame layer has a wraparound end part which is wrapped around to the medium-opposing surface side of the lower coil layer, inserted in a gap between the lower front shield part and the lower coil layer, and in direct contact with an outside surface on the medium-opposing surface side of the lower coil layer.

5. The thin-film magnetic head according to claim 4, further comprising:
a middle adiabatic layer disposed between the lower coil layer and the main magnetic pole layer and formed to cover almost a whole upper face of the lower coil layer on a side distanced from the substrate.

6. The thin-film magnetic head according to claim 4, further comprising:
an upper hard guard frame layer surrounding the upper coil layer from outside and being in direct contact with almost a whole outside surface defining an outer shape of the upper coil layer.

7. The thin-film magnetic head according to claim 4, wherein the shield magnetic layer further comprises a connecting shield part connected to the lower front shield part and disposed in the medium-opposing surface,
and a front end angle representing an angle formed between a front end face disposed in the medium-opposing surface of the connecting shield part and a lower end face connected to the front end face and disposed at a position closest to the substrate in the connecting shield part is set at an obtuse angle.

8. A thin-film magnetic head comprising:
a main magnetic pole layer having a magnetic pole end face on a side of a medium-opposing surface that opposes a recording medium;
a write shield layer having a write shield end face disposed in the medium-opposing surface;
a gap layer formed between the main magnetic pole layer and write shield layer;
a thin-film coil wound around any of the main magnetic pole layer, the write shield layer or a shield magnetic layer connected to the main magnetic pole layer, the shield magnetic layer having a front shield part disposed closer to the medium-opposing surface than is an equidistant coil part, where a part of the thin-film coil disposed at a position equidistant from the substrate is the equidistant coil part, wherein the main magnetic pole layer, the write shield layer, the gap layer and the thin-film coil are laminated on a substrate; and
a hard guard frame layer surrounding the whole of the equidistant coil part and the front shield part from outside and being in contact with almost whole outside side surfaces defining outer shapes of the equidistant coil part and the front shield part, the outside side surfaces extending in a direction parallel to the medium-opposing surface.

9. A thin-film magnetic head comprising:
a main magnetic pole layer having a magnetic pole end face on a side of a medium-opposing surface opposing a recording medium;
a write shield layer having a write shield end face disposed in the medium-opposing surface;
a gap layer formed between the main magnetic pole layer and write shield layer;
a thin-film coil wound around any of the main magnetic pole layer, the write shield layer or a shield magnetic layer connected to the main magnetic pole layer, the shield magnetic layer having a front shield part disposed closer to the medium-opposing surface than is an equidistant coil part, where a part of the thin-film coil disposed at a position equidistant from the substrate is the equidistant coil part, wherein the main magnetic pole layer, the write shield layer, the gap layer and the thin-film coil are laminated on a substrate; and
a hard guard frame layer surrounding the whole of the equidistant coil part and the front shield part from outside and being in contact with almost whole outside surfaces defining outer shapes of the equidistant coil part and the front shield part,
wherein the thin-film coil has, as the equidistant coil part, a lower coil layer disposed closer to the substrate than is the main magnetic pole layer and an upper coil layer disposed at a position distanced more from the substrate than is the main magnetic pole layer,
wherein the front shield part includes a lower front shield part disposed closer to the substrate than is the main magnetic pole layer, and an upper front shield part disposed at a position distanced more from the substrate than is the main magnetic pole layer, and
wherein the hard guard frame layer has a wraparound end part which is wrapped around to the medium-opposing surface side of the lower coil layer, inserted in a gap between the lower front shield part and the lower coil layer, and in direct contact with an outside surface on the medium-opposing surface side of the lower coil layer.

10. The thin-film magnetic head according to claim 9, wherein the hard guard frame layer has a front end part which is disposed closer to the medium-opposing surface than is the lower front shield part and in contact with an outside surface on the medium-opposing surface side of the lower front shield part, and the front end part is disposed in the medium-opposing surface.

11. The thin-film magnetic head according to claim 9, further comprising:

a middle adiabatic layer disposed between the lower coil layer and the main magnetic pole layer and formed to cover almost whole upper faces of the lower coil layer and the lower front shield part on a side distanced from the substrate.

12. A method of manufacturing a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the method comprising:

a conductor layer forming step of forming a lower conductor layer for forming a lower coil layer disposed between the main magnetic pole layer and the substrate, among coil layers constituting the thin-film coil;

a hard nonmagnetic layer forming step of forming a hard nonmagnetic layer using a hard nonmagnetic material to cover almost the whole lower conductor layer; and a hard guard frame layer forming step of forming a hard guard frame layer surrounding the lower coil layer from outside and being in direct contact with almost a whole outside surface defining an outer shape of the lower coil layer, together with the lower coil layer, by performing flattening of a surface of a multilayer body.

13. The method of manufacturing a thin-film magnetic head according to claim 12, a shield magnetic layer forming step of forming the shield magnetic layer comprising a lower front shield part forming step of forming a lower front shield part disposed closer to the medium-opposing surface than is the lower coil layer, wherein the hard nonmagnetic layer forming step forms the hard nonmagnetic layer such as to form a wraparound end part which is wrapped around to the medium-opposing surface side of the lower conductor layer, inserted in a gap between the lower front shield part and the lower conductor layer, and in direct contact with an outside surface on the medium-opposing surface side of the lower conductor layer.

14. The method of manufacturing a thin-film magnetic head according to claim 12, further comprising:

a middle adiabatic layer forming step of forming a middle adiabatic layer disposed between the lower coil layer and the main magnetic pole layer and formed to cover almost a whole upper face of the lower coil layer on a side distanced from the substrate.

15. A method of manufacturing a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the method comprising:

a shield magnetic layer forming step of forming the shield magnetic layer comprising a lower front shield part forming step of forming a lower front shield part disposed closer to the medium-opposing surface than is a lower coil layer disposed between the main magnetic pole layer and the substrate, among coil layers constituting the thin-film coil;

a conductor layer forming step of forming a lower conductor layer for forming the lower coil layer;

a hard nonmagnetic layer forming step of forming a hard nonmagnetic layer using a hard nonmagnetic material to cover almost the whole lower conductor layer and lower front shield part; and a hard guard frame layer forming step of forming a hard guard frame layer surrounding the whole of the lower conductor layer and the lower front shield part from outside and being in contact with almost whole outside surfaces defining outer shapes of the lower conductor layer and the lower front shield part, together with the lower coil layer, by performing flattening of a surface of a multilayer body.

16. The method of manufacturing a thin-film magnetic head according to claim 15, wherein the hard nonmagnetic layer forming step forms the hard nonmagnetic layer such as to form a wraparound end part which is wrapped around to the medium-opposing surface side of the lower conductor layer, inserted in a gap between the lower front shield part and the lower conductor layer, and in direct contact with an outside surface on the medium-opposing surface side of the lower conductor layer.

17. The method of manufacturing a thin-film magnetic head according to claim 14, wherein the hard nonmagnetic layer forming step forms the hard nonmagnetic layer such that a front end part which is disposed closer to the medium-opposing surface than is the lower front shield part and in contact with an outside surface on the medium-opposing surface side of the lower front shield part is disposed in the medium-opposing surface.

18. The method of manufacturing a thin-film magnetic head according to claim 15, further comprising:

a middle adiabatic layer forming step of forming a middle adiabatic layer disposed between the lower coil layer and the main magnetic pole layer and formed to cover almost whole upper faces of the lower coil layer and the lower front shield part on a side distanced from the substrate.

19. A head gimbal assembly comprising a thin-film magnetic head formed on a support and a gimbal for securing the support, wherein the thin-film magnetic head comprises:

a main magnetic pole layer having a magnetic pole end face on a side of a medium-opposing surface that opposes a recording medium;

a write shield layer having a write shield end face disposed in the medium-opposing surface;

a gap layer formed between the main magnetic pole layer and write shield layer;

a thin-film coil wound around any of the main magnetic pole layer, the write shield layer or a shield magnetic layer connected to the main magnetic pole layer, wherein the main magnetic pole layer, the write shield layer, the gap layer and the thin-film coil are laminated on a substrate; and a hard guard frame layer surrounding an equidistant coil part from outside and being in direct contact with almost a whole outside side surface defining an outer shape of the equidistant coil part, the outside side surface extending in a direction parallel to the medium-opposing surface, wherein a part of the thin-film coil disposed at a position equidistant from the substrate is the equidistant coil part.

20. A hard disk drive comprising a head gimbal assembly having a thin-film magnetic head and a recording medium opposing the thin-film magnetic head,
wherein the thin-film magnetic head comprises:
a main magnetic pole layer having a magnetic pole end face on a side of a medium-opposing surface that opposes a recording medium;
a write shield layer having a write shield end face disposed in the medium-opposing surface;
a gap layer formed between the main magnetic pole layer and write shield layer;
a thin-film coil wound around any of the main magnetic pole layer, the write shield layer or a shield magnetic layer connected to the main magnetic pole layer, wherein the main magnetic pole layer, the write shield layer, the gap layer and the thin-film coil are laminated on a substrate; and
a hard guard frame layer surrounding an equidistant coil part from outside and being in direct contact with almost a whole outside side surface defining an outer shape of the equidistant coil part, the outside side surface extending in a direction parallel to the medium-opposing surface, wherein a part of the thin-film coil disposed at a position equidistant from the substrate is the equidistant coil part.

* * * * *